(12) United States Patent  
Jeong et al.

(10) Patent No.: US 8,082,350 B2  
(45) Date of Patent: Dec. 20, 2011

(54) DRM INTEROPERABLE SYSTEM

(75) Inventors: Man-soo Jeong, Seoul (KR); Il-gon Park, Seoul (KR); Koo-yong Pak, Seoul (KR); Min-gyu Chung, Seoul (KR); Sung-hyun Cho, Seoul (KR); Soo-jung Kim, Seoul (KR); Kiran Kumar K, Seoul (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 12/347,426

(22) Filed: Dec. 31, 2008

(65) Prior Publication Data

US 2009/0248848 A1 Oct. 1, 2009

Related U.S. Application Data

(63) Continuation of application No. 12/281,640, filed as application No. PCT/KR2007/001116 on Mar. 6, 2007.

(60) Provisional application No. 60/778,928, filed on Mar. 6, 2006, provisional application No. 60/743,417, filed on Mar. 7, 2006, provisional application No. 60/744,322, filed on Apr. 5, 2006, provisional application No. 60/744,811, filed on Apr. 13, 2006, provisional application No. 60/799,411, filed on May 9, 2006, provisional application No. 60/802,943, filed on May 23, 2006, provisional application No. 60/803,834, filed on Jun. 2, 2006, provisional application No. 60/814,977, filed on Jun. 19, 2006, provisional application No. 60/832,514, filed on Jul. 20, 2006, provisional application No. 60/824,700, filed on Sep. 6, 2006, provisional application No. 60/862,684, filed on Oct. 24, 2006, provisional application No. 60/862,808, filed on Oct. 25, 2006, provisional application No. 60/865,520, filed on Nov. 13, 2006.

(51) Int. Cl.  
*G06F 15/16* (2006.01)

(52) U.S. Cl. ........ 709/227; 709/223; 709/224; 709/206; 709/208; 709/209; 709/220; 709/229; 726/26; 713/189

(58) Field of Classification Search .................. 709/223, 709/224, 206, 208, 217, 246, 227, 209, 220, 709/229  
See application file for complete search history.

(56) References Cited

U.S. PATENT DOCUMENTS 5,708,812 A 1/1998 Van et al.  
(Continued)

FOREIGN PATENT DOCUMENTS

CN 1405690 A 3/2003  
(Continued)

OTHER PUBLICATIONS

U.S. Non-final Office Action dated Jun. 29, 2010 for U.S. Appl. No. 12/281,633, 25 pages.

(Continued)

*Primary Examiner* — Jude J Jean Gilles  
(74) *Attorney, Agent, or Firm* — Fish & Richardson P.C.

(57) ABSTRACT

A DRM interoperable system is provided. The DRM interoperable system includes: a domain manager which manages a domain; first and second devices which are authenticated by the domain manager and registered in the domain; and a control unit which gathers information on entities that are to participate in transmission of data when the first device requests the second device to transmit the data, controls at least two entities so that a chain including the at least two entities is constructed by using the gathered information on the entities, and controls the at least two entities so that a plurality of data is transmitted to the second device through the chain. Accordingly, it is possible to provide a DRM interoperable environment in which data can be effectively transmitted.

3 Claims, 40 Drawing Sheets

U.S. PATENT DOCUMENTS

| | | | |
|---|---|---|---|
| 5,774,668 | A | 6/1998 | Choquier et al. |
| 5,991,876 | A | 11/1999 | Johnson et al. |
| 6,006,332 | A | 12/1999 | Rabne et al. |
| 6,044,075 | A | 3/2000 | Le Boudec et al. |
| 6,167,405 | A * | 12/2000 | Rosensteel et al. ............ 1/1 |
| 6,226,618 | B1 | 5/2001 | Downs et al. |
| 6,363,416 | B1 * | 3/2002 | Naeimi et al. ............ 709/209 |
| 6,460,058 | B2 | 10/2002 | Koppolu et al. |
| 6,484,221 | B1 | 11/2002 | Lorinser et al. |
| 6,516,416 | B2 | 2/2003 | Gregg et al. |
| 6,549,937 | B1 | 4/2003 | Auerbach et al. |
| 6,600,958 | B1 | 7/2003 | Zondag |
| 6,665,521 | B1 | 12/2003 | Gorday et al. |
| 6,678,791 | B1 | 1/2004 | Jacobs et al. |
| 6,807,542 | B2 | 10/2004 | Bantz et al. |
| 6,873,975 | B1 | 3/2005 | Hatakeyama et al. |
| 7,016,963 | B1 | 3/2006 | Judd et al. |
| 7,020,781 | B1 | 3/2006 | Saw et al. |
| 7,036,011 | B2 | 4/2006 | Grimes et al. |
| 7,184,988 | B1 | 2/2007 | Frankel et al. |
| 7,185,113 | B1 | 2/2007 | Haberman et al. |
| 7,213,269 | B2 | 5/2007 | Orthlieb et al. |
| 7,421,578 | B1 | 9/2008 | Huang et al. |
| 7,461,130 | B1 | 12/2008 | AbdelAziz et al. |
| 7,512,973 | B1 | 3/2009 | Chan et al. |
| 7,546,641 | B2 | 6/2009 | Robert et al. |
| 7,549,062 | B2 | 6/2009 | Kouznetsov et al. |
| 7,555,464 | B2 | 6/2009 | Candelore |
| 7,565,438 | B1 | 7/2009 | Zhu |
| 7,577,999 | B2 | 8/2009 | Narin et al. |
| 7,624,072 | B2 | 11/2009 | Lipsky et al. |
| 7,673,008 | B2 | 3/2010 | Kojima |
| 7,721,111 | B2 | 5/2010 | Hug et al. |
| 7,757,299 | B2 | 7/2010 | Robert et al. |
| 7,845,014 | B2 | 11/2010 | Siegel |
| 7,877,598 | B2 | 1/2011 | Schmidt et al. |
| 2001/0007993 | A1 | 7/2001 | Wu |
| 2002/0108050 | A1 | 8/2002 | Raley et al. |
| 2002/0120577 | A1 | 8/2002 | Hans et al. |
| 2002/0143855 | A1 | 10/2002 | Traversat et al. |
| 2002/0144108 | A1 | 10/2002 | Benantar |
| 2002/0144119 | A1 | 10/2002 | Benantar |
| 2002/0157002 | A1 | 10/2002 | Messerges et al. |
| 2002/0184515 | A1 | 12/2002 | Oho et al. |
| 2002/0198845 | A1 | 12/2002 | Lao et al. |
| 2003/0041138 | A1 | 2/2003 | Kampe et al. |
| 2003/0078891 | A1 | 4/2003 | Capitant |
| 2003/0095540 | A1 | 5/2003 | Mulligan et al. |
| 2003/0126086 | A1 | 7/2003 | Safadi |
| 2004/0003269 | A1 | 1/2004 | Waxman et al. |
| 2004/0003270 | A1 | 1/2004 | Bourne et al. |
| 2004/0088541 | A1 | 5/2004 | Messerges et al. |
| 2004/0128345 | A1 | 7/2004 | Robinson et al. |
| 2004/0158712 | A1 | 8/2004 | Lee |
| 2004/0158731 | A1 | 8/2004 | Narin |
| 2004/0168077 | A1 | 8/2004 | Waxman et al. |
| 2004/0172533 | A1 | 9/2004 | DeMello |
| 2004/0236717 | A1 * | 11/2004 | Demartini et al. ............ 707/1 |
| 2004/0249943 | A1 | 12/2004 | Venkata |
| 2004/0254993 | A1 | 12/2004 | Mamas |
| 2005/0022033 | A1 | 1/2005 | Han |
| 2005/0044391 | A1 | 2/2005 | Noguchi et al. |
| 2005/0054447 | A1 | 3/2005 | Hiroyama et al. |
| 2005/0065891 | A1 | 3/2005 | Lee |
| 2005/0102513 | A1 | 5/2005 | Alve |
| 2005/0144468 | A1 | 6/2005 | Northcutt et al. |
| 2005/0201301 | A1 | 9/2005 | Bridgelall |
| 2005/0223415 | A1 | 10/2005 | Oho et al. |
| 2005/0228858 | A1 | 10/2005 | Mizutani et al. |
| 2005/0267845 | A1 | 12/2005 | Oh |
| 2005/0268090 | A1 | 12/2005 | Saw et al. |
| 2005/0289076 | A1 | 12/2005 | Lambert |
| 2006/0026691 | A1 | 2/2006 | Kim |
| 2006/0168451 | A1 | 7/2006 | Ishibashi et al. |
| 2006/0190403 | A1 | 8/2006 | Lin et al. |
| 2006/0190521 | A1 | 8/2006 | Kojima |
| 2006/0218419 | A1 | 9/2006 | Iwamura et al. |
| 2006/0272026 | A1 | 11/2006 | Niwano et al. |
| 2007/0027814 | A1 | 2/2007 | Tuoiniemi |
| 2007/0078777 | A1 | 4/2007 | Demartini et al. |
| 2007/0083610 | A1 | 4/2007 | Treder et al. |
| 2007/0093255 | A1 * | 4/2007 | Nurminen et al. ............ 455/455 |
| 2007/0100701 | A1 | 5/2007 | Boccon-Gibod et al. |
| 2007/0156603 | A1 | 7/2007 | Yoon et al. |
| 2007/0198656 | A1 | 8/2007 | Mazzaferri et al. |
| 2007/0220302 | A1 | 9/2007 | Cline et al. |
| 2007/0242821 | A1 | 10/2007 | Kim et al. |
| 2007/0255659 | A1 | 11/2007 | Yen et al. |
| 2007/0266198 | A1 | 11/2007 | Bousis |
| 2007/0269044 | A1 | 11/2007 | Bruestle |
| 2008/0120362 | A1 | 5/2008 | Kapoor et al. |
| 2008/0137528 | A1 | 6/2008 | O'Toole et al. |
| 2008/0216177 | A1 | 9/2008 | Yokosato et al. |
| 2008/0256368 | A1 | 10/2008 | Ross et al. |
| 2009/0228988 | A1 * | 9/2009 | Jeong et al. ............ 726/27 |
| 2009/0248848 | A1 * | 10/2009 | Jeong et al. ............ 709/223 |
| 2009/0307387 | A1 * | 12/2009 | Jeong et al. ............ 710/33 |

FOREIGN PATENT DOCUMENTS

| | | |
|---|---|---|
| CN | 1610914 A | 4/2005 |
| EP | 1564621 B1 | 9/2009 |
| JP | 2002-152301 A | 5/2002 |
| KR | 2004-0034165 | 4/2004 |
| KR | 1020050032856 | 4/2005 |
| KR | 1020050037483 | 4/2005 |
| KR | 1020050077881 | 8/2005 |
| KR | 2005101940 A | 10/2005 |
| KR | 2005-0104182 | 11/2005 |
| KR | 1020050120579 | 12/2005 |
| KR | 2006011763 A | 2/2006 |
| RU | 2260918 C2 | 9/2005 |
| RU | 2265961 C2 | 12/2005 |
| WO | WO0250787 A1 | 6/2002 |
| WO | WO 03/034313 | 4/2003 |
| WO | WO 03/036441 | 5/2003 |
| WO | WO 03/058620 | 7/2003 |
| WO | WO 03/073760 | 9/2003 |
| WO | WO03107602 A1 | 12/2003 |
| WO | WO 2004/031950 | 4/2004 |
| WO | WO 2004/059478 | 7/2004 |
| WO | WO 2004/102459 | 11/2004 |
| WO | WO 2005/034424 | 4/2005 |
| WO | WO 2005/041001 A1 | 5/2005 |
| WO | WO 2006/011768 | 2/2006 |
| WO | WO 2006/011768 A1 | 2/2006 |
| WO | WO 2006/043784 | 4/2006 |
| WO | 2006092840 | 9/2006 |

OTHER PUBLICATIONS

Russian Office Action in Application No. 2008145043/09 dated Apr. 30, 2010, with English translation, 7 pages.

International Search Report dated May 28, 2007 for Application No. PCT/KR007/001112, 2 pages.

International Search Report dated Jun. 14, 2007 for Application No. PCT/KR2007/001111, 2 pages.

International Search Report dated Jun. 15, 2007 for Application No. PCT/KR2007/001113, 2 pages.

International Search Report dated Jun. 15, 2007 for Application No. PCT/KR2007/001114, 2 pages.

International Search Report dated Jun. 18, 2007 for Application No. PCT/KR2007/001110, 2 pages.

International Search Report dated Jun. 20, 2007 for Application No. PCT/KR2007/001115, 2 pages.

International Search Report dated Jul. 2, 2007 for Application No. PCT/KR200700116, 2 pages.

International Search Report dated Apr. 21, 2008 for Application No. PCT/KR2008/000078, 2 pages.

International Search Report and Written Opinion dated Sep. 6, 2007 for Application No. PCT/KR2007/004317, 6 pages.

U.S. Non Final Office Action issued in U.S. Appl. No. 12/346,487, dated Nov. 12, 2010, 32 pages.

Russian Office Action in Application No. 2008145043 dated Aug. 18, 2010, with English translation, 14 pages.

U.S. Non-final Office Action in U.S. Appl. No. 12/281,634 dated Sep. 20, 2010, 26 pages.
Australian Office Action dated Nov. 23, 2010 for Application No. 2007293790, 2 pages.
China Office Action dated Nov. 10, 2010 for Application No. 200880000253.1, with English translation, 11 pages.
U.S. Office Action dated Oct. 29, 2010 for U.S. Appl. No. 12/346,644, 13 pages.
U.S. Final Office Action dated Dec. 10, 2010 for U.S. Appl. No. 12/281,633, 17 pages.
U.S. Office Action dated Dec. 21, 2010 for U.S. Appl. No. 12/281,638, 21 pages.
U.S. Office Action dated Dec. 30, 2010 for U.S. Appl. No. 12/298,912, 11 pages.
U.S. Office Action dated Feb. 3, 2011 for U.S. Appl. No. 12/281,648, 20 pages.
U.S. Final Office Action dated Feb. 4, 2011 for U.S. Appl. No. 12/281,640, 8 pages.
UPnP; "Universal Plug and Play Device Architecture"; Jun. 8, 2000; Microsoft Corporation; Version 1.0; pp. 1-54.
WAP; "WAP Push Architectural Overview"; Jul. 3, 2001; WAP Forum; pp. 1-24.
Japanese Office Action dated Feb. 22, 2011 with English Translation, 4 pages.
US Final Office Action dated Mar. 23, 2011 for U.S. Appl. No. 12/346,487, 11 pages.
US Final Office Action dated Mar. 23, 2011 for U.S. Appl. No. 12/346,345, 12 pages.
US Non-Final Office Action dated Mar. 18, 2011 for U.S. Appl. No. 12/346,642, 14 pages.
U.S. Non-final Office Action issued in U.S. Appl. No. 12/295,868, dated Mar. 28, 2011, 13 pages.
Office Action issued in U.S. Appl. No. 12/281,640, dated Apr. 19, 2011, 9 pages.
Final Office Action issued in U.S. Appl. No. 12/346,644, dated Apr. 19, 2011, 10 pages.
Final Office Action issued in U.S. Appl. No. 12/281,638, dated Apr. 1, 2011, 24 pages.
Office Action issued in U.S. Appl. No. 12/346,668, dated Apr. 5, 2011, 11 pages.
Saxena et al., "Admission Control in Peer-to-Peer: Design and Performance Evaluation," 2003; ACM; SASN '03; pp. 1-11.
Office Action issued in U.S. Appl. No. 12/347,549 dated Apr. 14, 2011, 14 pages.

* cited by examiner

Fig 25
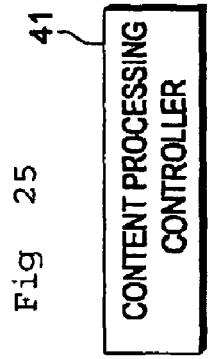
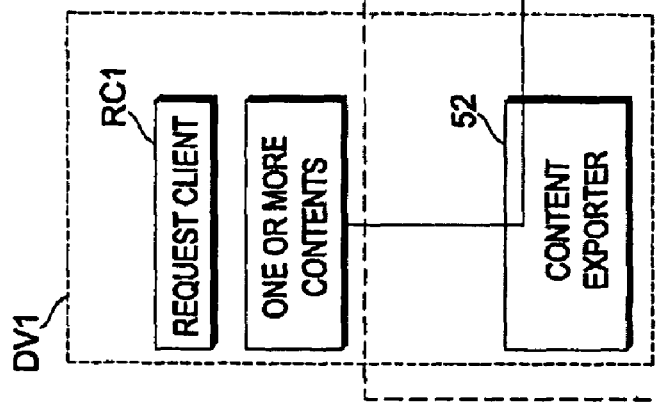

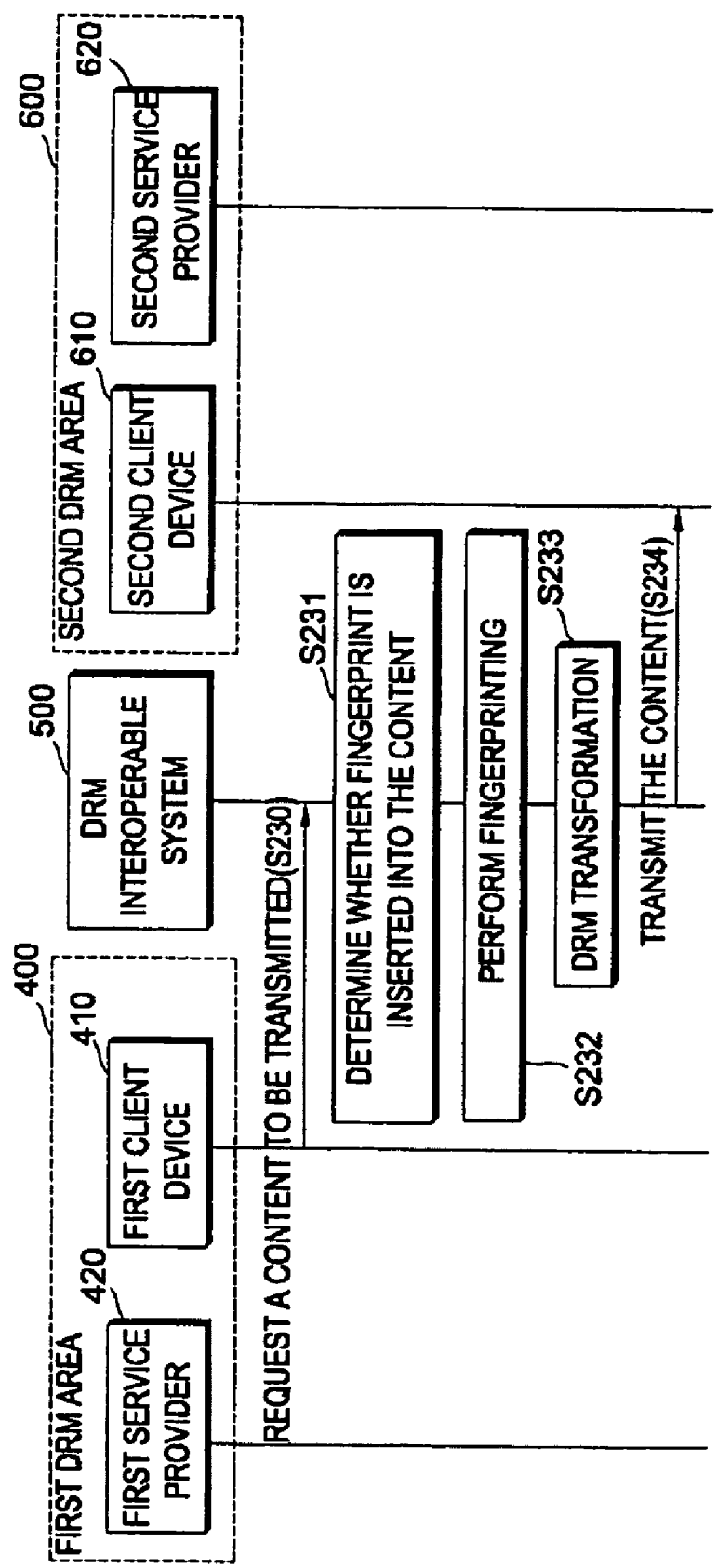

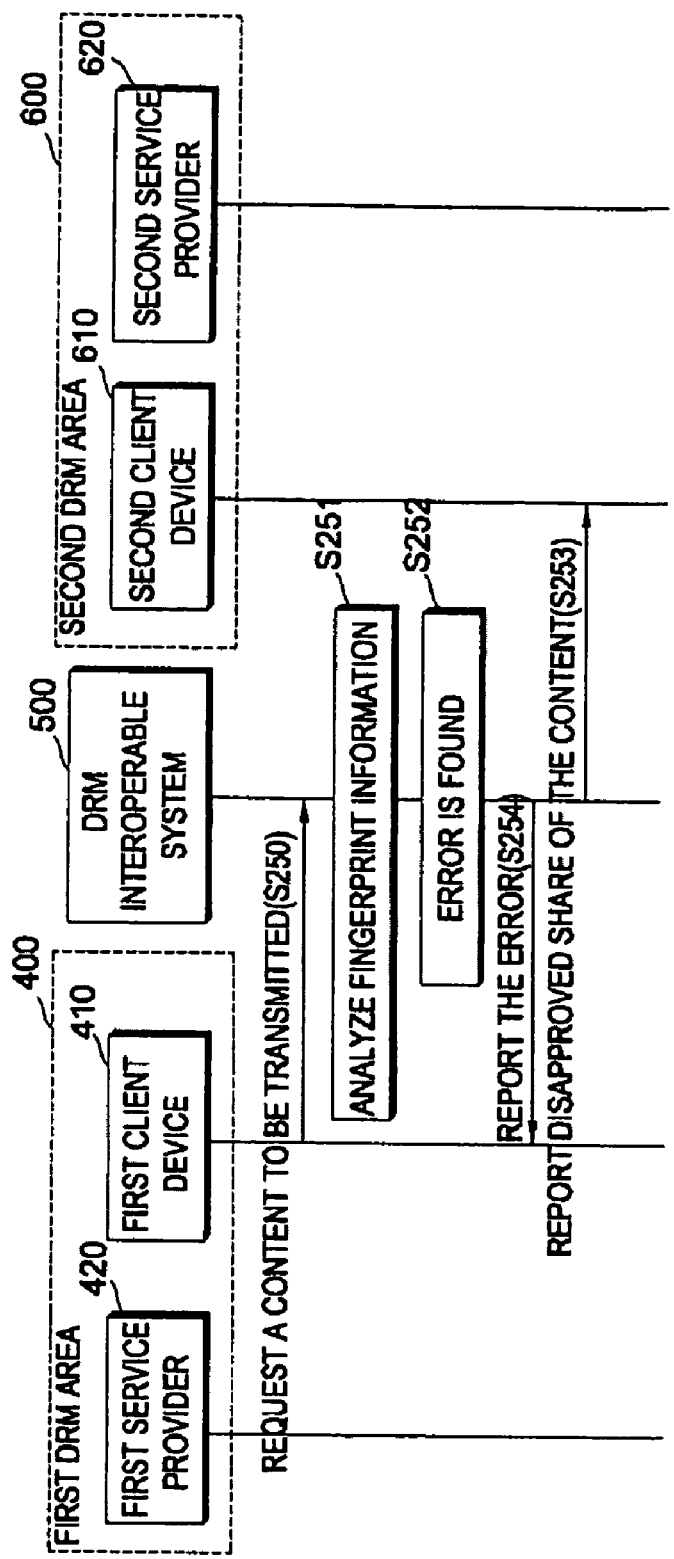

DRM INTEROPERABLE SYSTEM

CROSS-REFERENCE TO RELATED APPLICATIONS

This application is a continuation of U.S. application Ser. No. 12/281,640, filed Sep. 4, 2008, now pending, which is a 371 of International Application No.: PCT/KR2007/001116, filed Mar. 6, 2007, which claims priority from U.S. Provisional Application No. 60/778,928, filed Mar. 6, 2006, U.S. Provisional Application No. 60/743,417 filed Mar. 7, 2006, U.S. Provisional Application No. 60/744,322 filed Apr. 5, 2006, U.S. Provisional Application No. 60/744,811 filed Apr. 13, 2006, U.S. Provisional Application No. 60/799,411 filed May 9, 2006, U.S. Provisional Application No. 60/802,943 filed May 23, 2006, U.S. Provisional Application No. 60/803,834 filed Jun. 2, 2006, U.S. Provisional Application No. 60/814,977 filed Jun. 19, 2006, U.S. Provisional Application No. 60/832,514 filed Jul. 20, 2006, U.S. Provisional Application No. 60/824,700 filed Sep. 6, 2006, U.S. Provisional Application No. 60/862,684 filed Oct. 24, 2006, U.S. Provisional Application No. 60/862,808 filed Oct. 25, 2006, U.S. Provisional Application No. 60/865,520 filed Nov. 13, 2006 all of which are incorporated by reference.

TECHNICAL FIELD

The present invention relates to a DRM interoperable system, and more particularly, to a DRM interoperable system capable of providing a DRM interoperable environment in which data can be effectively transmitted and compatible with other data.

BACKGROUND ART

In general, unlike an analogue content, since a digital content can be unlimitedly copied without a loss of information, the digital content can be easily exposed to illegal copy and use. This is why a content protection technique capable of stably protecting a digital content against illegal copy and use has to be supported in order to provide a digital content service.

A digital rights management (DRM) is a total digital content protection technique capable of allowing only a legally authorized user to use a digital content. Although the DRM technically includes a security technique, a watermarking technique, a tamper resistance technique, and the like, more accurately, the DRM indicates a framework rather than technologies.

The DRM focuses on radically preventing illegal copy and use of a content. In the DRM, a digital content is transformed into encrypted data in a package form by using an encryption technique. Accordingly, although the digital content is casually obtained by a predetermined user, the digital content cannot be used without a legal authentication process.

Most legal content services provided through a wired/wireless communication network such as the Internet or mobile communication network can be executed only by DRM devices which support a DRM employed by a service provider or content provider of the corresponding content. This is due to technical and political closure properties of the DRM.

On the other hand, the technical and political closure properties of the DRM are advantageous in that the legality of the content is secured. However, there is a problem that it is limited for a user to use the content. This is because DRM device or DRM-using software in which a DRM employed by the service provider is installed has to be separately included, so that a user may use a digital content provided by a plurality of service provider. In this case, the user has to separately make a contract, a payment, an authentication, and the like. [8] The aforementioned problem deteriorates flexibility of a distribution structure of digital contents. Finally, the problem causes limitation of digital content services.

Recently, it is intended to provide a framework in which the closed DRM structures are compatible with one another. In order to allow different types of DRMs to be compatible with one another, there is required a DRM interoperable system which mediates the difference among the closed DRMs. The DRM interoperable system can be embodied by defining system resources and suggesting operation models which generate and manage the defined system resources. In addition, in order to support the DRM interoperable system, various scenarios using defined system resources and operation models have to be suggested.

DISCLOSURE OF INVENTION

Technical Problem

The present invention provides a DRM interoperable system capable of effectively providing a DRM interoperable environment in which different DRM data are compatible with each other.

Technical Solution

According to an aspect of the present invention, there is provided a DRM interoperable system comprising: a domain manager which manages a domain; first and second devices which are authenticated by the domain manager and registered in the domain; and a control unit which gathers information on entities that are to participate in transmission of data when the first device requests the second device to transmit the data, controls at least two entities so that a chain including the at least two entities is constructed by using the gathered information on the entities, and controls the at least two entities so that a plurality of data is transmitted to the second device through the chain.

In the above aspect of the present invention, at least one of the at least two entities included in the chain may transmit an event message for representing a transmission status of the data transmitted through the chain to the control unit. In addition, the control unit may subscribe to a predetermined event by controlling the at least one of the at least two entities included in the chain for receiving the event message.

In addition the data may be contents. In this case, the at least two entities included in the chain may comprise: a content exporter which exports a plurality of contents from the first device and transmits the exported contents in response to a control of the control unit; and a content importer which receives the plurality of contents transmitted by the content exporter and imports the received contents into the second device in response to a control of the control unit. Alternatively, the at least two entities included in the chain may comprise: a content exporter which exports a plurality of contents from the first device and transmits the exported contents in response to a control of the control unit; a content transformer which receives the plurality of contents transmitted by the content exporter, transforms the received contents into contents with a format required by the second device, and transmits the transformed contents in response to a control of the control unit; and a content importer which receives the plurality of contents transmitted by the content transformer and imports the received contents into the second device in response to a control of the control unit.

Alternatively, the data may be licenses. In this case, the at least two entities included in the chain may comprise: a license manager which transmits a plurality of licenses requested by the first device in a neutral license form to the control unit in response to a control of the control unit; the control unit which receives the plurality of licenses transmitted from the license manager, generates neutral licenses by considering transmission information, and transmits the neutral licenses; and a license processor which receives the neutral licenses transmitted by the control unit and provides the received neutral licenses to the second device. At this time, the license processor may transmit the neutral licenses transmitted by the control unit, or the license processor may transmit the neutral licenses to a DRM system applied to the second device and allow the DRM system to transmit the neutral licenses to the second device.

In addition, the DRM interoperable system may further comprise a domain reference point which manages a local area and an environment of the domain. In addition, the DRM interoperable system may further comprise at least one domain reference point candidate capable of replacing the domain reference point, when an error occurs in the domain reference point.

In addition, the domain reference point may receive a domain reference point membership from the domain manager. In addition, the first and second devices may receive the domain reference point membership from the domain reference point and submit a credential including the domain reference point membership to the domain manager so as to be authenticated by the domain.

In addition, the first or second device may be a legacy device connected to a virtual client. At this time, the virtual client may store unique information on the legacy device.

According to another aspect of the present invention, there is provided a DRM interoperable system comprising: a domain manager which manages a domain; a request device and at least one destination device, which are authenticated by the domain manager and registered in the domain; and a control unit which gathers information on entities that are to transmit the data when receiving a request message for requesting the at least one destination device to transmit data, controls at least two entities so that a chain including the at least two entities is constructed by using the gathered information on the entities, and controls the at least two entities so that the data is transmitted to the at least one destination device through the plurality of chains.

BRIEF DESCRIPTION OF THE DRAWINGS

The above and other features and advantages of the present invention will become more apparent by describing in detail exemplary embodiments thereof with reference to the attached drawings in which:

FIG. 25 illustrates a primary content transformation chain for transmitting one or more contents to a first destination device;

FIG. 48 is a functional block diagram illustrating a method of processing a content by using a DRM interoperable system according to Example 5-6; and FIG. 49 is a functional block diagram illustrating a method of processing a content by using a DRM interoperable system according to Example 5-7.

REFERENCE NUMERALS

Figure 1:
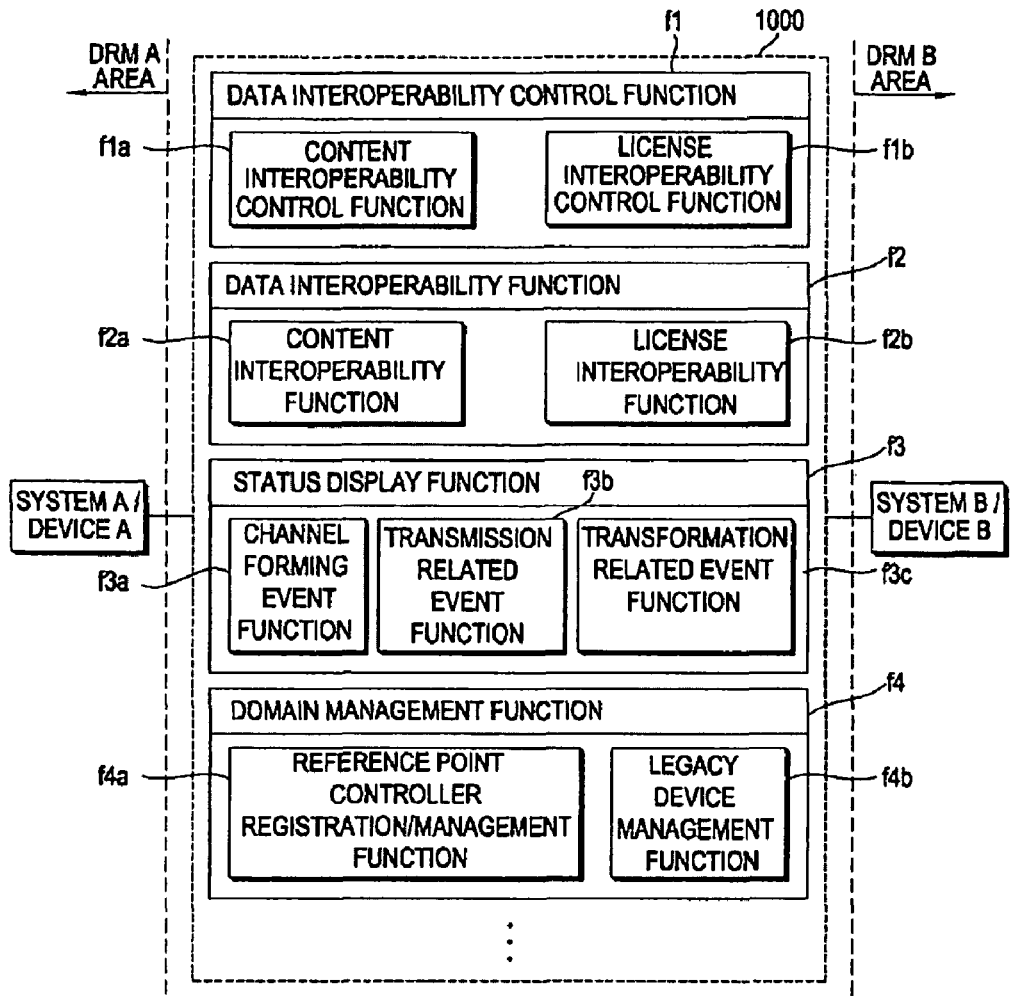
FIG. 1 is a block diagram illustrating a concept and main functions of a DRM interoperable system according to an exemplary embodiment of the present invention.

10: client part
20: authentication and management part
30: license processing part
40: processing control part
41: content processing controller
50: content processing part
51: content transformer
52: content exporter
53: content importer

BEST MODE FOR CARRYING OUT THE INVENTION

Now, preferred embodiments of the present invention will be described in detail with reference to the attached drawings.

In addition, in order to clearly describe exemplary embodiments with reference to the accompanying drawings, specific technical terms are used. However, the present invention is not limited to the selected specific technical terms, and each specific technical term includes all the technical synonyms which operate in a similar manner so as to achieve a similar entity.

FIG. 1 is a block diagram illustrating a concept and main functions of a DRM interoperable system according to an exemplary embodiment of the present invention.

As shown in FIG. 1, a DRM interoperable system 1000 serves to allow services to be compatible with one another between different DRM areas. The DRM interoperable system 1000 can perform a data interoperability control function f1, a data interoperability function f2, a status display function f3, a domain management function f4, and the like.

The data interoperability control function f1 serves to control interoperability of data so that data are compatible with one another. At this time, the data may represent a content or license. Specifically, the data interoperability control function f1 includes a content interoperability control function f1a and a license interoperability control function f2b.

The data interoperability function f2 may represent a function of allowing a content or license to be compatible under a control of the data interoperability control function f1. For example, according to the data interoperability function f2, data of a system A or device A in a DRM area A, for example, a content or license can be provided to a system B or device B in a DRM area B. A content or license of the system B or device B in the DRM area B can be provided to the system A or device A in the DRM area A. Specifically, the data interoperability function f2 may include a content interoperability function f2a and a license interoperability function f2b.

The status display function f3 may represent a function of displaying operation statuses of the DRM interoperable system 100. For example, the status display function f3 may include event functions such as a channel forming event function f3a, a transmission related event function f3b, a transformation related event function f3c, and the like.

The domain management function f4 may represent a function of managing a domain for authenticating and managing a client. The domain management function f4 may include a reference point controller registration/management function f4a, a legacy device management function f4b, and the like.

Hereinafter, a structure and an operation of a system for performing the aforementioned functions will be described in detail.

*Structure and Operation of a System*

Figure 2:
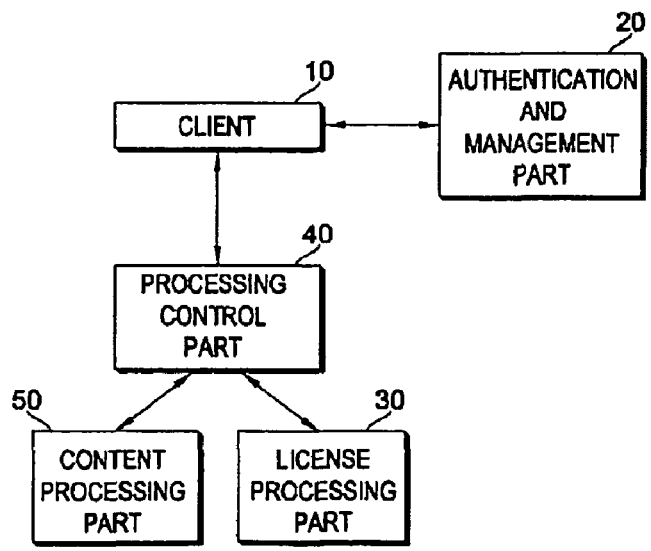
FIG. 2 is a block diagram illustrating a schematic structure of a DRM interoperable system according to an exemplary embodiment of the present invention.

FIG. 2 is a block diagram illustrating a schematic structure of a DRM interoperable system in which different types of DRMs are compatible with each other.

As shown in FIG. 2, the DRM interoperable system may include a client part 10, an authentication and management part 20, a processing control part 40, a content processing part 50, and a license processing part 30.

The aforementioned parts may be constructed with one or more entities. At this time, the entities may indicate modules or devices constructed as software or hardware which perform predetermined unique functions. Each entity may be a set of one or more unit function modules which performs predetermined unit functions. The entity is installed in a predetermined device to communicate data with another entity through a predetermined interface. In addition, even though the entities belong to the same part, the entity may be installed or embodied in different devices. The devices may be different depending on execution environments.

Hereinafter, functions of the entities included each part and operations through interactions among the entities will be described and a characteristic structure and functions of each part will be described.

1. Function and Operation of the Client Part

The client part 10 may include a client. The client is an entity which provides various functions so that a user can use a DRM interoperable service in linkage with the authentication and management part 20 and a processing control part 40.

The client may be included in a device of a user. A device that includes the client is referred to as a client device.

The client may be authenticated by requesting the authentication and management part 20 to authenticate the client. The authenticated client may request the processing control part 40 to transmit predetermined data, for example, a predetermined content or license to a desired destination by calling a predetermined entity. Here, the destination may be a device or software system in which a DRM that is different from the DRM applied to the predetermined content or license is installed, for example, another client device in the domain.

Figure 3:
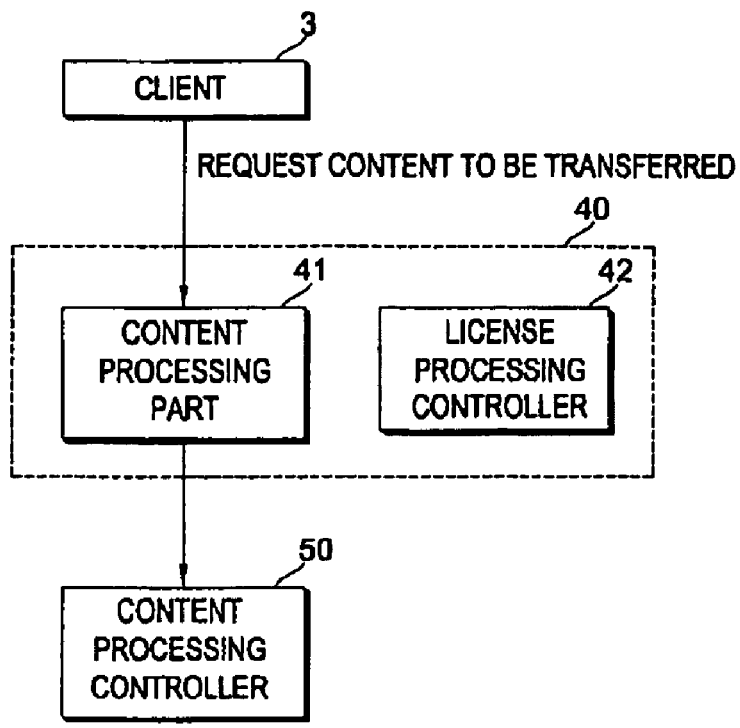
FIG. 3 illustrates an example in which a client requests a processing control part to transmit a content.
Figure 4:
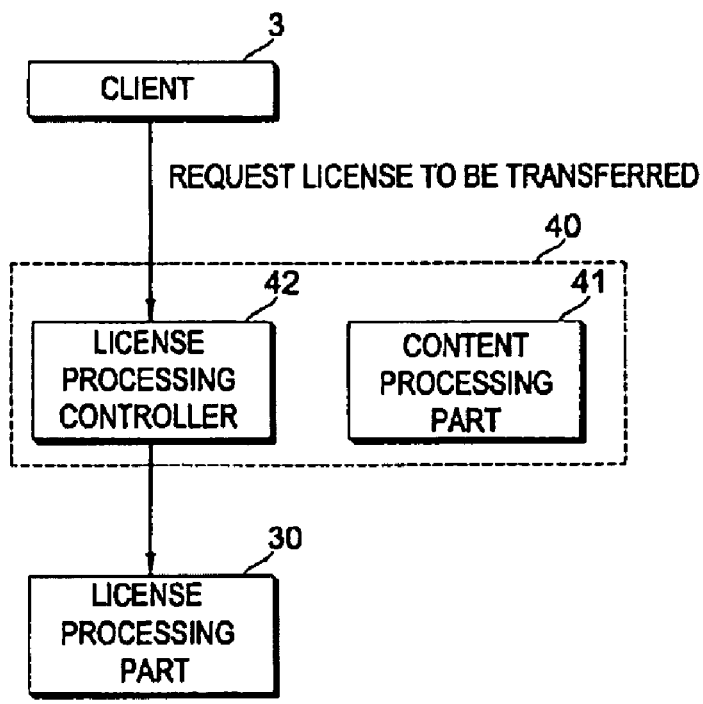
FIG. 4 illustrates an example in which a client requests a processing control part to transmit a license.

FIGS. 3 and 4 illustrate examples in which an authenticated client requests the processing control part 40 to transmit data. FIG. 3 illustrates an example in which the client requests the processing control part 40 to transmit a content. FIG. 4 illustrates an example in which the client requests the processing control part 40 to transmit a license.

As described in FIG. 3, the client requests the content processing controller 41 of the processing control part 40 to transmit a content. Then, the content processing controller 41 controls the content processing part 50 so that the requested content is transmitted to the desired destination. At this time, the content format and the DRM of the requested content may be different from a content format and a DRM required by the destination. The content processing part 50 processes the content so that the content satisfies conditions required by the destination and provides the processed content to the destination. The transmission and processing procedures will be described later with reference to FIGS. 18 to 34.

In addition, as shown in FIG. 4, the client requests a license processing controller 42 of the processing control part 40 to transmit a license. Then the license processing controller 42 controls the license processing part 30 so that the requested license is transmitted to the desired destination. At this time, a format of the requested license may be different from that of a license required by the destination. The license processing part 30 processes the different properties so that conditions required by the destination are satisfied and provides the processing result to the destination. The procedures of processing and transmitting the license will be described later with reference to FIG. 35.

On the other hand, the client may include typical functions of the client, for example, a function of using (or reproducing) a content, a user interface function, and the like. In this case, the client may be an end point of consumption of a content.

The client has to be authenticated as a legal client and managed by the authentication and management part 20. In order to easily perform the aforementioned process, the DRM interoperable system can introduce a concept of a domain.

The domain is a basic unit of a DRM trust framework and indicates a range to which the DRM interoperable system is practically applied. The domain may be constructed with a set of authorized devices or systems. For example, the domain may include a set of authorized client devices. In this case, although the client devices in the domain include different DRM contents, the client devices may share the contents.

2. Function and Operation of the Authentication and Management Part

Figure 5:
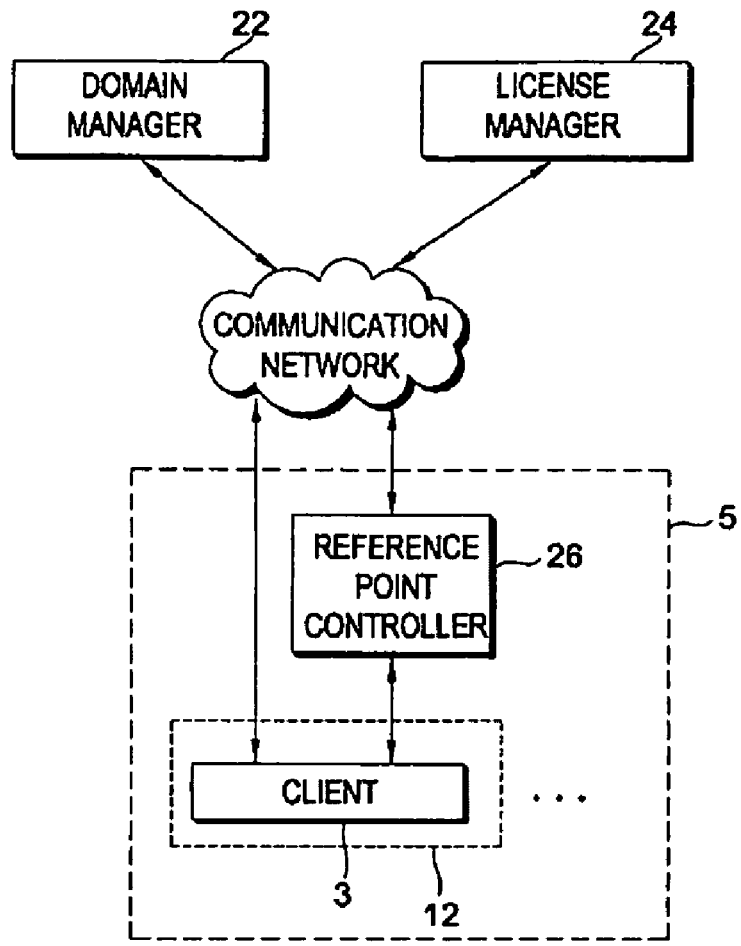
FIG. 5 is a block diagram illustrating a domain, entities which constitute a domain, and correlation among the entities.

FIG. 5 is a block diagram illustrating a domain, entities which constitute a domain, and correlation among the entities. FIG. 5 illustrates entities related to authentication and management of a client.

Referring to FIG. 5, the DRM interoperable system forms a domain 5. The domain 5 may be constructed in consideration of a physical location of a client device 12. Specifically, the domain 5 is constructed with authorized client devices 3 in a predetermined physical area. Alternatively, the domain 5 may be constructed with only logically authenticated client devices without considering a physical location of the client device 12.

In the present invention, as described above, although the domain is constructed with the client devices 3 in the predetermined local area in consideration of the physical locations of the client devices 3, a case in which client devices out of the predetermined local area in a network area also subscribe to the domain is exemplified. However, this is an example of an embodiment. The present invention is not limited thereto.

A local environment is required so as to construct the domain 5. At this time, the local environment indicates an environment in which a physical network is prepared so that devices in a predetermined local area are interactive with one another, and in which the physical network is interactive with an external network.

There is a home network system as an example for providing the local environment. Generally, in the home network system, home appliances, various sensors, security devices, and the like in a home can be interactive with one another through a wired/wireless local network and can be interactive with an external network such as the Internet through a communication node such as a home gateway. The local environment can be constructed with two or more interactive network devices in addition to the home network system.

The following local area is assumed to be an area in which the aforementioned local environment is prepared. In the local area, there may exist a plurality of client devices 3. A client 3 included in the client device 12 can be authenticated as a legal client by requesting the authentication and management part 20 to authenticate the client 3. A device including the authenticated client 3 is the client device 12. Different DRM contents can be used among the client devices 3 in a range permitted by a license.

Accordingly, the user sets the user's house to a local area and constructs a domain by using devices including different DRMs in the house. Then, contents are shared and used among the devices.

However, the client in the external network area can be also provided with a service through authentication, in addition to the clients 12 in the local area. In this case, it is necessary to distinguish the status of the client that is authenticated in the network from the status of the client 3 that is authenticated in the local area and to separately manage the statuses. For this, the statuses of the authenticated clients can be classified into a remote status and a local status and can be managed.

Referring FIG. 5, the authentication and management part 20 for authenticating and managing the client 3 include a domain manager 22, a license manager 24, and a reference point controller 26.

The domain manager 22 is designed to supervise the domain 5. For example, the domain manager 22 can perform functions of creating the domain 5, destroying the domain 5, associating clients with the domain 5, removing clients from the domain 5, registering the reference point controller 26, and the like.

The domain manager 22 may exist at any location in the local area or network area. For example, in the example shown in FIG. 5, the domain manager 22 is located in the network area. In this case, the domain manager 22 can interact with the reference point controller 26 and the client 3. Alternatively, the domain manager may be located in the local area. In this case, the domain manager is included in a device in a local area to interact with the reference point controller and the client.

The license manager 24 is designed to manage license information of the user. For example, the license manager 24 can provide a login function for a user and perform a function of a typical online service manager which stores and manages the license information. The license manager 24 can perform functions of creating user names, deleting user names, associating license information with user names, creating license information, deleting license information, and the like.

The license manager 24 may be located in a network area, for example a server of the service provider. However, the license manager 24 may be located in the network area such as the server of the service provider. Alternatively the license manager 24 may be in the local area. That is, the domain manager 22 and the license manager 24 may be located in any location in the local area or network area.

The reference point controller 26 checks whether a predetermined entity is located in the local area and provides a credential which verifies that the entity is located in the local area to the verified entity. For this, the reference point controller 26 can determine a range of the local area. At this time, the range of the local area can be determined by using a physical distance, the number of hops, a reaction time, and the like.

The reference point controller 26 checks whether the client 3 is located in the local area according to the request of the client 3. When it is determined that the client 3 is located in the local area, the reference point controller 26 can provide a domain credential which verifies that the client 3 is located in the local area. The domain credential can be provided to the domain manager 22 when the client 3 requests the domain manager 22 to authenticate the client 3. The domain manager 22 confirms that the client 3 is located in the local are and authenticates the client 3.

In addition, the domain manager 22 determines whether the client 3 is in a remote or local status based on the domain credential. The domain manager 22 may limit the number of the clients which access the domain manager 22 in the remote status by recognizing the status of the client 3, in order to prevent a plurality of clients to access the domain through the network and to improve security.

The reference point controller 26 may be located in the local area. Specifically, the reference point controller 26 may be determined as a device located in the local area. Although it is advantageous that the reference point controller 26 is determined as a device such as a set-top box, a desktop PC, and the like which includes a plurality of computing resources and have no movability, the reference point controller 26 may be determined as a highly movable device.

The reference point controller 26 can be selected according to a predetermined procedure, when the domain is initially constructed. Specifically, when the domain 5 is initially constructed, a device for performing a function of the reference point controller for determining the range of the local area is selected. The selected device has to be determined as the reference point controller 26. At this time, the determined reference point controller 26 is registered with the domain manager 22. Then, the client 3 can query the domain manager 22 about the reference point controller 26.

-Selection of a Reference Point Controller-

There are three methods of selecting a reference point controller.

There is a first method in which the devices that desire to subscribe to the domain communicate device information with one another and compare the device information according to a predetermined algorithm, so that the most suitable device is selected as the reference point controller. The selected reference point controller has to report to the domain manager that the device is selected as the reference point controller. Then, the device has to be registered with the domain.

There is a second method in which devices that desire to be registered with the domain report device information of the devices to the domain manager, and the domain management entity selects the reference point controller based on the reported device information.

There is a third method in which a reference point controller is selected by predetermined information. At this time, the predetermined information may be set by an administrator or user. Alternatively, the predetermined information may include arbitrarily determined information. For example, when the administrator or user inputs the predetermined information into the domain manager, the domain manager can select the reference point controller based on the predetermined information. Alternatively, the reference point controller may be established by allowing the administrator or user to directly select the device to be used as the reference point controller.

Hereinafter, the aforementioned three methods will be described in detail. For convenience of understanding, the aforementioned first method of selecting a reference point controller is referred to as Example 1-1. The second method of selecting a reference point controller is referred to as Example 1-2. The third method of selecting a reference point controller is referred to as Example 1-3.

EXAMPLE 1-1

First, a data format of a domain payload data unit (DPDU) is defined before the procedure of selecting a reference point controller is described. The DPDU is a normalized data format for transmitting device information of each device, when the reference point is selected.

Figure 6:
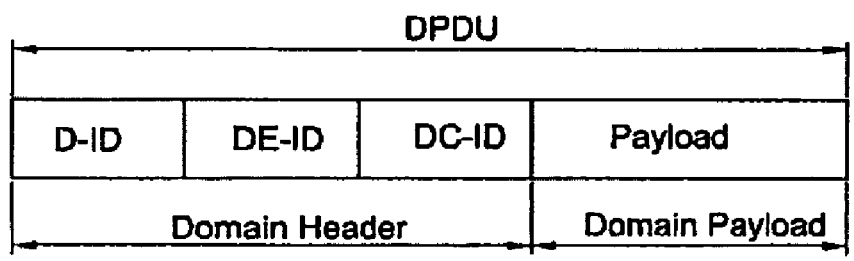
FIG. 6 illustrates an example of a format of a DPDU data packet needed for selecting a reference point controller.

FIG. 6 illustrates an example of a format of a DPDU data packet needed for selecting a reference point controller.

Referring to FIG. 6, the DPDU is constructed with a domain header and a domain payload.

The domain header includes a device capability identifier (hereinafter, abbreviated to DC-ID), a domain identifier (hereinafter, abbreviated to D-ID), and a device entity identifier (hereinafter, abbreviated to DE-ID).

The DC-ID is information used to identify a capability value of a device. At this time, the capability value may be information for displaying capability of a device with respect to a predetermined item, for example, a residual energy amount, a hardware specification, a network connection speed, a networking capability, mobility to outside, stability of a system, a computing power, a resource consumption amount, and the like. An arbitrary value may be allocated to the DC-ID according to a predetermined standard determined by the administrator or may be generated by the corresponding device, before or after the device enters the domain. The DC-ID is a standard for selecting the most suitable device, when the reference point controller is selected.

The D-ID is information used for classifying domains according to environments and properties of the devices. As described above, the domain may be an area classified according to a physical areas classification standard or may be an area classified through a logical authentication service. Accordingly, the D-ID is information which classifies domains according to physical areas or is information which classifies domains according to logical services.

The DE-ID is information used for identifying separate devices belonging to a domain.

On the other hand, the domain payload is a field for recording general data and error checking information. At this time, the general data indicates information on a device and a DRM reliability system. In addition, the error checking information may indicate information for checking an error of a DPDU packet.

As described above, the DPDU includes information for distinguishing capabilities of devices subscribed to the domain from one another. Accordingly, the DPDUs are exchanged among the devices in the domain, and the capabilities are compared with one another. Accordingly, a capable device can be selected, and the capable device can be determined as the reference point controller. Hereinafter, the aforementioned processes will be described in detail.

Figure 7:
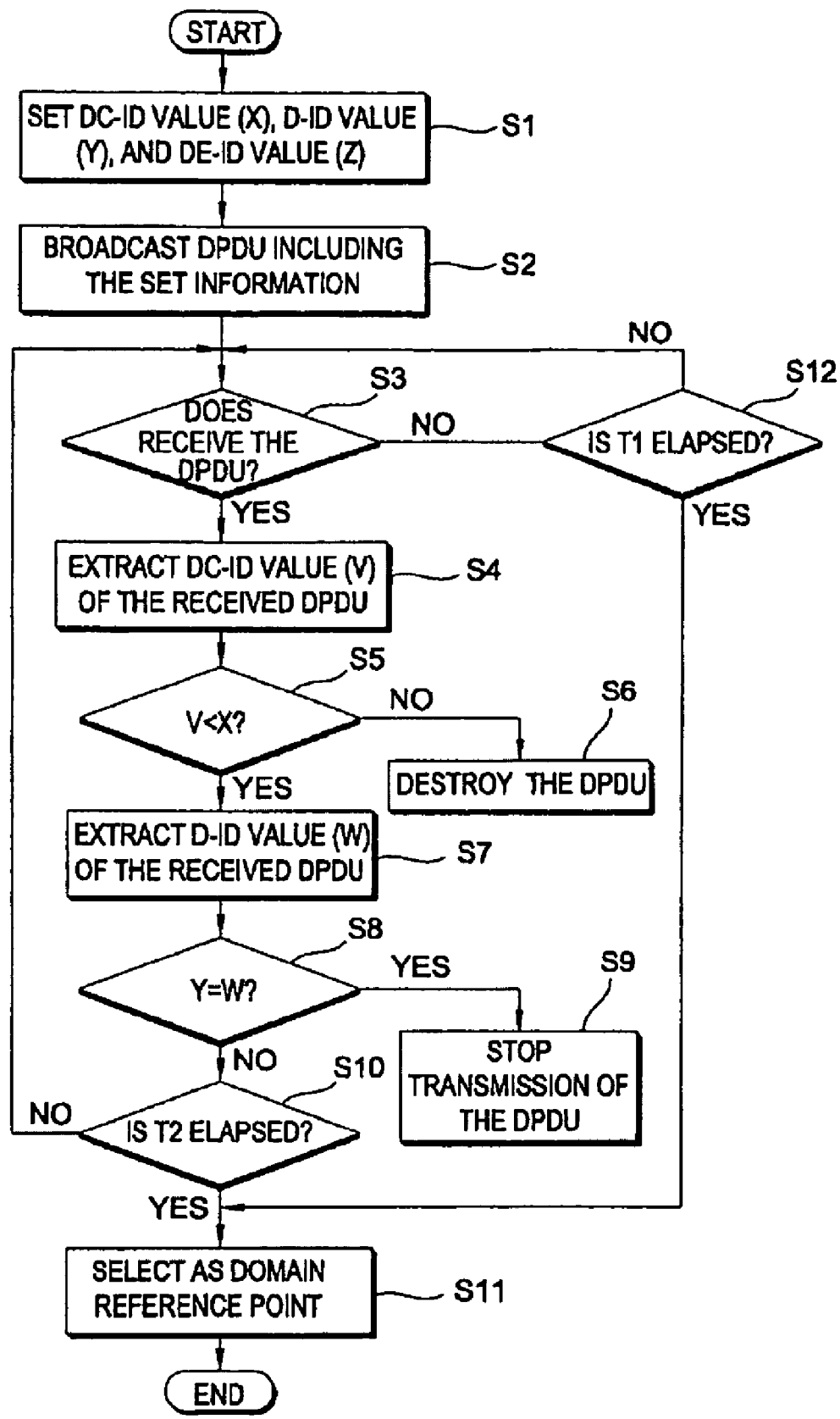
FIG. 7 is a flowchart illustrating procedures of automatically selecting a reference point controller by using the DPDU.

FIG. 7 is a flowchart illustrating procedures of automatically selecting a reference point controller by using the DPDU.

Referring to FIG. 7, when the procedure starts, devices (for example, client devices) to subscribe to a domain set DC-ID values X, D-ID values Y, and DE-ID values Z to predetermined values (operation S1).

At this time, the DC-ID set values are allocated according to a predetermined standard or are generated in the corresponding devices. The two cases will be separately described in the following.

1. A Case where the DC-ID Values are Allocated by the Administrator According to the Predetermined Standard The administrator recognizes the capability information of each device by using a predetermined management device, transforms the capability information into the capability value according to the predetermined standard, and allocates the capability value to the DC-ID value of the device. At this time, the management device may be a predetermined device in the domain, a device located at another communicable location, or a predetermined system in a network area (for example, a domain manager).

For example, when the DC-ID value is determined based on the residual energy amount, the administrator checks the battery residual amount of each device in the domain, the battery residual amount is represented as numbers according to a predetermined standard, and the DC-ID values are allocated to the devices. Then, the DC-ID values of the devices are determined, that is, the DC-ID of the device A is 4, the DC-ID of the device B is 8, and the DC-ID of the device C is 2.

2. A Case where the DC-ID Values are Generated Through the Corresponding Devices Each device recognizes the capability information, the capability information is transformed into the capability value according to previously stored information, and the capability is set to the DC-ID value.

For example, when the DC-ID value is determined based on the energy residual amount, the device checks the battery residual amount, and the battery residual amount is represented as numbers according to a previously stored battery residual amount-energy residual amount mapping table, and the DC-ID values are generated. Then, the DC-ID values of the devices are determined, that is, the DC-ID value of the device A is 4, the DC-ID of the device B is 8, and the DC-ID of the device C is 2. At this time, the battery residual amount-energy residual amount mapping table may be received from a management device and stored. Alternatively, the battery residual amount-energy residual amount mapping table may be stored, when a product is manufactured.

In Example 1-1, it is assumed that as the battery capacity is high, the DC-ID value is set to be small. In this case, as the DC-ID value becomes small, the device has a high capability. However, the present invention is not limited thereto. Alternatively, it may be assumed that as the battery capacity is small, the DC-ID value is set to be small.

In addition, the capability ability of the device may be constructed with hardware specifications, a network connection speed, a networking capability, mobility to outside, stability of a system, a computing power, a resource consumption amount, and the like, in addition to the energy residual amount. The DC-ID value may be not a simple number but various types of information.

On the other hand, the D-ID is set as a unique number or information data for displaying a domain to which a device subscribes. In addition, the DE-ID value of each device is initialized as codes for distinguishing the devices from one another. The D-ID value and the DE-ID value may be allocated by the administrator or may be generated by the corresponding device.

As described above, when setting the DC-ID and the D-ID is completed for each device, the device sequentially broadcasts or multicasts the DPDU including the set information to neighboring devices (operation S2).

Then, the device can receive the DPDU transmitted from another device (operation S3). When a predetermined device receives the DPDU, the corresponding device extracts the DC-ID value V included in a domain header of the received DPDU (operation S4) and compares the extracted DC-ID value with the DC-ID value X of the device (operation S5). On the other hand, when the DPDU is not received, it is determined whether the set time T1 is elapsed (operation S12). V represents the DC-ID value of the DPDU which is received from another device. In the device which transmits the DPDU, the DC-ID value may be X.

As the comparison result of the DC-ID value, when the DC-ID value of the device is less than the received DC-ID value, the device destroys the received DC-ID value (operation S6). In this case, this is because the device that receives the DC-ID has a higher energy capacity, which is the capability, than the device that transmits the DC-ID.

On the other hand, as the comparison result of DC-ID value, when the DC-ID value of itself is greater than the received DC-ID value, the device extracts the D-ID information W included in the domain header of the received DPDU (operation S7) and checks whether the extracted D-ID information W is the same as the D-ID information Y of itself (operation S8). The reference point controller can be selected one by one in the same domain by checking the received D-ID information. W represents the D-ID value of DPDU which is received from another device. In the device which transmits the DPDU, the DC-ID value may be Y.

As the checking result of D-ID, when the received D-ID is the same as the D-ID of the device, the device stops broadcasting of the DPDU (operation S9). This is because a device which has a high capacity value is located in the same domain. This may represent that the device fails in the selection of the reference point controller.

On the other hand, as the checking result of the D-ID, when the received D-ID is different from the d-ID of the device, the device considers the received DPDU as the DPDU received from a device in another domain and successively broadcasts the DPDU. At this time, the device transmits the DPDU to another device and checks whether the set time T2 is elapsed (operation S10).

At this time, when the DPDU is not received any more within the set time T2 or when the DPDU in which the DC-ID is less than the DC-ID value of the device and in which the D-ID is the same as the D-ID of the device is not received, the device has the highest capability in the domain. Accordingly, the device is selected as the reference point controller which is a representative in a domain (operation S11). The device selected as the reference point controller reports to the domain manager that the device is selected as the reference point controller. The device is registered as the reference point controller. Here, the registration procedure will be described with reference to FIG. 13.

Software which can perform a function of the reference point controller may be installed in the device that is selected as the reference point controller. The software is previously installed in the device in a disabled status. When the device is selected as the reference point controller, the software is enabled and established according to a command of the domain manager. Alternatively, the domain manager or another device may upload the software which can perform the function of the reference point controller to the selected device. It is assumed that the domain devices which join in the procedure of selecting the reference point controller satisfy basic conditions for performing the function of the reference point controller. At this time, the basic conditions may represent that the disabled software is included or that hardware of software specifications in which a function of the reference point controller can be performed are satisfied.

As described above, according to Example 1-1 related to the selection of the reference point controller, the device with the highest capability can be selected as the reference point controller by exchanging DPDU data packets among devices. The aforementioned description is an example. The setting of the capability through the DC-ID, the comparison of the capability, and the like may be changed without departing from the spirit and scope of the present invention.

EXAMPLE 1-2

Hereinafter, Example 1-2 that is another example of a method of selecting a reference point controller will be described.

In the method of selecting a reference point controller of Example 1-2, the devices (for example, client devices), which desire to be registered with the domain, report the device information of the devices to the domain manager, and the domain manager selects the reference point controller based on the reported device information. At this time, the device information may include information on the domain, which the device subscribes to, information on the capability of the device, identification information of the device, and the like. For example, the device information may be a DPDU.

Figure 8:
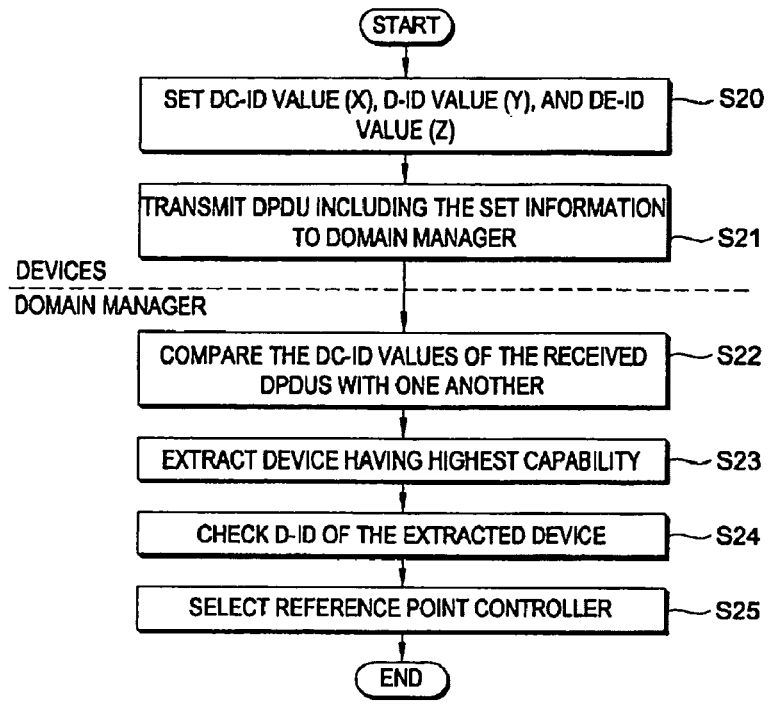
FIG. 8 is a flowchart illustrating a method of selecting a reference point controller according to Example 1-2.

FIG. 8 is a flowchart illustrating a method of selecting a reference point controller according to Example 1-2.

Referring to FIG. 8, when the procedure starts, the devices to subscribe a domain set DC-ID values X, D-ID values Y, and DE-ID values Z to predetermined values (operation S20). At this time, the DC-ID set values are allocated according to a predetermined standard or generated by the corresponding devices.

For example, when the standard of the DC-ID values is specifications of a central processing unit (CPU) embedded in the device, the DC-ID value of each device is allocated by the administrator. Alternatively, the DC-ID value of each device is set as the generated capability value. For example, the DC-ID value of the device A is 4, the DC-ID value of the device B is 2, the DC-ID value of the device C is 3, and the DC-ID value of the device D is 8.

At this time, as the specifications of the CPU is high, the DC-ID value is assumed to be small. Specifically, as the DC-ID value becomes small, the device has a high capability. However, the present invention is not limited thereto. Alternatively, it may be assumed that the DC-ID value is set to be small as the battery capacity is small. In addition, according to execution environments, information on other hardware except the CPU, energy information, and the like can be applied to the capability of the device in various types.

The D-ID is set as a unique number or information data for displaying a domain which a device subscribes to. In addition, the DE-ID value of each device is initialized as codes for distinguishing the devices from one another. The D-ID value and the DE-ID value may be allocated by the administrator or generated by the corresponding device.

As described above, when setting of the DC-ID and the D-ID is completed for each device, the device transmits the DPDU including the set information to the domain manager (operation S21). The DPDU may be transmitted within a predetermined time. The domain manager maintains a standby state during the predetermined time. When the predetermined time is elapsed, the domain manager does not receive the DPDU any more.

The domain manager compares the DC-ID values included in the domain header of the DPDU received from the devices with one another (operation S22) and extracts the device having the smallest DC-ID value, that is, the device having the highest capability (operation S23). When the device having the highest capability is extracted, the domain manager checks the D-ID of the device (operation S24) and checks whether the D-ID is the same as an ID of the domain to be newly formed. When the D-ID is the same as the ID of the domain to be newly formed, the device is selected as the reference point controller (operation S25). As described in Example 1-1, the function of the reference point controller may be installed in the device selected as the reference point controller.

As the D-ID check result, when the D-ID of the device is not the ID of the domain to be newly formed, DC-ID values of the devices except the corresponding device are compared with one another, and the device having the highest capability is searched for. The device having the highest capability can be selected as the reference point controller.

On the other hand, in the aforementioned Example 1-2, the reference point controller is selected based on the capability of each device. Alternatively, the reference point controller may be selected based on a degree of matching with the reference information, setting of a user, and the like, in addition to the capability.

For example, when the devices, which desire to be registered with the domain, transmits the device information including information on hardware specifications of the devices to the domain manager, the domain manager may select the most suitable devices by comparing the transmitted device information with the predetermined specification information. In addition, the domain manager may select a device matched with the device information, which is previously determined by the user among the device information transmitted from each device, as the reference point controller.

EXAMPLE 1-3

In a method of selecting a reference point controller according to Example 1-3, the reference point controller is selected based on setting information that is previously set by an administrator or user or is arbitrarily set. For example, when the administrator or user inputs the setting information into the domain manager, the domain manager can select the reference point controller based on the setting information. Alternatively, the administrator or user may directly select the device to be used as the reference point controller by the user and establish the reference point controller. Accordingly, in Example 1-3, the device desired by the administrator or user is selected, or any device is selected as the reference point controller.

The method of selecting the reference point controller, which is to determine a range of the local area, when the domain is initially constructed, has been described through Examples 1-1 to 1-3. When the reference point controller is selected, the range of the local area in which the client subscribes to the domain in the local status can be determined by the reference point controller.

On the other hand, the domain manager or license manager may exist at any location in the local area or external network area. When the domain manager or license manager exists in the external network, a secured communication means reliably interacting with the domain has to be supported.

On the contrary, since the reference point controller is an entity which determines the range and environments of the local area in the local area, the reference point controller has to exist in the local area, unlike the domain manager or license manager. At this time, the reference point controller periodically and continuously communicates information signals with the domain manager so as to verify that the reference point controller normally operates.

When the domain manager does not receive any information signal from the reference point controller for a predetermined time, this represents that the reference point controller does not normally operate. Specifically, the reference point controller is out of order. Alternatively, the reference point controller becomes out of order since the reference point controller enters an external non-communication area.

In this case, the client devices in the local area, which subscribe to the domain, may not normally use contents. Practically, since the reference point controller may be installed in a mobile phone, a personal digital assistant (PDA), and the like, the reference point controller may enter the external non-communication area. In this case, the reference point controller may malfunction.

Accordingly, in the present invention, a method of preparing against the malfunction of the reference point controller is disclosed. At first, a concept of a reference point controller candidate is introduced. The reference point controller candidate indicates a device which replaces the reference point controller, when the reference point controller malfunctions. The reference point controller candidate may be selected, when the domain is initially constructed or selected according to the domain manager, after the domain is constructed.

-Selection and Operation of a Reference Point Controller Candidate-

There are four methods of selecting a reference point controller candidate.

There is a first method in which the devices except the current reference point controller among the devices in the domain communicate device information with one another. The device information is compared with one another based on a predetermined algorithm, for example, the algorithm described in Example 1-1, and the reference point controller candidate is selected. For example, the capabilities are communicated among the devices. The device having the highest capability is selected as the reference point controller candidate. The selected reference point controller candidate reports to the domain manager that the device is selected as the reference point controller candidate.

There is a second method in which the devices in the domain provide the device information on the devices (for example, the DPDU including the capabilities) to the domain manager, and the domain manager selects the reference point controller candidate based on the device information, similar to the selection of the reference point controller according to aforementioned Example 1-2.

There is a third method in which the devices in the domain provides the device information of the devices to the reference point controller, and the reference point controller selects the reference point controller candidate based on the device information. In this case, when the reference point controller is selected, the reference point controller has to report information on the selected reference point controller candidate to the domain manager.

There is a fourth method in which the reference point controller candidate is selected based on the predetermined information. At this time, the predetermined information may be set by the administrator or user. Alternatively, the predetermined information may include arbitrarily set information.

Hereinafter, the aforementioned four methods will be described in detail. For convenience of understanding, the aforementioned first method of selecting a reference point controller candidate is referred to as Example 2-1. The second method of selecting a reference point controller candidate is referred to as Example 2-2. The third method of selecting a reference point controller candidate is referred to as Example 2-3. The fourth method of selecting a reference point controller candidate is referred to as Example 2-4.

EXAMPLE 2-1

Figure 9:
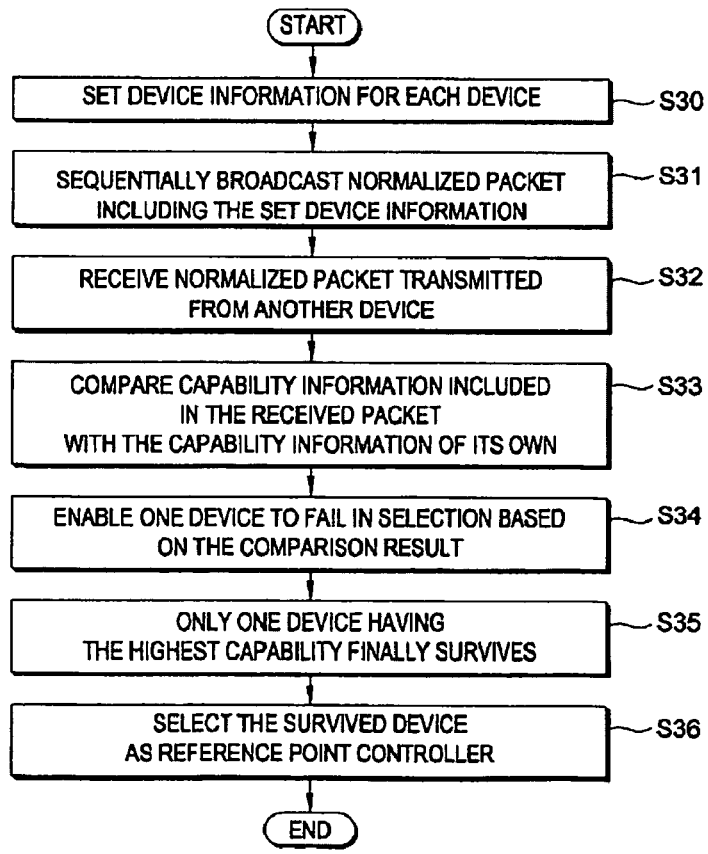
FIG. 9 is a flowchart illustrating a procedure of selecting a reference point controller candidate according to Example 2-1.

FIG. 9 is a flowchart illustrating a procedure of selecting a reference point controller candidate according to Example 2-1. FIG. 9 illustrates a procedure of automatically selecting a reference point controller by using a capability of a device.

The procedure of selecting the reference point controller candidate according to Example 2-1 may start, after the procedure of selecting the reference point controller is completed, when the domain is constructed. Alternatively, the procedure of selecting the reference point controller candidate according to Example 2-1 may start according to a start command of an entity such as the domain manager at any time after the domain is constructed.

As shown in FIG. 9, when the procedure starts, the devices except the reference point controller among the devices in the domain set the device information (operation S30).

The device information may include information on the capability, information on the domain, identification information of the device, and the like. Here, the information on the capability may include information on the energy residual amount of the device, a hardware specification, a network connection speed, mobility to outside, stability of a system, and the like. In addition, the information on the capability may be a number like the DC-ID value. Alternatively, the information on the capability may be various types of information.

When setting of the device information (capability information, domain information, device identification information) for each device is completed, the device makes the set information into normalized packets, for example the device inserts the set information into the DPDU and sequentially broadcasts or multicasts the DPDU to another device (operation S31).

Then, each device receives the normalized packet transmitted from another device (operation S32), compares the capability information included the received packet with the capability of the device (operation S33), and enables one device (the device that transmits the packet or device that receives the packet) to fail in the selection (operation S34).

For example, the device, which receives the packet, compares the capability information of the received packet with the capability information of the device. When the capability information of the received packet is greater than the capability of the device, the device stops broadcasting the DPDU. That is, the device that receives the packet fails in the selection of the reference point controller candidate. At this time, a procedure of checking whether the device that transmits the packet is in the same domain as the device that receives the packet from the information on the received packet may be also performed. On the other hand, when the capability information of the received packet is less than the capability of the device that receives the packet, the packet is destroyed. That is, the device that transmits the packet fails in the selection of the reference point controller candidate.

Finally, only a device having the highest capability remains through the aforementioned procedure (operation S35). Then, the survived device is selected as the reference point controller candidate (operation S36). The selected device reports to the domain manager that the device is selected as the reference point controller candidate.

The domain manager manages the information on the selected reference point controller candidate. When an error occurs in the reference point controller, the reference point controller candidate can be used as a new reference point controller.

On the other hand, a plurality of reference point controller candidates may be registered with the domain manager, in priority order. Specifically, a procedure of selecting a first reference point controller candidate is performed, and the first reference point controller candidate is registered. A procedure of selecting a second reference point controller candidate is performed, and the second reference point controller candidate is registered. The aforementioned procedures are repeatedly performed, and desired number of reference point controller candidates can be registered.

When the plurality of reference point controller candidates are registered, the reference point controller can be replaced in the priority order. At this time, the registered plurality of reference point controller candidates have to periodically verify that the reference point controller candidates normally operate. A procedure of verification will be described in detail later.

EXAMPLE 2-2

In a method of selecting a reference point controller candidate according to Example 2-2, the devices in the domain reports the device information of the devices to the domain manager, and the domain manager selects the reference point controller candidate based on the reported device information.

The method is similar to the concept of selection of the reference point controller according to Example 1-2. In Example 1-2, the devices to subscribe to the domain reports the device information of the devices to the domain manager, and the domain manager selects the most suitable device based on the reported device information and registers the selected device as the reference point controller.

In Example 2-2, the devices in the domain except the reference point controller provides device information of the devices to the domain manager, and the domain manager selects the most suitable device based on the reported device information and registers the selected device as the reference point controller candidate. [219] At this time, the device information may include the capability information which represents the capability of the device according to a predetermined standard. The domain manager can register the devices by assigning priorities to the devices based on the capability information provided by the devices in the descending order of the capabilities.

For example, the domain manager can select and register a plurality of reference point controller candidates in the order of the first reference point controller candidate which can firstly replace the reference point controller, the second reference point controller candidate, and the third reference point controller candidates, according to the capability information of each device. When the plurality of reference point controller candidates are registered, the reference point controller candidates replace the reference point controller in the allocated priority order.

On the other hand, the procedure of selecting the reference point controller candidate may be performed after the reference point controller is selected. The reference point controller candidates may be selected, when the procedure of selecting the reference point controller disclosed in Example 1-2 is performed, according to execution environments. That is, the first reference point controller candidate, the second reference point controller candidate, and the like are selected, when the reference point controller is selected. For example, the devices to subscribe to the domain, when the domain is constructed, reports the information on the capability to the domain manager, and the domain manager can select the reference point controller, the first reference point controller candidate, the second reference point controller candidate, and the like, based on the reported capability.

EXAMPLE 2-3

In a method of selecting the reference point controller candidate according to Example 2-3, the devices in the domain reports the device information of the devices to the domain manager, and the reference point controller selects the reference point controller candidates based on the reported device information.

The method of selecting the reference point controller candidate according to Example 2-3 is substantially the same as the method of selecting reference point controller candidates according to Example 2-2 except that the reference point controller selects the reference point controller candidates.

The device information reported to the reference point controller may include the capability information which represents the capability of the device. The reference point controller can register the devices by assigning priorities to the devices based on the capability information reported by the devices in the descending order of the capabilities. For example, the reference point controller can select and register a plurality of reference point controller candidates in the order of the first reference point controller candidate which can firstly replace the reference point controller, the second reference point controller candidate, and the third reference point controller candidate, according to the capability information of each device. When the plurality of reference point controller candidates are registered, the reference point controller candidates can replace the reference point controller in the priority order.

On the other hand, when the reference point controller is selected, the reference point controller registers the selected reference point controller candidate to the domain manager.

In addition, even when the plurality of reference point controllers are selected in the priority order, the reference point controller reports the selection history to the domain manager. Accordingly, event when the reference point controller is out of order or enters a non-communication area for a long time, the reference point controller candidate replaces the reference point controller. Thus, the service is normally provided.

EXAMPLE 2-4

In a method of selecting the reference point controller according to Example 2-4, the reference point controller candidate is selected based on setting information that is previously set by the administrator or user or is arbitrarily set. For example, when the administrator or user inputs the setting information into the domain manager or reference point controller, the domain manager or reference point controller can select the reference point controller based on the setting information.

The setting information may include the information on the plurality of reference point controller candidates to which the priorities are assigned. Specifically, the domain manager or reference point controller can select the plurality of reference point controller candidates in the priority order included in the setting information. For example, a device A is selected and registered as a first reference point controller candidate, and a device B is selected and registered as a second reference point controller candidate. Then, when an error occurs in the reference point controller, the first reference point controller candidate can replace the reference point controller. When an error occurs in the first reference point controller candidate, the second reference point controller candidate can replace the first reference point controller candidate.

In a case where the domain manager selects the reference point controller candidates, when the domain is constructed, the domain manager selects the reference point controller and designates the reference point controller candidates in the predetermined priority order at the same time. Then, when the reference point controller is out of order, it is possible to flexibly and rapidly cope with the error. On the other hand, in a case where the reference point controller selects the reference point controller candidates, after the reference point controller is selected, the reference point controller can designate the candidates to replace the reference point controller based on the setting information.

On the other hand, the administrator or user may directly select a device to be used as a reference point controller candidate without using the domain manager or reference point controller. In this case, the selected reference point controller candidate has to report to the domain manager that the device is selected as the reference point controller candidate.

The method of selecting the reference point controller candidates has been described through Examples 2-1 to 2-4. In a case where the reference point controller is selected, even when an error occurs in the reference point controller, the reference point controller candidate can replace the reference point controller. In addition, stability and flexibility of the service in the domain can be secured by setting the plurality of reference point controller candidates in the predetermined priority order.

The reference point controller candidates may have following functions.

1. A function of the reference point controller: for example, measurement of proximity to a predetermined device and issuing a domain credential, and the like. The function of the reference point controller has been previously described.

2. A function of transmitting and receiving an information signal: the reference point controller candidate has to communicate the information signal for reporting that the reference point controller candidate normally operates with the reference point controller and the like through a predetermined interface.

3. A function of setting non-receiving conditions: a function of setting conditions for distinguishing non-receiving of the information signal. For example, a time out, a count limit, a range limit, and the like may be set.

4. A function of reporting to the domain manager: a function of supporting a data structure and an interface for communicating with the domain manager.

5. A function of downloading: a function of supporting an interface for downloading an entity (software) from the domain manager or predetermined service terminal.

On the other hand, the reference point controller has to periodically verify that the reference point controller normally operates to the domain manager or other devices. In addition, the reference point controller candidates have to periodically verify that the reference point controller candidates normally operate to the domain manager or other devices. This is because the reference point controller candidate may not replace the referent point controller, when an error occurs in the reference point controller candidate.

Figure 10:
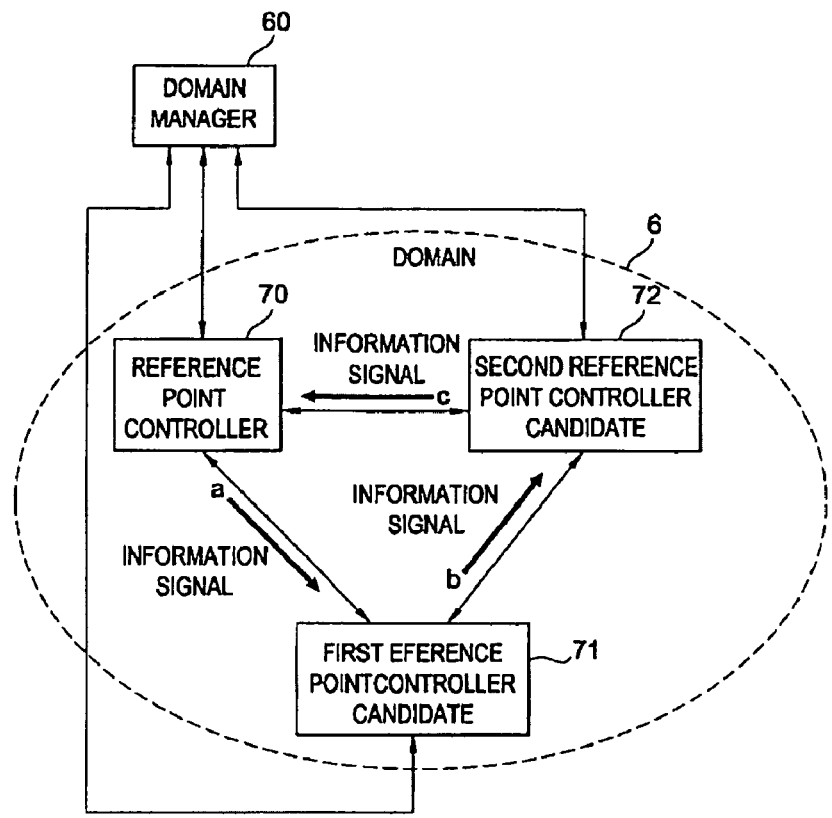
FIG. 10 is a block diagram illustrating a reference point controller and connections among reference point controller candidates for transmitting an information signal.

FIG. 10 is a block diagram illustrating a reference point controller and connections among reference point controller candidates for transmitting an information signal.

As shown in FIG. 10, designated routes a, b, and c for transmitting an information signal are formed between a reference point controller 70 and reference point controller candidates 71 and 72 in the domain 6. The routes a, b, and c for transmitting an information signal represent routes for transmitting an information signal for verifying whether a device normally operates.

For example, in the routes a, b, and c for transmitting an information signal, the reference point controller 70 transmits an information signal to a first reference point controller 71, and the reference point controller candidate 71 transmits an information signal to a second reference point controller 72. In addition, the second reference point controller candidate 72 transmits an information signal to the reference point controller 70. At this time, the first reference point controller candidate 71 denotes a primary reference point controller candidate, and the second reference point controller candidate 72 denotes a secondary reference point controller candidate.

A safe communication means or channel has to be provided in the routes a, b, and c for transmitting an information signal. In order to form the safe communication means or channel, various encryption methods may be used. For example, a public key method, a method of previously sharing a key, a method in which the domain manager provides information on a key to the devices, and the like may be used. Alternatively, a content transmission controller can provide information on a key, when secure authenticated channels among a content exporter, a content transformer, and a content importer are generated.

A transmission signal is periodically transmitted through the routes a, b, and c for transmitting an information signal. The transmission signal serves to verify that the reference point controller or reference point controller candidate normally operates. The transmission signal may include domain information, device identification information, system information, time-out information, and the like.

Here, the time-out information relates to a time limit for determining whether the information signal is normally received.

For example, when the information signal is not received from the reference point controller 70 within the time limit, the first reference point controller candidate 71 determines that an error occurs in the first reference point controller 70. The first reference point controller candidate 71 reports to a domain manager that an error occurs in the reference point controller 70 and that the first reference point controller candidate 71 replaces the reference point controller 70. Then, the first reference point controller candidate 71 performs the function of the reference point controller 70.

At this time, the first reference point controller candidate 71 can receive information and tools needed for performing the function of the reference point controller from the domain manager 60 or another terminal. For example, the first reference point controller candidate 71 may download and install software for performing the function of the reference point controller or may enable disabled software installed therein.

For another example, when the reference point controller 70 does not receive the information signal from the second reference point controller candidate 72 within the time limit, the reference point controller 70 determines that an error occurs in the second reference point controller candidate 72 and reports to the domain manager 60 that an error occurs in the second reference point controller candidate 72. Then, a reference point controller candidate having a lower priority than the second reference point controller candidate, for example a third reference point controller candidate (not shown) can replace the second reference point controller candidate 72. The priorities may be newly reconstructed through the aforementioned procedures (Examples 2-1 to 2-4) of selecting reference point controller candidates.

Figure 11:
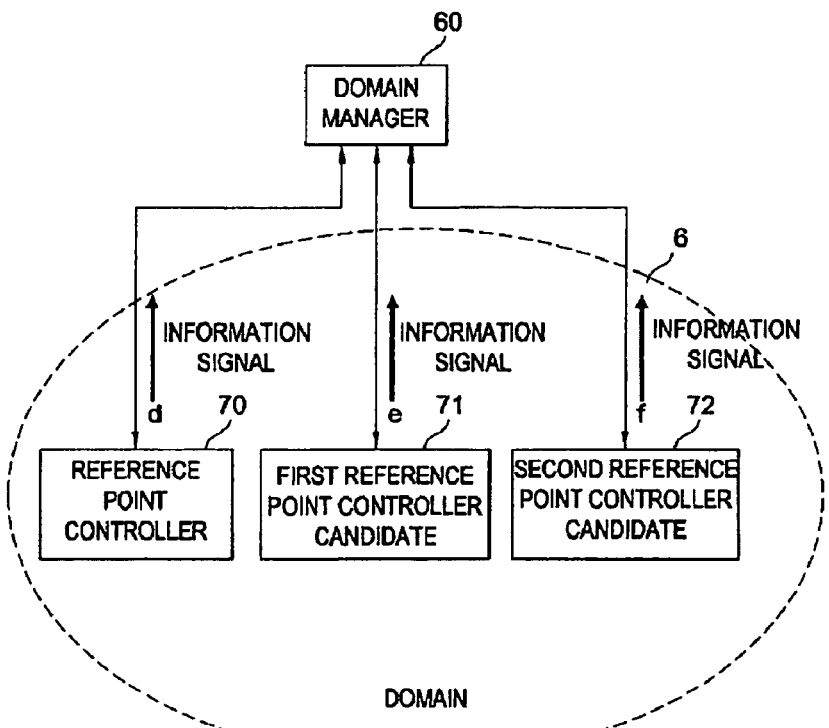
FIG. 11 is a block diagram illustrating an example in which a typical domain device and typical domain candidate devices transmit an information signal.

On the other hand, in the example shown in FIG. 10, it is determined whether an error occurs in the device through transmission of an information signal among the reference point controller 70, and the reference point controller candidates 71 and 72. The present invention is not limited thereto. As shown in FIG. 11, the reference point controller 70 and the reference point controller candidates 71 and 72 may directly transmit an information signal to the domain manager 60 through routes e, f, and c. For another example, the reference point controller 70 may directly transmit an information signal to the domain manager 60, and the reference point controller candidates 71 and 72 may transmit an information signal to each other through a predetermined route. That is, the routes for transmitting an information signal may be variously changed according to execution environments.

As described above, the reference point controller 70 and the reference point controller candidates 71 and 72 periodically verify that they normally operate by using an information signal. The reference point controller 70 is replaced, or the priorities of the reference point controller candidates 71 and 72 may be reconstructed depending on whether the information signal is received.

On the other hand, a range of the local area determined by a single reference point controller is physically or logically limited due to a political reason, and the like. However, a user may desire to use a content service in a more extended range than that of the currently set local area. Accordingly, there is required a method in which a service area can be extended while the limit of the range of the local area is maintained.

In the present invention, there is introduced a concept of a reference point controller proxy. The reference point controller proxy represents a device which performs the function of the reference point controller instead of the reference point controller. The reference point controller proxy is needed when the domain is extended or when the reference point controller temporarily moves outside.

-Selection and Operation of the Reference Point Controller Proxy-

Figure 12:
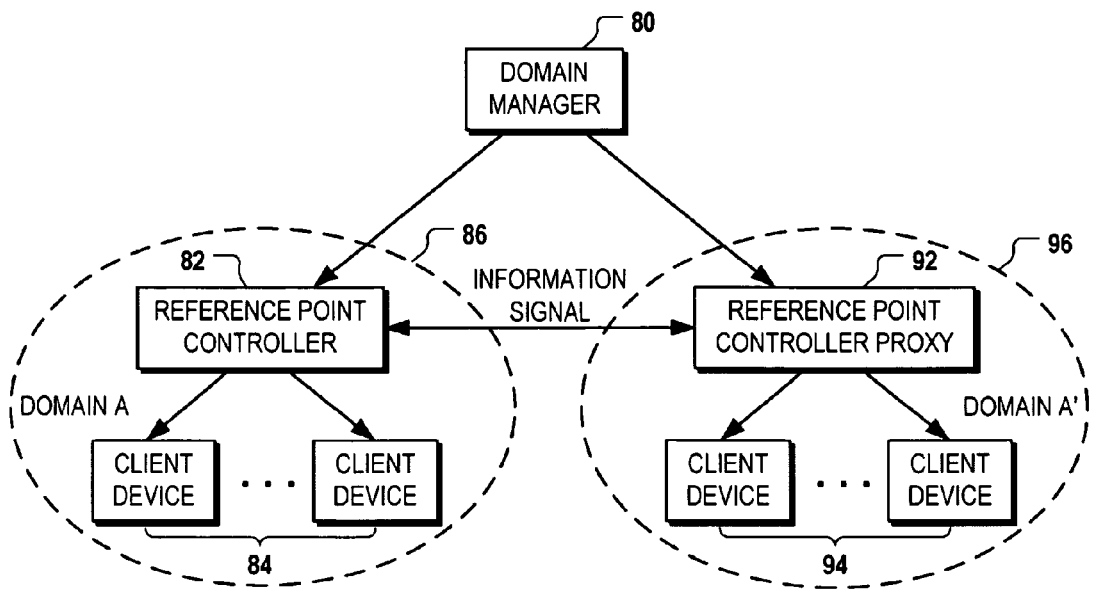
FIG. 12 is a block diagram illustrating a concept of a reference point controller proxy.

FIG. 12 is a block diagram illustrating a concept of a reference point controller proxy. FIG. 12 illustrates an example in which a domain A' is added to a domain A.

As shown in FIG. 12, a range and an environment of a local area in which a device can subscribe to a domain 86 is determined by a reference point controller 82. When a service area is extended or the reference point controller 82 temporarily moves outside of the local area, an extended domain having the same authority as the domain A, for example, the domain A' 96 has to be generated.

The range and the environment of the local area in which a device can subscribe to the domain A' 96 can be determined by a reference point controller proxy 92. The reference point controller proxy 92 performs the function of the reference point controller in the domain A' 96. That is, the reference point controller proxy 92 is a reference point in the domain A' 96. The user can receive a content service from the domain A' 96 in addition to the domain A 86 through client devices 84 and 94.

The reference point controller proxy 92 is easily selected through the procedures described in the aforementioned examples of selecting the reference point controller and the reference point controller candidates. That is, methods of selecting the reference point controller proxy 92 will be described in the following.

In a first method, the devices to subscribe to the domain A' 96 communicate device information with one another. The device information is compared with one another according to a predetermined algorithm, for example, the algorithm described in Example 1-1. The reference point controller proxy 92 is selected based on the device information. For example, the capabilities are communicated among the devices. The device having the highest capability is selected as the reference point controller proxy 92. The selected reference point controller proxy 92 reports to the domain manager 80 that the device is selected as the reference point controller proxy 92.

In a second method, similarly to the concept of selecting the reference point controller according to Example 1-2, the devices to subscribe to the domain A' provide the device information (for example, the DPDU including the capability information) of the devices to the domain manager, and the domain manager 80 selects the reference point controller proxy 92 based on the device information.

In a third method, the reference point controller proxy 92 is selected based on setting information that is previously set by administrator or user or is arbitrarily set.

On the other hand, when the reference point controller proxy 92 is selected, a candidate for preparing against a case where an error occurs in the reference point controller proxy 92 may be selected. That is, a candidate, which replaces the reference point controller proxy 92 when an error occurs in the reference point controller proxy 92, is selected. The candidate of the reference point controller proxy can be easily selected by using the aforementioned procedures of selecting the reference point controller candidates.

Methods of selecting the candidate of the reference point controller proxy 92 will be described in the following.

In a first method, the devices to subscribe to the domain A' 96 communicate device information with one another. The device information is compared with one another according to a predetermined algorithm, for example, the algorithm described in Example 1-1. The reference point controller proxy 92 and the candidate of the reference point controller proxy 92 are selected based on the device information. For example, the capabilities are communicated among the devices. The device having the highest capability is selected as the reference point controller proxy 92. Subsequently, the candidate of the reference point controller proxy is selected by communicating the capabilities among the devices except the reference point controller proxy 92. There are priorities in the candidates of the reference point controller proxy. In addition, the selected reference point controller proxy 92 and the selected candidate of the reference point controller proxy 92 have to report to the domain manager 80 that the devices are selected as the reference point controller proxy 92 and the candidate of the reference point controller proxy 92.

In a second method, similarly to the concept of selecting the reference point controller according to Example 1-2, the devices to subscribe to the domain A' provide the device information (for example, the DPDU including the capability information) of the devices to the domain manager, and the domain manager 80 selects the reference point controller proxy 92 and the candidate of the reference point controller proxy 92 based on the device information. At this time, there may be priorities in the candidates of the reference point controller proxy 92.

In a third method, the reference point controller proxy 92 and the candidates of the reference point controller proxy 92 are selected according to the priorities. At this time, the predetermined information may be set by the administrator or user. Alternatively, the predetermined information may include arbitrarily set information.

On the other hand, the reference point controller proxy 92 has to report to the reference point controller 82 that the reference point controller proxy 92 continuously and stably provides a service. The reference point controller proxy 92 periodically communicates a predetermined information signal with the reference point controller 82. When the information signal is not communicated within a predetermined period, the reference point controller proxy 92 is not in a normal status. Accordingly, the domain A' 96 cannot be maintained.

The domain reference information may include domain reference information, device identification information, time-out information, unique system information, and the like.

The information signal has to be transmitted through a wired or wireless transmission route in which a safe communication means or channel is provided. In order to form the safe communication means or channel, various encryption methods may be used. For example, a public key method, a method of previously sharing a key, a method in which the domain manager provides information on a key to the devices, and the like may be used. In addition, the information signal may be continuously communicated between the reference point controller and the domain manager and between the reference point controller proxy and the domain manger, in addition between the reference point controller and the reference point controller proxy.

On the other hand, when the domain A' 96 needs not to be maintained, the domain A' 96 has to be destroyed. In this case, the domain A' 96 can be destroyed by using the information signal. For example, the reference point controller 82 or domain manager 80 stops the information signal to be transmitted to the reference point controller proxy 92 or transmits a destroy signal. Then, since the reference point controller proxy 92 does not normally operate, the reference point controller proxy 92 is destroyed. Accordingly, the domain A' is automatically destroyed.

-Registration of the Reference Point Controller-

Hereinafter, a procedure of registering a new reference point controller will be described. The procedure of registering the reference point controller may be performed when the new domain is generated or when the reference point controller is replaced.

Figure 13:
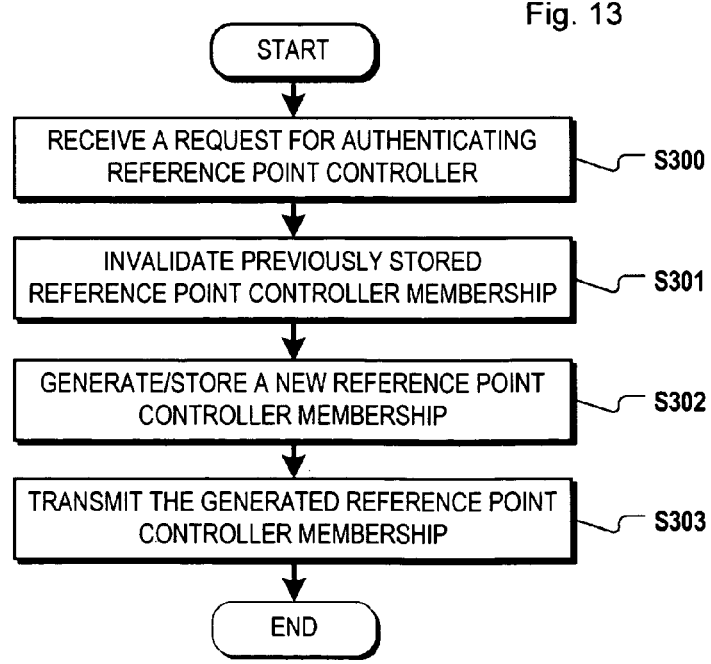
FIG. 13 is a flowchart illustrating a procedure of registering a reference point controller.

FIG. 13 is a flowchart illustrating a procedure of registering a reference point controller.

Referring FIG. 13, the domain manager receives a request for authenticating the reference point controller from a device to be registered as the new reference point controller. At this time, the device to be registered as the new reference point controller may be one of the device selected from the aforementioned procedure of selecting the reference point controller, the reference point controller candidate to replace the existing reference point controller, and the reference point controller proxy.

When the domain manager receives the request for authenticating the reference point controller, the domain manager invalidates an existing reference point controller membership. At this time, the reference point controller membership is generated by the domain manager when the reference point controller is registered. The reference point controller membership may represent information for verifying that the corresponding entity is the reference point controller.

The domain manager generates and stores a unique new reference point controller membership, and transmits the generated reference point controller membership to the device which requests the domain manager to provide the new reference point controller membership. At this time, the domain manager stores and manages the reference point controller membership and the domain as a pair.

The device which receives the reference point controller membership stores the reference point controller membership. The device is registered as the reference point controller. The stored reference point controller membership can be used as authentication element information when the newly registered reference point controller provides various types of information to the domain manager or requests the domain manager to provide the various types of information or when the client is authenticated. In addition, the reference point controller membership is periodically stored while the reference point controller is maintained.

-A Method of Authenticating a Client-

Hereinafter, the method of authenticating the client will be described. Returning to FIG. 5, when the client 3 subscribes to the domain 5, the domain manager 22 generates a client membership that is unique with respect to the client 3. The client membership given to the client 3 is continuously stored, while the client is being a member of the domain 5. When the client 3 secedes from the domain 5, the domain manager 22 maintains the client membership of the client during a predetermined period and removes the client membership. At this time, even when the client 3 secedes from the domain 5, a content that is used before the time out is continuously used during the predetermined period. The predetermined period can be selectively applied by a policy of a provider.

The client has to verify that the client normally subscribes to the domain 5 to a predetermined entity, so that the client 3 which subscribes to the domain 5 uses a service. For this, the client 3 requests the domain manager 22 to authenticate the client 3. When the client 3 requests the domain manager 22 to authenticate the client 3, the client 3 has to submit a clear credential or automatic credential to the domain manager 22.

The clear credential is encrypted information including the client membership given to the client 3 and the clear domain credential. At this time, the clear domain credential is generated by the domain manager 22, when the domain 5 is generated. The domain manager 22 applies the generated domain credential to various transactions for managing the domain after the domain 5 is generated.

The automatic credential is encrypted information including a reference point controller membership and a client membership. The automatic credential may represent the domain credential provided by the reference point controller 26. The reference point controller membership is generated by the domain manager 22, when the reference point controller 26 is registered with the domain 5. The reference point controller membership is continuously stored while the reference point controller 26 is maintained. The automatic credential is information on whether the client 3 normally exists in the local area, which is guaranteed by the reference point controller 26. Accordingly, the client 3 in the local status can use the automatic credential.

When the client 3 requests the domain manager 22 to authenticate the client 3, the domain manager 22 determines whether the submitted credential is valid. When it is determined that the client 3 dose not subscribe to the domain 5, the domain manager 22 generates an error. Alternatively, when the client 3 normally subscribes to the domain 5, the domain manager 22 authenticates the client 3. The client 3 can use a content within an authorized range.

The domain manager 22 recognizes that the client 3 is in the remote status or local status depending on whether the credential submitted by the client 3 is the clear credential or automatic credential and manages the client 3. As described above, the remote status may represent a case where the client 3 accesses the domain 5 in the network area outside of the local area. For example, the client 3 accesses the domain 5 through the Internet. On the other hand, the local status may represent a case where the client 3 exists in the local area. The reference point controller 26 can check the client 3 in the local status by measuring the number of hops. The client 3 may be registered with the domain 5 as a member through the predetermined procedure.

-Registration, Authentication, and Management of a Legacy Device-

The legacy device in addition to the client device can also access to the domain. At this time, the legacy device may represent a device on which an entity that operates as a client in the domain is not completely mounted. Specifically, a device having only some functions of the client or a device in which the client is not included is referred to as the legacy device.

In order to allow the legacy device to be provided with a service in the domain, the client part includes an adapter for allowing the legacy device to access a system, that is, an interface entity. The interface entity has to provide various functions so that the legacy device performs a function equivalent to the client device.

The aforementioned interface entity is referred to as a virtual client. The virtual client is an entity needed to link the legacy device with the system. The virtual client allows the legacy device to be provided with the service like the client device, in linkage with the legacy device. Specifically, the domain manager considers the access of the virtual client and the legacy device to the domain as the access of one client to the domain. One or more legacy devices may be connected to the virtual client.

The virtual client or domain manager can manage unique information of the legacy device. In addition, the virtual client or domain manager also manages information on a user who uses the legacy device.

Figure 14:
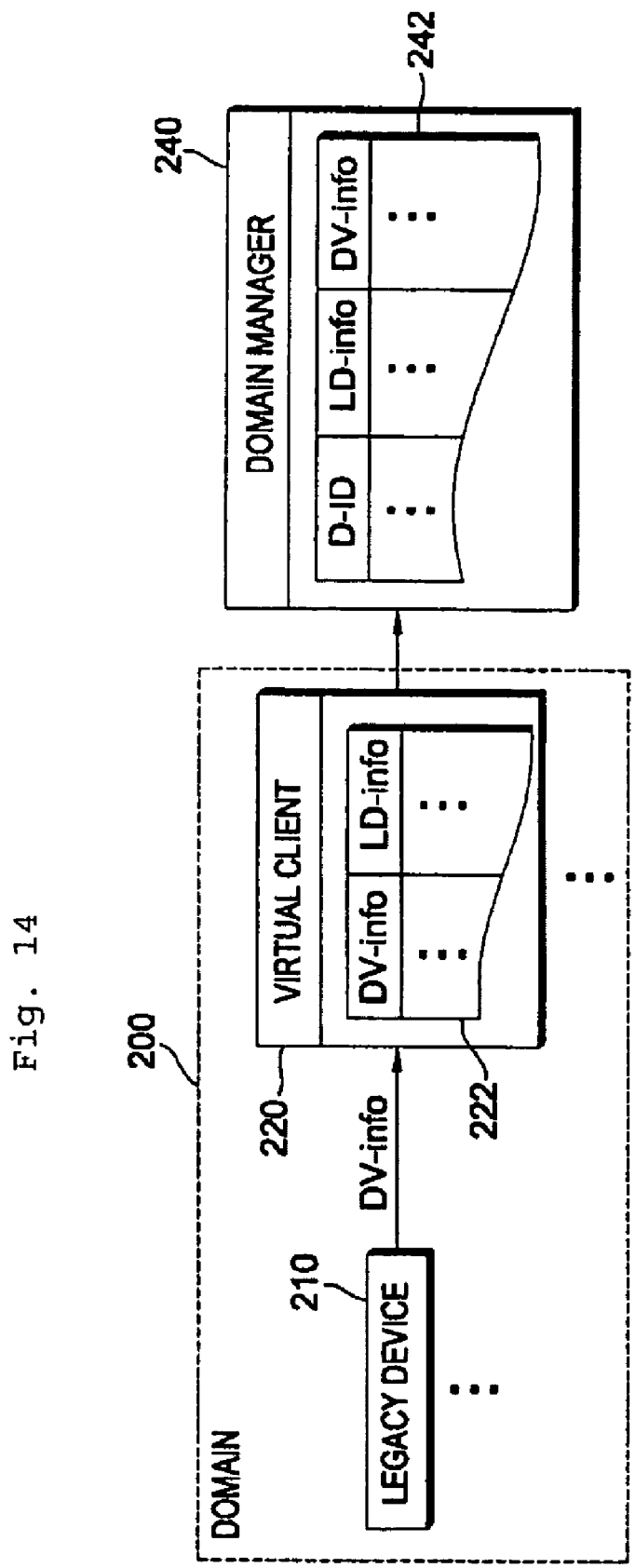
FIG. 14 illustrates an example of a structure for managing unique information of a legacy device.

FIG. 14 illustrates an example of a structure for managing unique information of a legacy device.

As shown in FIG. 14, when a legacy device 210 requests the virtual client 220 to be accessed by the legacy device 210, unique information on the legacy device DV-info is provided to the virtual client. At this time, the unique information DV-info on the legacy device may represent unique information such as a media access control address, a disk volume ID, and the like, which is unique for the legacy device 210.

The unique information DV-info on the legacy device may be transmitted to the virtual client 220 together with the request for an access request message, when the legacy device 210 requests the virtual client to be accessed. Alternatively, the virtual client 220 may extract the unique information DV-info on the legacy device from the legacy device 210, when the legacy device 210 requests the virtual client 220 to be accessed.

The virtual client 220 can store and manage the unique information DV-info on the legacy device provided by the legacy device 210. At this time, as shown in FIG. 14, the unique information DV-info on the legacy device can be stored and managed in a form of an information table 222 in correspondence with a device identifier LD-info. Here, the device identifier LD-info is globally unique identification information for identifying the legacy device 210. The device identifier LD-info may be assigned by the domain manager 240.

The domain manager 240 stores and manages the device identifier LD-info and the unique information DV-info on the legacy device corresponding to the device identifier LD-info for each domain. For example, as shown in FIG. 14, the domain manager 240 can store and manage the domain identifier D-ID, the device identifier LD-info, and the unique information DV-info on the legacy device corresponding to the domain identifier D-ID and the device identifier LD-info in a form of an information table 242. At this time, the domain identifier D-ID is information for identifying the domain accessed by the legacy device 210. The domain identifier D-ID may also be information for identifying the domain 200 in which the virtual client 220 is included.

When the domain manager 240 manages the device identifier LD-info and the unique information DV-info on the legacy device corresponding to the device identifier LD-info, the domain manager 240 can prevent the legacy device 210 from doubly requesting another domain to authenticate the legacy device 210. This will become apparent through a method of authenticating the legacy device to be described in the following.

Figure 15:
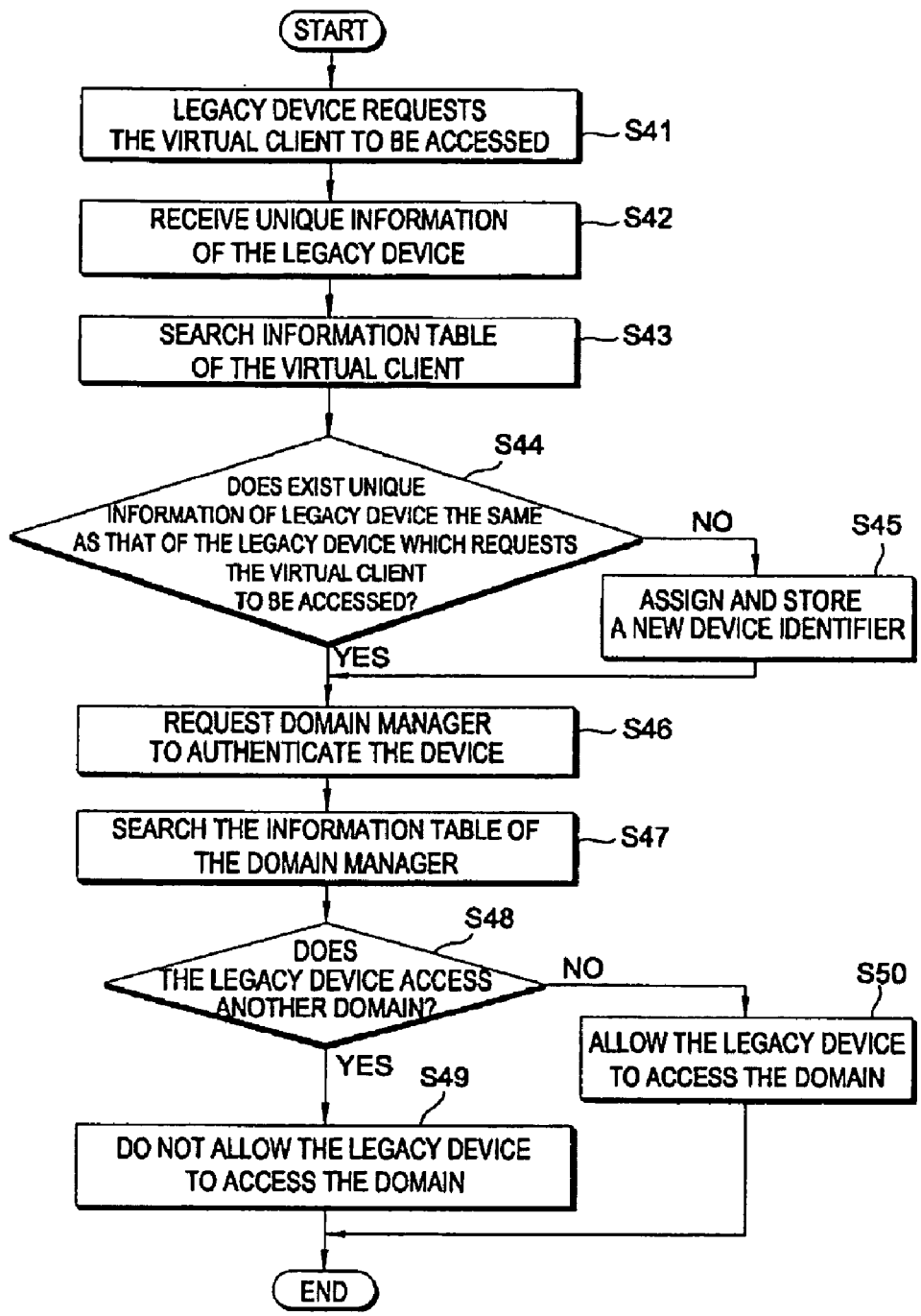
FIG. 15 is a flowchart illustrating a procedure of authenticating a legacy device.

FIG. 15 is a flowchart illustrating a procedure of authenticating a legacy device.

Referring to FIGS. 14 and 15, when a predetermined legacy device 210 requests the virtual client 220 to be accessed (operation S41), the virtual client 220 receives the unique information DV-info on the legacy device from the legacy device 210 (operation S42). Subsequently, the virtual client 220 searches the information table 222 stored therein (operation S43) and determines whether there is unique information on the legacy device that is the same as the unique information DV-info on the legacy device which requests the virtual client 220 to be accessed (operation S44). That is, it is determined whether the legacy device 210 is previously registered.

At this time, when there is the same unique information on the legacy device as the unique information DV-info on the legacy device which requests the virtual client 220 to be accessed, since the legacy device 210 is already registered with the virtual client 220, the virtual client requests the domain manager 240 to authenticate the device identifier LD-info (operation S46). When the domain manager 240 is requested to authenticate the device identifier LD-info, the device identifier LD-info and the unique information DV-info on the legacy device may be provided to the domain manager 240.

On the other hand, when it is determined that there does not exist the same unique information on the legacy device as the unique information DV-info on the legacy device which requests the virtual client 220 to be accessed, the virtual client 220 receives a new device identifier LD-info from the domain manager 240 and stores the new device identifier LD-info in the information table 222 (operation S45). Accordingly, the unique information DV-info on the legacy device and the newly allocated device identifier LD-info are equivalently stored in the information table 222. That is, the legacy device 210 is registered as a new device.

In order to register the legacy device, the virtual client 220 or domain manager 240 examines the unique information on the legacy device 210 and examines whether the legacy device 210 is a device which can be registered. At this time, the device which can be registered may represent a device which is politically and technically allowed device. For example, a service provider, another authority, the domain manger, and the like manage a list of types of the legacy device which can access the domain. When a new legacy device is registered, the virtual client or domain manager examines the list of types of the legacy device and allocates device identifiers only to allowed devices. This will be described in detail with reference to FIG. 17.

When the device identifier LD-info is stored, the virtual client 220 requests the domain manager 240 to authenticate the device identifier LD-info (operation S46).

Next, the domain manager 240 authenticates the device identifier LD-info in consideration of the unique information DV-info on the legacy device corresponding to the device identifier LD-info in response to the request for authentication. Specifically, the domain manager 240 searches the information table that is managed by the domain manager 240 (operation S47) and determines whether the legacy device 210 accesses another domain (operation S48). For example, the domain manager 240 determines whether unique information on a legacy device that is the same as the unique information on the legacy device is currently authenticated.

When it is determined that the legacy device 210 does not access another domain, it is reported to the virtual client 220 that the device identifier LD-info is allowed to access the domain (operation S50). That is, the legacy device 210 is allowed to access the domain. Accordingly, the legacy device 210 can access the domain 200 and use a content.

On the other hand, when it is determined that the legacy device 210 accesses another domain, it is determined that the legacy device intends to doubly access domains. The determination result is reported to the virtual client 220 (operation S49). That is, the legacy device 210 is not allowed to access the domain. Accordingly, the legacy device 210 cannot access the domain 200.

As described above, the virtual client 220 and the domain manager 240 store and manage the unique information on the legacy device 210. For example, the virtual client 220 and the domain manager 240 store and manage a device certificate of the legacy device.

Thus, the legacy device 210 may be prevented from doubly accessing the domain 200. Accordingly, the legacy device 210 can be prevented from illegally sharing a content.

On the other hand, the virtual client and the domain manager may manage information on a user who uses the legacy device in addition to the unique information on the legacy device. In this case, the number of legacy device which can be used by the user may be limited.

Figure 16:
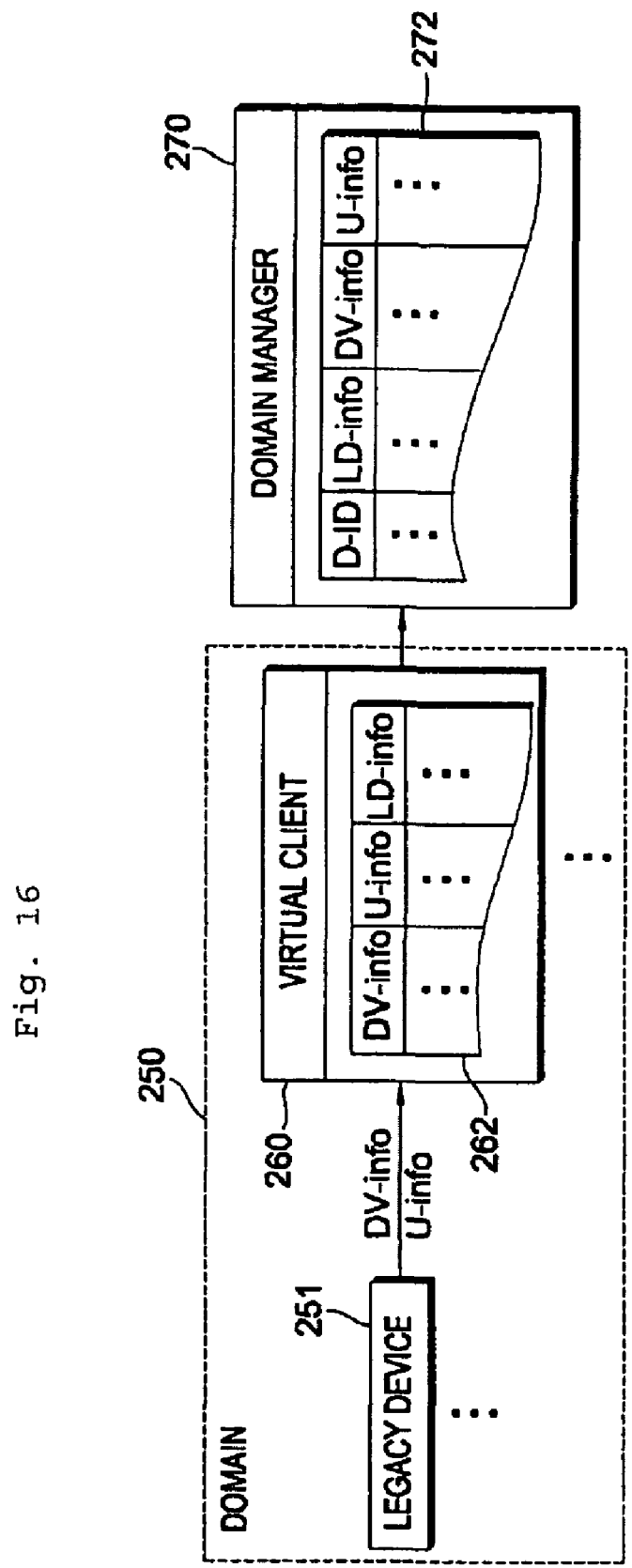
FIG. 16 illustrates an example of a structure of a DRM interoperable system for managing information on a user who uses a legacy device.

FIG. 16 illustrates an example of a structure of a DRM interoperable system for managing information on a user who uses a legacy device.

As shown in FIG. 16, when the legacy device 251 accesses the virtual client 260 so as to request the domain to authenticate the legacy device 251, the unique information DV-info on the legacy device and user information U-info of the legacy device 251 are provided to the virtual client 260. At this time, the user information U-info of the legacy device 251 may represent unique information for identifying the user who uses the legacy device 251 such as subscriber identification module information, user certificate information, or information which is clearly input by the user, for example, ID, password, and the like. This may correspond to system logon information of the user. As described above, the unique information DV-info on the legacy device may represent unique information such as a media access control address, a disk volume ID, and the like, which is unique for the legacy device 210. That is, the unique information on the legacy device indicates information including physical information or logical information.

The user information U-info and the unique information DV-info on the legacy device may be transmitted to the virtual client 260 together with an access request message, when the legacy device 251 requests the virtual client 260 to be accessed. Alternatively, the virtual client 260 may extract the user information U-info and the unique information DV-info on the legacy device from the legacy device 251, when the legacy device 251 requests the virtual client 260 to be accessed.

The virtual client 260 stores and manages the unique information DV-info on the legacy device and the user information U-info. At this time, as shown in FIG. 16, the unique information DV-info on the legacy device and the user information U-info can be stored and managed in a form of an information table 262 in correspondence with a device identifier LD-info provided by the domain manager 270.

The domain manager 270 stores and manages the device identifier LD-info, the unique information on the legacy device DV-info, and user information for each domain. Specifically, as shown in FIG. 16, the domain manager 270 can store and manage the domain identifier D-ID, the device identifier LD-info, the unique information DV-info on the legacy device, and the user information U-info in a form of an information table 272.

When the request for authenticating a predetermined legacy device 251 is transmitted from the virtual client 260, the domain manager 270 can apply the user information U-info of the legacy device 251 to an authentication for permitting an access by searching the information table 272 of the domain manger 270 for the user information U-info of the legacy device 251. In addition, the management of the legacy device 251 by the domain manager 260 can be applied to a general client device.

For example, the number of the legacy devices 251 is extracted by searching the information table 272 for the user information U-info. The number of the legacy devices 251 is compared with a predetermined number limit. When the number of the legacy devices 251 is less than the predetermined number limit, an authentication is performed. When the number of the legacy devices 251 is equal to or greater than the predetermined time limit, the authentication is not allowed. Accordingly, the total number of the legacy devices of the user can be limited. At this time, the number limit will depend on a policy of a service provider or costs paid by the user.

As described above, when the legacy device 251 is authenticated, a procedure of determining whether the domain is doubly accessed by searching for the unique information DV-info on the legacy device can be also performed. That is, in the authentication procedure, it is checked whether the domain is doubly accessed, and the allowed number limit for the user is considered by using the unique information on the legacy device and the user information U-info. On the other hand, it may be periodically checked whether the domain is doubly accessed, and the number of the legacy devices for each user may be periodically limited according to a predetermined period.

Figure 17:
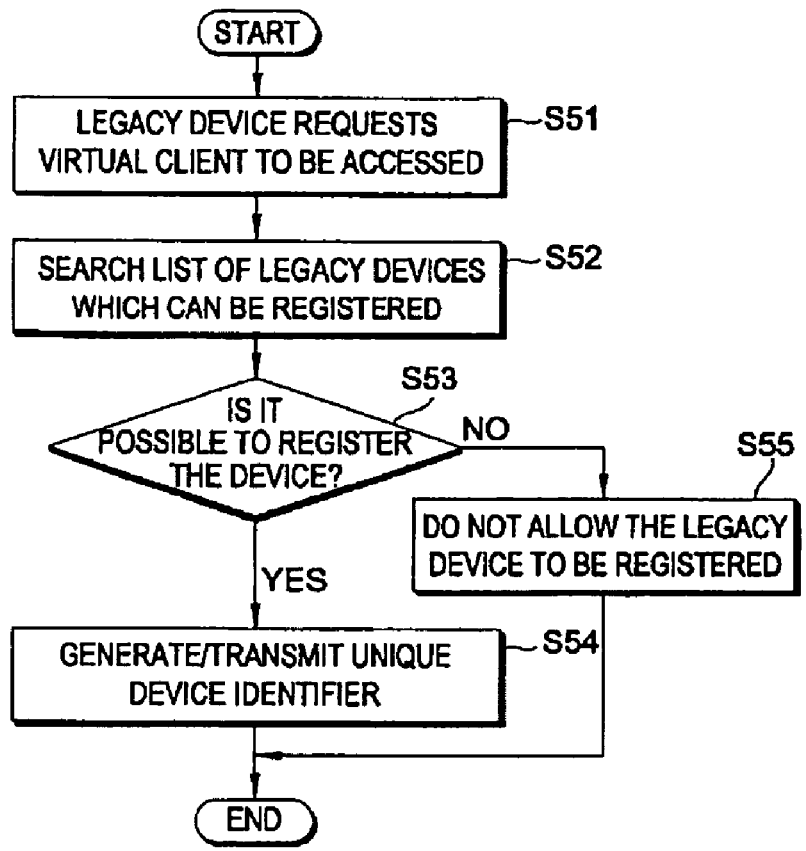
FIG. 17 is a flowchart illustrating a procedure of registering a legacy device to a domain.

FIG. 17 is a flowchart illustrating a procedure of registering a legacy device to a domain.

Referring to FIG. 17, when a new legacy device requests the virtual client to be accessed so as to subscribe to the domain (operation S51), the unique information on the legacy device is provided to the virtual client. Then, the virtual client recognizes that the virtual client is a new legacy device through the unique information on the legacy device and searches the list of the legacy devices which can be registered (operation S52). The list of the legacy devices which can be registered includes objects of devices which can be politically and technically provided with a service. The list may be previously stored by the virtual client. Alternatively, the list can be provided by the domain manager, a server of the service provider, or another system.

The virtual client searches the list based on the unique information on the legacy device and determines whether the legacy device can be registered (operation S53). For example, it is determined whether the unique information on the legacy device exists in the list. At this time, when the unique information on the legacy device exists in the list, the virtual client requests the domain manager to register the legacy device. Then, the domain manager generates a unique device identifier and transmits the unique device identifier to the virtual client (operation S54). Alternatively, when the unique information on the legacy device does not exists in the list, the virtual client does not allow the registration of the legacy device and reports information on whether the legacy device can be registered to the legacy device (operation S55).

Up to now, referring to FIGS. 5 to 17, operations which can be performed by the authentication and management part, for example, the function of the client part, the procedure of selecting the reference point controller, the procedure of selecting the candidates of the reference point controller, the procedure of replacing the reference point controller by using the reference point controller candidate when an error occurs in the reference point controller, the procedure of extending the domain through the reference point controller proxy, the procedure of selecting and using the candidate of the reference point controller proxy, the procedure of registering the reference point controller, the procedure of authenticating the client, the procedure of registering, authenticating, and managing the legacy device, and the like are described.

3. Functions and Operations of the Processing Control Part and the Content Processing Part When a domain is constructed by the authentication and management part, the authenticated client or legacy device (connected to the virtual client) in the domain can use a DRM interoperable service. At this time, the legacy device and the virtual client connected thereto can be considered as one client. Accordingly, the following client may include a client constructed by connecting the legacy device to the virtual client in addition to the client defined in the description of FIG. 2.

The authenticated client can request a predetermined destination device to transmit one or more contents. At this time, the destination device indicates a device or system in which the client desires to transmit a predetermined content, for example, another client device, a predetermined web server, or a system.

The request for transmission of the content may be received by the processing control part. The processing control part controls the content processing part so as to transmit the content in response to the request for transmission of the content. The content processing part transmits one or more contents requested to be transmitted to the destination device under a control of the processing control part.

Hereinafter, the procedure of transmitting a content by the processing control part and the content processing part will be described in detail. In the following description, four methods will be exemplified in relation to the transmission of a content in the DRM interoperable system. For convenience of understanding, a first method is referred to as Example 3-1. A second method is referred to as Example 3-2. A third method is referred to as Example 3-3. A fourth method is referred to as Example 3-4.

EXAMPLE 3-1

Figure 18:
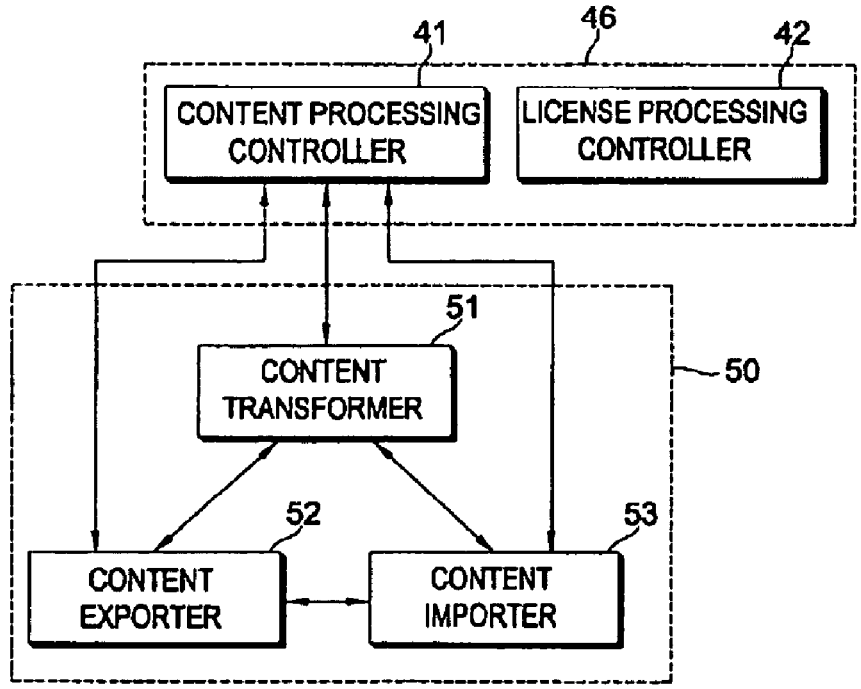
FIG. 18 is a block diagram illustrating structures of a processing control part and a content processing part.

FIG. 18 is a block diagram illustrating structures of a processing control part and a content processing part. FIG. 18 illustrates entities related to the procedure of transmitting a content.

As shown in FIG. 18, the processing control part 40 includes the content processing controller 41 and a license processing controller 42. Here, since the license processing controller 42 does not relate to the transmission of a content, the detailed description will be described later.

The content processing controller 41 serves to request the content processing part 50 to transmit the content according to the request for transmitting the content from the client and control the procedure of transmitting the content. The content processing controller 41 may exist at any location in the local area or network area. Preferably, the content processing controller 41 may included in a predetermined device that subscribes to the domain in the local area.

The content processing part 50 includes a plurality of content handlers. A content handler may indicate an entity which performs a function related to the transmission and processing of a content. The content handler includes a content exporter 52, a content transformer 51, and a content importer 53.

The content exporter 52 performs the function of transmitting the content to the content transformer 51 or content importer 53 in a neutral content form by exporting the content, which is requested to be transmitted by the content processing controller 41. At this time, the neutral content may indicate a clean content which is not encrypted by using a predetermined DRM. In addition, the content requested by the content processing controller 41 may be a content encrypted by using a predetermined DRM. The content exporter 52 decrypts the requested content, transforms the decrypted content into the neutral content, and transmits the transformed content. Alternatively, the content exporter 52 may receive a previously decrypted neutral content and transmit the received content.

The content transformer 51 serves to receive the neutral content transmitted from the content exporter 52, transform the neutral content into a content with a required format, and transmit the content with the required format to the content importer 53. At this time, the required format indicates a format required by a destination device DV2. The content transformer 51 participates in the transmission, only when format transformation of the neutral content is needed.

The content importer 53 serves to receive the neutral content transmitted from the content transformer 51 or content importer 52. In addition, the content importer 53 may provide the received neutral content to the destination device DV2. Alternatively, the content importer 53 may encrypt the received neutral content into a content with a format suitable to the DRM applied to the destination device DV2 and provide the encrypted content to the destination device DV2. At this time, in the former case, the destination device DV2 encrypts the neutral content transmitted from the content importer 53 into the content with the format suitable to the DRM applied to the destination device DV2 and uses the content. In the latter case, since the content that is encrypted by the content importer 53 is transmitted, the destination device DV2 can use the transmitted content as it is.

Figure 19:
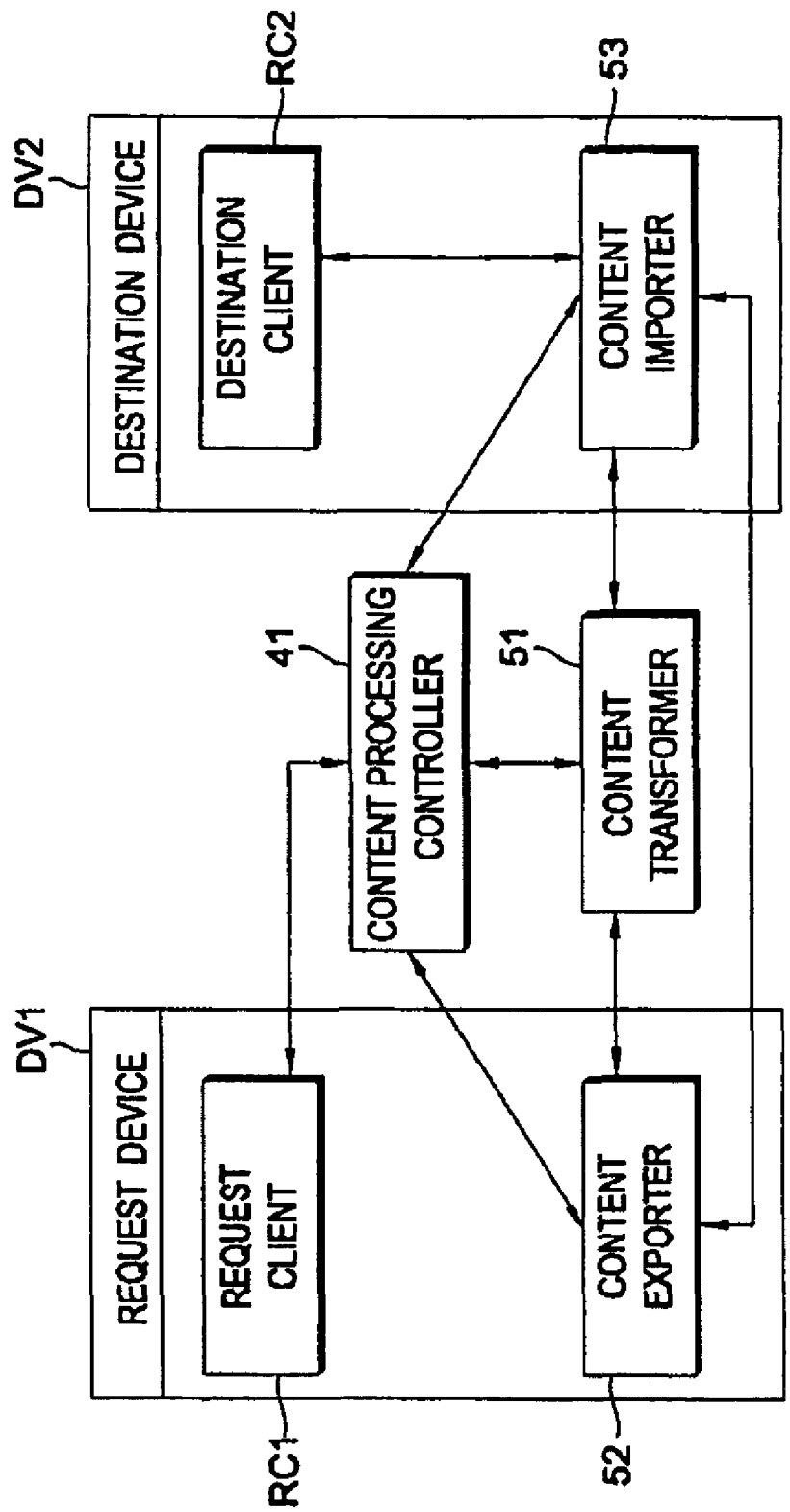
FIG. 19 shows an example for illustrating locations of a content processing controller and content handlers.
Figure 20:
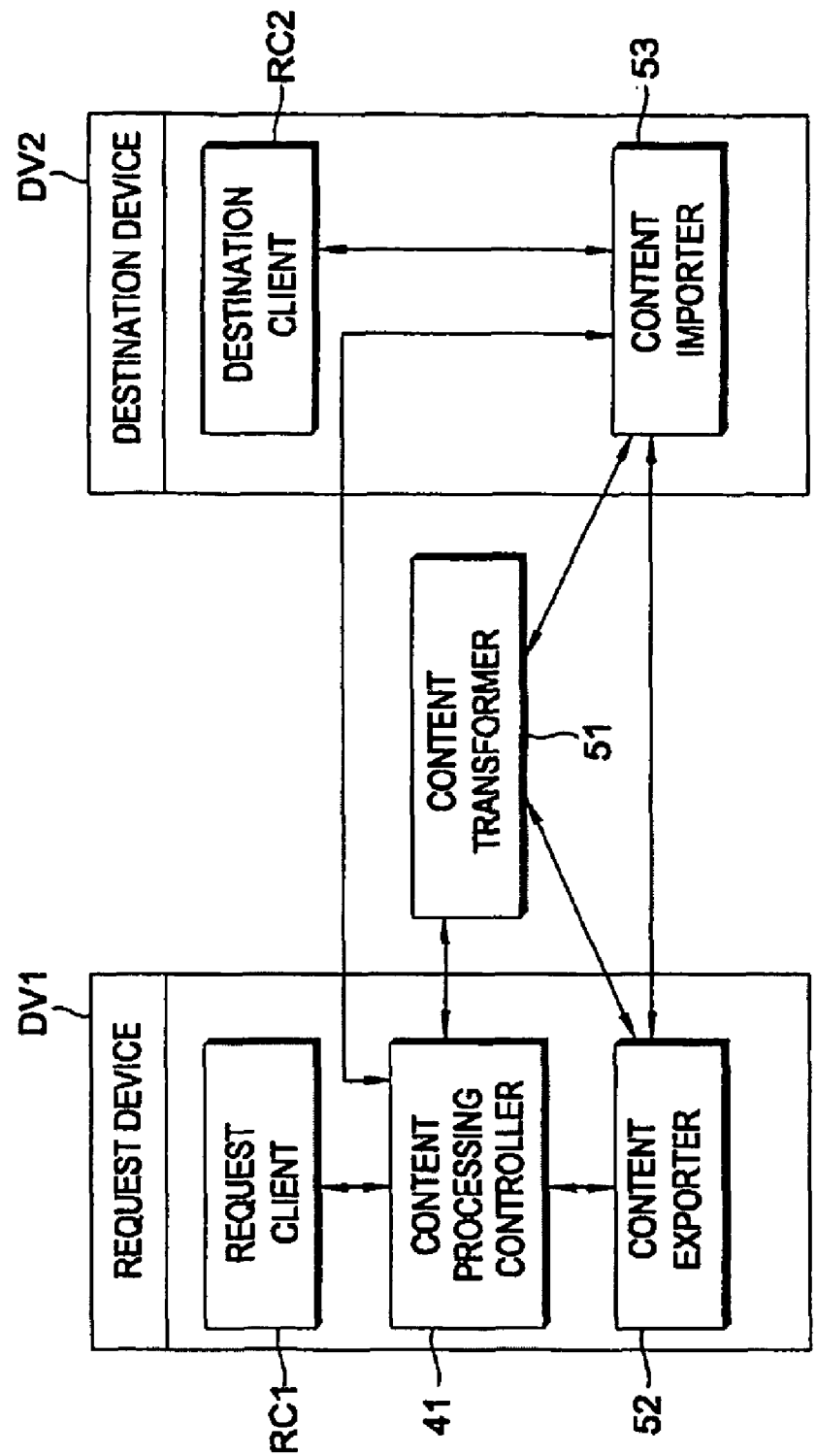
FIG. 20 shows an example for illustrating other locations of a content processing controller and content handlers.

FIGS. 19 and 20 show examples for illustrating locations of a content processing controller 41 and content handlers.

As shown in FIGS. 19 and 20, the content controller 41 and the content handlers, that is, the content exporter 52, the content transformer 51, and the content importer 53 are located at various locations according to execution environments.

First, referring to FIG. 12, the content exporter 52 may be included in a request device DV1. The content importer 53 may be included in the destination device DV2. In addition, the content processing controller 41 or content transformer 51 may be included in other devices separately from the request device DV1 and the destination device DV2.

Here, the request device DV1 and the destination device DV2 need to be defined.

The request device DV1 indicates a client device which requests a content to be transmitted. A request client RC1 may be included in the request device DV1. In addition, a predetermined DRM may be installed in the request device DV1. That is, the request device DV1 can use a content to which the predetermined DRM is applied.

As described above, the destination device DV2 indicates a client device or predetermined system to which the content requested by the request client RC1 is transmitted. A destination client RC2 may be included in the destination device DV2. In addition, a destination DRM may be installed in the destination device DV2. That is, the destination device DV2 can use a content to which the destination DRM is applied.

Referring to FIG. 20, the content processing controller 41 and the content exporter 52 are included in the request device DV1, and the content importer 53 is included in the destination device DV2. In addition, the content transformer 51 is separately included in another device.

As described above, the content processing controller 41, the content exporter 52, the content transformer 51, and the content importer 53 may be located at various locations. It may be advantageous for security reasons that the content exporter 52 is included in the request device DV1, and the content importer 53 is included in the destination device DV2.

Accordingly, hereinafter the present invention will be described by employing a structure shown in FIG. 19. However, the present invention is not limited thereto. That is, the content processing controller 41 and the content handlers may be included in the same device, according to execution environments. Selectively, some of the content processing controller 41 and the content handlers may be include in the same device, according to execution environments. Selectively, the content processing controller 41 and the content handlers may be included in separate devices, according to execution environments.

Hereinafter, the procedure of transmitting a content based on the aforementioned system will be described in detail.

Figure 21:
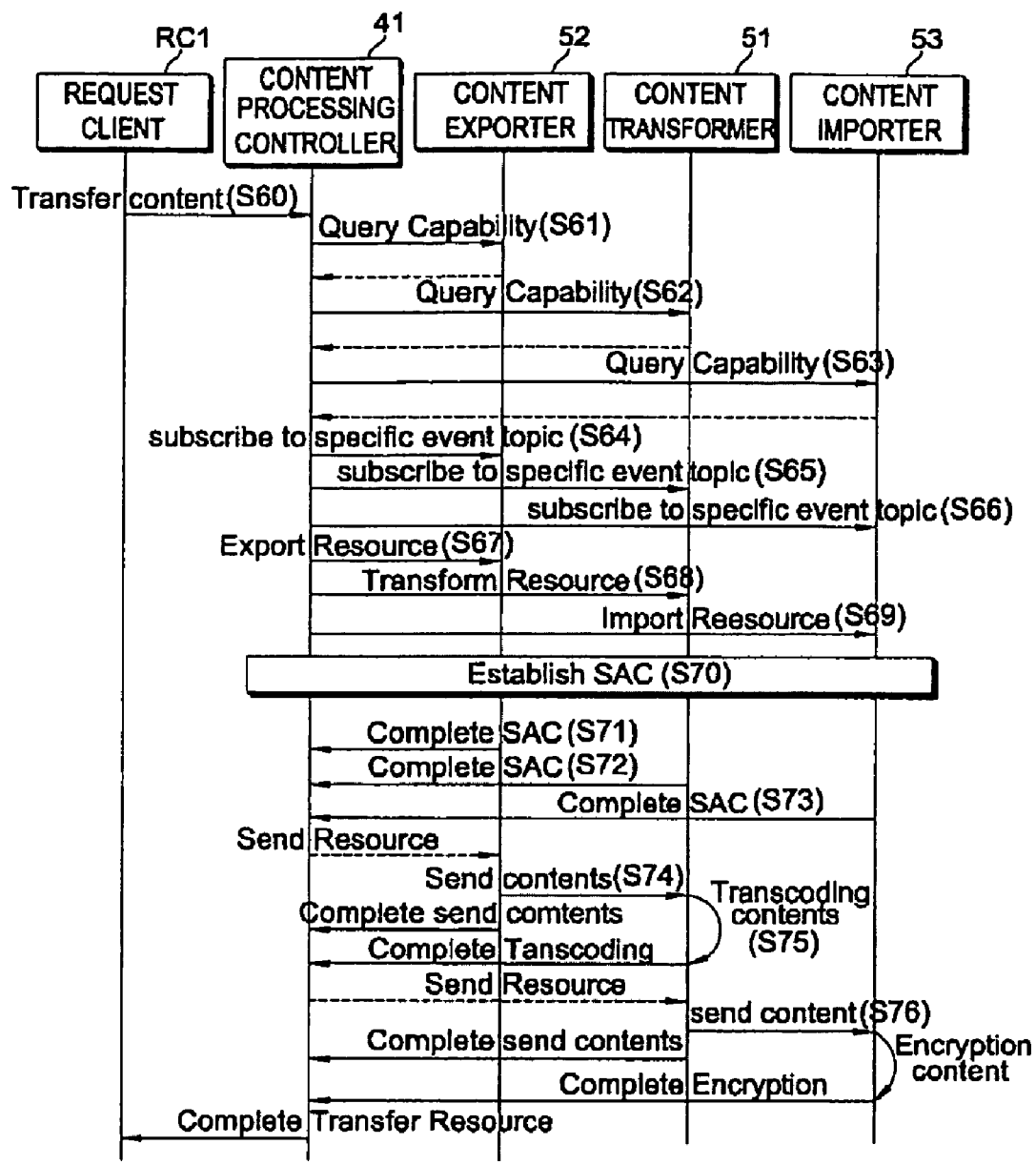
FIG. 21 is a flowchart illustrating a procedure of transmitting a content by using a content processing controller and content handlers.

FIG. 21 is a flowchart illustrating a procedure of transmitting a content by using a content processing controller 41 and content handlers. FIG. 21 illustrates an example of a procedure of transmitting one or more contents included in the request device DV1 to the destination device DV2 that is a destination.

As shown in FIG. 21, in order to transmit a content, the request client RC1, the content processing controller 41, the plurality of content handlers, for example, the content exporter 52, the content transformer 51, and the content importer 53 are required to interact with one another.

First, the request client RC1 transmits a content transmission request message for requesting one or more contents to be transmitted to the content processing controller 41 (operation S60).

At this time, the content transmission request message includes a transmission session identifier, a content identifier, source information, destination information, and the like. In addition, DRM system information of the destination which receives the content may be included in the content transmission request message as an option.

The content identifier may indicate information for identifying the content requested to be transmitted. When there are a plurality of contents requested to be transmitted, a plurality of content identifiers for identifying the contents may exist.

The transmission session identifier indicates an identifier for uniquely identifying a transmission session. The transmission session identifier may be used to identify sessions when a predetermined operation is performed, for example, when the content transmission is cancelled or when the content transmission status is updated.

The source information is used to determine from where the requested content is transmitted. The source information may include an identifier for identifying a source device or system such as the request device DV1, information on a format of a content file requested to be transmitted, and the like.

The destination information includes information for identifying the destination device DV2 that is the destination to which the requested content is transmitted. The destination information may include a destination identifier for identifying the destination, information on a file format required by the destination, and the like. The information on the file format included in the destination information can be referred, when the format of the file is transformed by the content transformer 51.

The content transmission controller 41 can use information included in the content transmission message as in the following. At this time, the content transmission controller 41 may use the information received from the request client RC1 as it is. Alternatively, the content transmission controller 41 may generate separate information corresponding to the information received form the request client RC1 and use the generated information. For example, the content transmission controller 41 may use the transmission session identifiers and a plurality of data identifiers received from the request client RC1 as they are. Alternatively, the content transmission controller 41 may use generate transmission session identifiers and a plurality of data identifiers suitable for sessions.

When receiving the content transmission request message, the content processing controller 41 gathers information on the content handlers, checks whether the content can be transmitted, and determines a content handler to transform a content, that is, a content handler to construct a content transformation chain (operations S61 to S63).

For example, the content processing controller 41 queries one or more exporters 52, the content importer 53, and the content transformer 51 about the capability and receives a response from the corresponding entity. Accordingly, the capabilities of the sources, midway and destination devices, systems, and DRMs can be recognized.

When information is gathered, the content processing controller 41 determines whether the requested content is to be transmitted based on the gathered information. That is, it is checked whether the content handlers normally transmission the requested content. Here, the format of the requested content, the policy of the system, and secure authenticated channel algorithm information which can be executed among entities may be considered. For example, when the content transformer 51 cannot support transformation of a content into a content with a required format based on the gathered capability of the content transformer 51, it is impossible to transmit the content. When the content transformer 51 can support the transformation of the content into the content with the required format, it is possible to transmit the content. The content processing controller 41 determines whether the content is transmitted by considering the aforementioned factors.

When it is determined that the content is transmitted, the content processing controller 41 determines the content handlers, for example, the content exporter 52, the content transformer 51, and the content importer 53, which can effectively perform the transformation of the requested content, and controls the content handlers so that a content transformation chain including the determined content handlers is constructed. That is, the determined content handlers are controlled so as to construct the content transformation chain.

When determining the content handlers included in the content transformation chain, the content transmission controller may include the content transformer 51 or may not include the content transformer 51. When the format of the content requested to be transmitted is different from that of a content required by the destination, the format of the transmitted content has to be transformed. However, when the format of the content requested to be transmitted is the same as that of a content required by the destination, the format of the transmitted content needs not to be transformed.

Accordingly, when the format of the requested content is different from the format required by the destination, the content processing controller 41 allows the content transformer 51 to be included in the content transformation chain. When the format of the requested content is the same as the format required by the destination, the content processing controller 41 allows the content transformer 51 not to be included in the content transformation chain. Here, the format transformation of the content may indicate codec transformation.

For example, when the requested content is compressed by MPEG-2 compression, and when the format of the content available in the destination is MPEG-4, the content with a MPEG-2 format is not available, and therefore, the MPEG-2 format has to be transformed into MPEG-4 format by using the content transformer 51.

In Example 3-1, a case where the content needs to be transformed since the format of the requested content is different from the format required by the destination will be described. In this case, the content transformation chain has to include the content transformer 51.

Subsequently, the content processing controller 41 sends a content export request, a content transformation request, and a content import request respectively to the content exporter 42, the content transformer 51, and the content importer 53 (operations S67 to S69). The aforementioned requests are performed by transmitting a control message for requesting the content handlers to perform the requested operations to the content handlers.

The control message for requesting the content to be exported may include a transmission session identifier, a content identifier, receiver information, and the like. The receiver information may indicate information on a receiver to which the content exporter 52 exports and transmits the content. In Example 3-1, a case where the content transformation chain includes the content transformer 51 is described, and therefore, the receiver information may indicate identification information of the content transformer 51. However, when the content transformation chain does not include the content transformer 51, the receiver information may indicate the identifier information of the content importer 53.

In addition, the control message for requesting the content to be transformed may include the transmission session identifier, the content identifier, transmitter information, the receiver information, format information of the content to be transmitted, information on a transformed format, and the like. At this time, the transmitter information and the receiver information may indicate information for identifying an entity which transmits the content and an entity which receives the content. That is, the transmitter information serves to identify the content exporter 52 which is a transmitter, and the receiver information serves to identify the content importer 53 which is a receiver.

The control message for requesting the content to be imported may include the transmission session identifier, the content identifier, the transmitter information, and the like. The transmitter information may indicate information for identifying the transmitter which transmits the content. In Example 3-1, a case where the content transformer 51 exists is described, and therefore, the source information may indicate the identification information of the content transformer 51. When the content transformer 51 is not included in the content transformation chain, the content exporter 52 becomes the transmitter. When the content is requested to be received, information on the receiver which finally receives the content may include destination information and the DRM system information of the destination.

In addition, when the content is requested to be exported, transformed, and received, the content identifier included in the control message is matched with the content identifier requested when the client requests the content to be transmitted. When there are a plurality of contents requested by the client to be transmitted, the identifier of the requested content when the content is requested to be transmitted is the same as the content identifier included in the content export request information, the content transformation request information, and the content import request information.

As described above, when the content exporter 52, the content transformer 51, and the content importer 53 respectively receive the content export request, the content transformation request, and the content import request from the content processing controller 41, secure authenticated channels (SACs) are established between the content exporter 52 and the content transformer 51 and between the content transformer 51 and the content importer 53 (operation S70). At this time, a security technique such as a transport layer security, which is applied to a transport layer of TCP/IP, can be applied to the SACs.

The content exporter 52 establishes a SAC with the content transformer 51 so as to safely transmit the requested content to the content transformer 51 which is a receiver, in response to the content export request. In addition, the content transformer 51 transforms the content transmitted from the content exporter 52 and establishes a SAC for transmitting the transformed content to the content importer 53, in response to the content transformation request. On the other hand, the content importer 53 may establish a SAC for transmitting the content transmitted from the content transformer 51 to the destination device DV2, that is, an end-point of transmission of the content, in response to content import request. This is more useful when the content importer is installed in a device different from the destination device.

Accordingly, the SAC which constitutes a path from the content exporter 52 to the content importer 53 via the content transformer 51 is established. In addition, the SAC through which the content importer 53 provides the content to the final end-point may be established from the content importer to the end-point. Each content handler can report to the content processing controller 41 that the SACs are established (operations S71 to S73).

When the SACs are established, the content starts to be transmitted from the content exporter 52. At this time, pairs of content handlers connected to each other (that is, the content exporter 52-the content transformer 51 and the content transformer 51-the content importer 53) support a multi-transmission protocol. The multi-transmission protocol serves to enable multi-contents to be transmitted in a single session. This may support a variable frame size. Accordingly, it is possible to transmit a plurality of contents through a single session.

Figure 22:
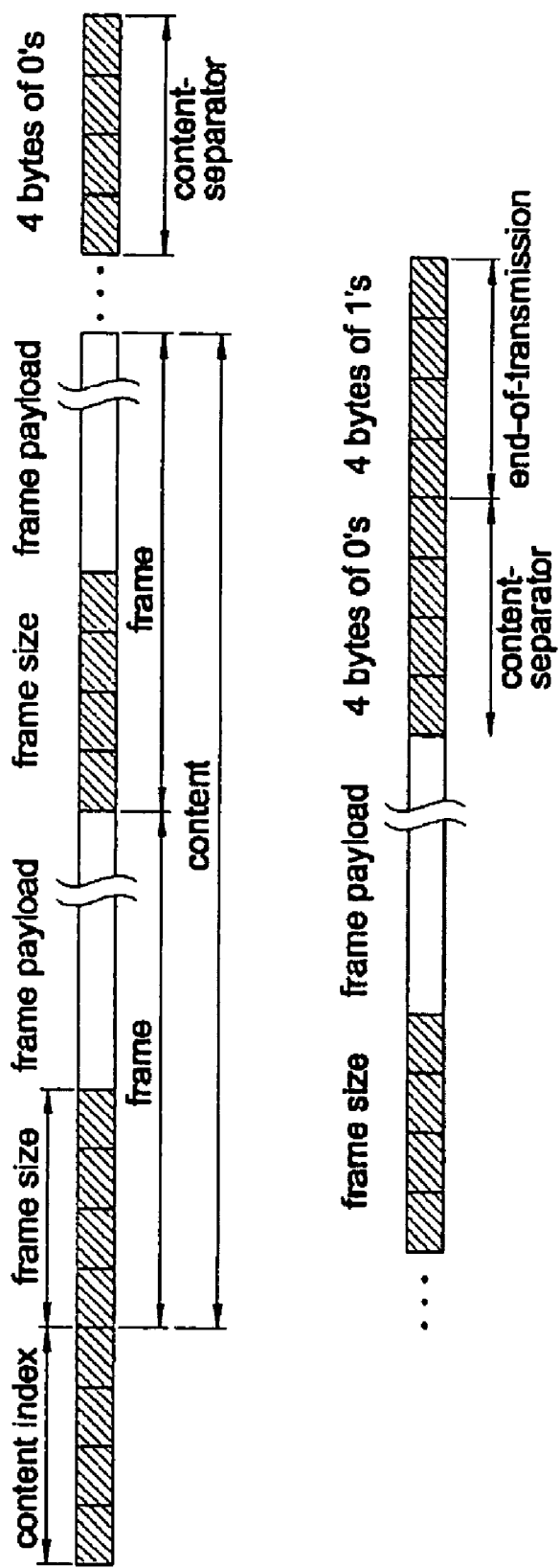
FIG. 22 shows an example for illustrating a multi-transmission protocol.

FIG. 22 shows an example for illustrating a multi-transmission protocol.

As shown in FIG. 22, it is possible to transmit a plurality of contents in a single session. A content index is inserted into each content header. The content index may be a value with predetermined bits (for example, four bits) for identifying the content. The content index is a factor for distinguishing the contents transmitted through the corresponding session from one another in linkage with the requested contents. In addition, a content separator for distinguishing the contents from one another is inserted into the end of the content. For example, the content separator may be constructed with four bits of 0.

The content may be divided into a plurality of frames according to the length of the content. A frame size with predetermined bits (for example, four bits) is inserted into a frame header. A frame payload for carrying data is located behind the location of the frame size. On the other hand, an end-of-transmission (EOT), which represents an end of transmission, is inserted into the last part of the session. For example, the EOT may be four bits of 1.

A plurality of contents can be transmitted through a session corresponding to the transmission session identifier provided by the request client RC1, according to the support of the multi-transmission protocol. The aforementioned transmission is sequentially performed from the content exporter 52. The content exporter 52 sends the requested contents to the content transformer 51 through the SAC (operation S74). The content transformer 51 receives the contents and performs format transformation into the format required by the destination (operation S75). After the format transformation is performed, the content transformer 51 transmits the transformed contents to the content importer 53 through the SAC (operation S76). Then, the content importer 53 receives the contents and provides the received contents to the destination device DV2.

The contents which are transmitted from the content exporter 52 to the content importer 53 via the content transformer 51 may be neutral contents. A neutral content may indicate a clean content which is not encrypted by using a predetermined DRM. The content exporter 52 may export the requested contents, transform the exported contents into the neutral contents, and transmit the neutral contents. Alternatively, the content exporter 52 may export previously transformed neutral contents and transmit the neutral contents. This procedure can be performed in consideration of a policy or export procedure designated by the DRM applied to the requested content.

In addition, the content importer 53 can transmit the received neutral contents to the destination device in consideration of a policy or import procedure designated by the DRM system applied to the destination device. For example, the neutral contents may be encrypted suitably to the destination DRM and provided to the destination device DV2. Alternatively, the received neutral contents may be provided to the destination device DV2 without encryption.

On the other hand, the content exporter 52, the content transformer 51, and the content importer 53 can report the transmission status of the contents to the content processing controller 41. For this, the content processing controller 41 has to subscribe to a predetermined event through which the transmission status of the content can be provided. The predetermined event is referred to as a content-transmission-status providing event.

The content processing controller 41 can request the content-transmission-status providing event to be subscribed to, before requesting the content to be exported (operations S64 to S66). For example, the content processing controller 41 can subscribe to the corresponding events by requesting the content exporter 52, the content transformer 51, and the content importer 53 to subscribe to the content-transmission-status event.

When subscribing to the content-transmission-status event, the content processing controller 41 can receive an event message including the content-transmission-status information in a push or pull manner. At this time, in the push manner, the content handler automatically pushes the event message (including the content-transmission-status information), whenever the content-transmission-status changes. Accordingly, the content processing controller 41 can automatically receive the content-transmission-status. In the pull manner, the content processing controller 41 obtains the content-transmission-status information from the content handler at need.

When subscribing to the event, the content processing controller 41 reports the content handlers whether the content-transmission-status information is provided in the push or pull manner. In Example 3-1, an example in which the content-transmission-status is provided to the content processing controller 41 in the push manner is described.

When subscribing to the content-transmission-status providing event, the content processing controller 41 can receive the event message including the content-transmission-status information from the content handlers. At this time, a transmission session identifier has to be included in the event message. Here, a transmission session identifier is the same as the transmission session identifier allocated when the content is requested to be provided.

When the content starts to be transmitted, the content exporter 52 sends an event message for representing that the content starts to be transmitted to the content processing controller 41. For example, an event message including a "Started" element may be transmitted. In addition, an event message for representing that the content is being processed may be periodically transmitted to the content processing controller 41 during the transmission of the content. For example, an event message including a "ProgressDone" element may be transmitted. When the transmission of the content is completed, the content exporter 52 transmits an event message for representing that the transmission of the content is completed to the content processing controller 41. For example, an event message including a "Completed" element may be transmitted. In addition, event messages are generated for each procedure based on the event information on all the procedures of transforming and transmitting data including a content or license in addition to start, processing, and end procedures, and transmitted.

When the content starts to be transmitted, the content transformer 51 sends the event message for representing that the content starts to be transmitted to the content processing controller 41. For example, an event message including a "Started" element may be transmitted. In addition, an event message for representing that the content is being processed can be periodically transmitted to the content processing controller 41 during the transmission of the content. For example, an event message including a "ProgressDone" element may be transmitted. When the transmission of the content is completed, the content exporter 52 transmits an event message for representing that the transmission of the content is completed to the content processing controller 41. For example, an event message including a "Completed" element can be transmitted.

When the content starts to be transmitted, the content importer 53 sends an event message for representing that the content starts to be transmitted to the content processing controller 41. For example, an event message including a "Started" element may be transmitted. In addition, an event message for representing that the content is being processed may be periodically transmitted to the content processing controller 41 during the transmission of the content. For example, an event message including a "ProgressDone" element may be transmitted. When the transmission of the content is completed, the content exporter 52 transmits an event message for representing that the transmission of the content is completed to the content processing controller 41. For example, an event message including a "Completed" element can be transmitted.

When receiving the event message for representing the start of transmission from the content exporter 52, the content processing controller 41 sends the event message corresponding to the start of transmission to the request client RC1. That is, the content processing controller 41 reports that the content starts to be transmitted. In addition, when the content processing controller 41 receives the event message for representing that the content is being processed, the content processing controller 41 sends the event message corresponding to the processing of the content to the request client RC1. That is, the content processing controller 41 reports that the content is being processed. When the content processing controller 41 receives the event message for representing completion of transmission from the content importer, the content processing controller 41 sends the event message corresponding to the completion of transmission to the request client RC1. That is, the content processing controller 41 reports that the transmission of the content is completed. When the aforementioned event messages is exported to the request client RC1, the event messages including the transmission session identifier designated when the request client RC1 requests the content to be transmitted can be transmitted.

On the other hand, the content processing controller 41 separately identifies transmitted contents and reports the transmission status or transformation status of the contents. Alternatively, the transmitted contents may be collectively reported. In other words, the content processing controller 41 distinguishes a plurality of contents based on the transmission time and reports the transmission time to the client whenever the content is transmitted. Alternatively, after the contents are transmitted, the events are collectively managed, and then, the content-transmission-status may be reported. In addition, the identification of the content is performed through the content identification information. The aforementioned procedures may be similarly applied to the license. In case of license, the aforementioned procedures may be performed by the license transmission controller.

The request client RC1 can recognize the transmission status of the content with respect to the session which requests the content to be transmitted, by using the aforementioned method. When a user interface function is included in the request client RC1, the request client RC1 may report the transmission status of the content to a user by using a number or graph.

In addition, when a plurality of contents are transmitted through a session, the transmission status of each content can be recognized. Accordingly, the transmission statuses of contents requested to be transmitted through the session are sequentially recognized.

On the other hand, the content exporter 52, the content transformer 51, and the content importer 53 can recognize an error which occurs in the SAC during transmission of the contents. In this case, the content handler which finds the error can transmit the event message for representing that the error occurs to the content processing controller 41. For example, an event message including an "Error" or "SAC-Failure" element is transmitted. At this time, the event message surely includes the transmission session identifier.

When receiving the event message for representing that an error occurs from a predetermined content handler, the content processing controller 41 requests the content handlers which participate in the transmission of the contents to cancel the transmission. When the transmission is requested to be cancelled, the transmission session identifier of the cancelled transmission session has to be provided. In addition, the content processing controller 41 sends the event message for representing that the error occurs to the request client RC1. Accordingly, the request client RC1 can recognize that the error occurs. On the other hand, the content handler which receives the request for canceling transmission cancels the transmission of the session.

The cancellation of the transmission may start by the request client RC1. In this case, the request client RC1 transmits the request for cancellation of transmission including a transmission session identifier that is the same as the transmission session identifier provided when the content is requested to be transmitted to the content processing controller 41. Then, the content processing controller 41 request the content handlers which participate in the transmission to cancel the transmission, in response to the request for cancellation. The content handlers which receive the request for cancellation of transmission cancel the transmission of the session.

On the other hand, the content processing controller 41 may request the content transformer 51 to subscribe to an event capable of monitoring the procedure of transforming the content, in addition to the event message such as the start of the content transmission, the transmission of the content, the completion of the content transmission, the error of the content transmission, and the like and may receive the event message such as the start of the content format transformation, the transformation of the content format, the completion of the content format transformation, the error of the content format transformation, and the like. Selectively, the content processing controller 41 may request the event for representing that the data is transformed through a predetermined encryption technique to be subscribed to and may receive the event message such as the start of transformation of the data through the encryption technique, the transformation of the data through the encryption technique, the completion of the transformation of the data through the encryption technique, the error of the transformation of the data through the encryption technique, and the like. Selectively, the content processing controller 41 may request the transformation content handlers to subscribe to the event for representing the SAC forming procedure and may receive the event message such as the start of formation of the SAC, the formation of the SAC, the completion of the formation of the SAC, the error of the formation of the SAC, and the like.

In Example 3-1, the procedures of constructing a content transformation chain with the content processing controller of the processing control part and the content handlers of the content processing part and transmitting a single content or multi contents through a single session are described.

In the following Example 3-2, procedures of constructing a plurality of content transformation chains and transmitting a single content or multi contents through multi sessions in response to the request from the request client RC1 will be described. In this case, the content can be transmitted to one or more destinations, in response to the content transmission request.

EXAMPLE 3-2

Figure 23:
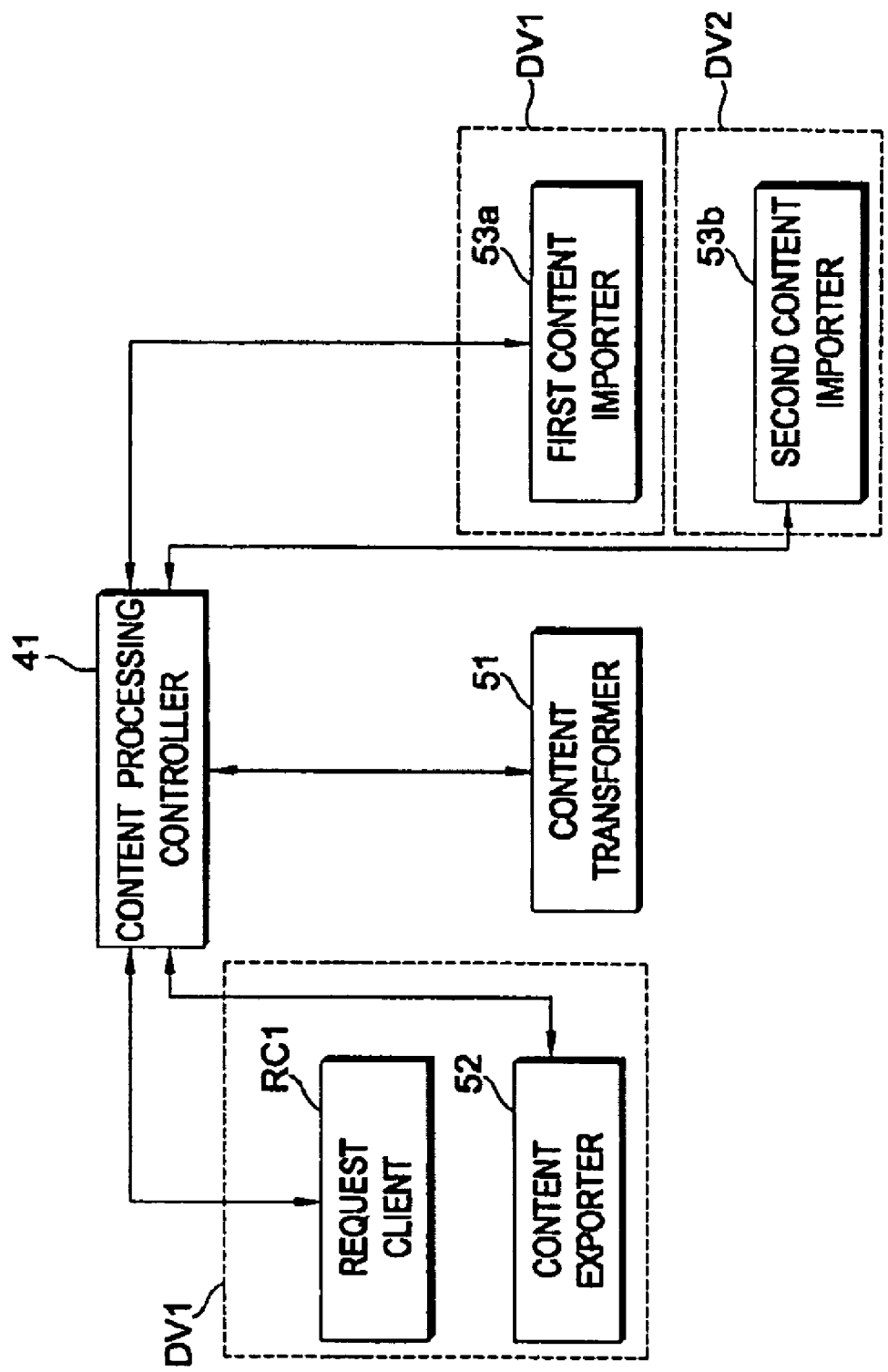
FIG. 23 is a block diagram illustrating a structure of a system for a content transmission procedure according to Example 3-2.

FIG. 23 is a block diagram illustrating a structure of a system for a content transmission procedure according to Example 3-2.

Referring to FIG. 23, the request device DV1 may include the request client RC1 and the content exporter 52. In addition, a first destination device DV2-1 includes a first content importer 53a. A second destination device DV2-2 includes a second content importer 53b. The content processing controller 41 and the content transformer 51 are included in a device which is separated from the request device DV1 or destination device DV2.

Figure 24:
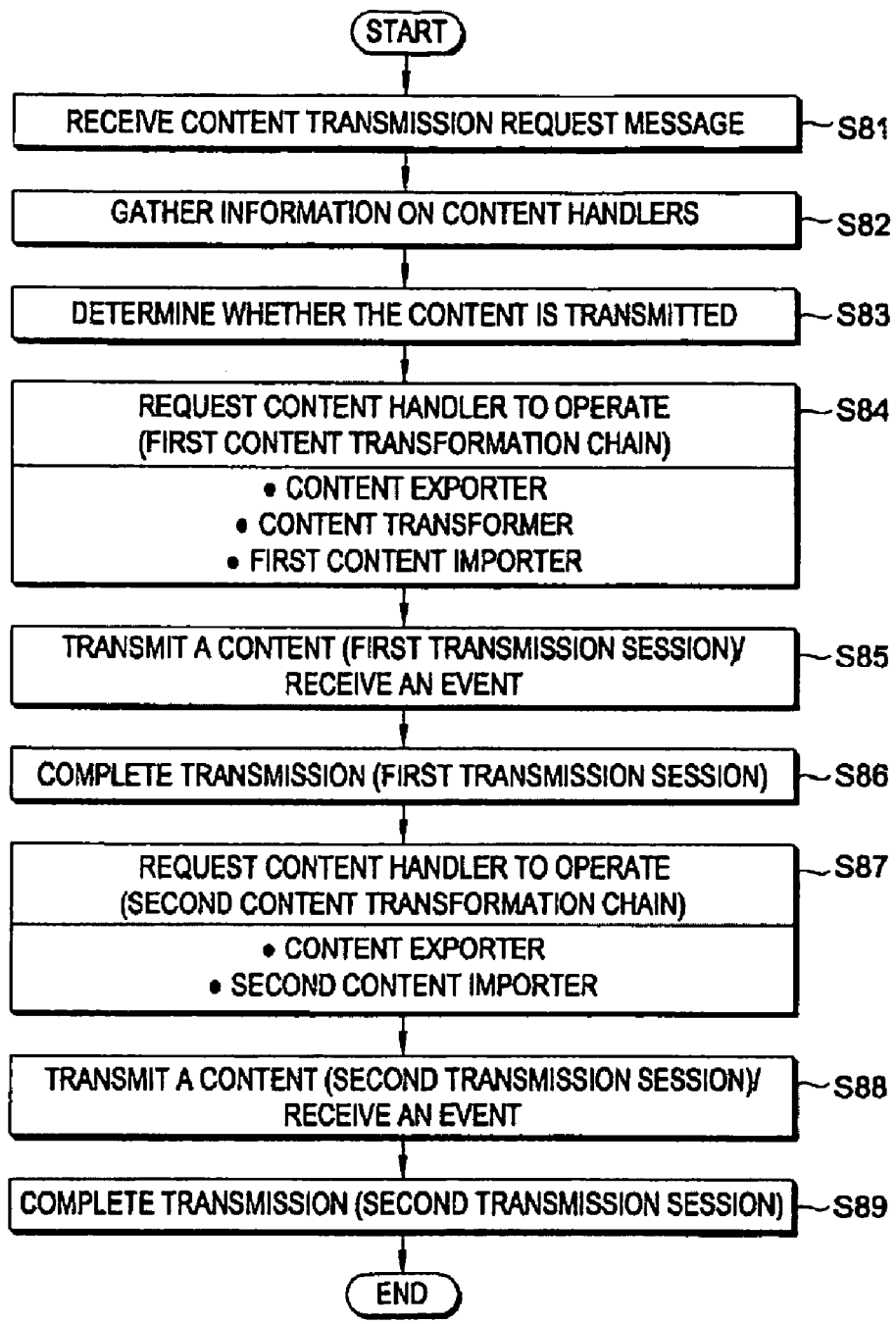
FIG. 24 is a flowchart illustrating the content transmission procedure according to Example 3-2.

FIG. 24 is a flowchart illustrating the content transmission procedure according to Example 3-2. FIG. 24 illustrates an example of a procedure of transmitting one or more contents included in the request device DV1 to the first and second destination devices DV2-1 and DV2-2 which are destinations, in response to the request of the request client RC1.

As shown in FIG. 24, the request client RC1 transmits the content transmission request message for requesting one or more contents included in the request device DV1 to be transmitted to the first and second destination devices DV2-1 and DV2-2 to the content processing controller 41 (operation S81).

At this time, the content transmission request message includes at least one transmission session identifier, the content identifier, the source information, the destination information, and the like. In addition, the content transmission request message may include the DRM system information of the destination which receives the content, as an option.

The content identifier may indicate information for identifying the content requested to be transmitted. In Example 3-2, since one or more contents are transmitted to the first and second destination devices DV2-1 and DV2-2, one or more content identifiers may exist.

The transmission session identifier indicates an identifier for uniquely identifying a transmission session. In Example 3-2, the requested one or more contents have to be transmitted to the first destination device DV2-1, and the requested one or more content have to be transmitted to the second destination device DV2-2. Therefore, the transmission session is divided into two transmission sessions. Accordingly, two transmission session identifiers may exist. For example, first and second transmission session identifiers may exist.

The source information indicates information for determining from where the requested content is transmitted. The source information may include an identifier for identifying a source device or system such as the request device DV1, information on a format of a content file requested to be transmitted, and the like. In Example 3-2, since the requested one or more contents are included in the request device DV1, the source information may include information on the request device DV1 and information on a file format.

The destination information includes information for identifying the destination device DV2 that is the destination to which the requested content is transmitted. The destination information may include a destination identifier for identifying the destination, information on a file format required by the destination, and the like. The information on the file format included in the destination information can be referred, when the format transformation of the file is performed by the content transformer 51. In Example 3-2, the destination information may include information on the first and second destination devices DV2-1 and DV2-2 and format information.

When receiving the content transmission request message, the content processing controller 41 gathers information on the content handlers (operation S82). For example, the content processing controller 41 queries one or more content exporters 52, content importers 53, and content transformers 51 about the capabilities and obtains responses from the corresponding entities. Accordingly, the capabilities of the sources, midway and destination devices, systems, and DRMs can be recognized.

When information is gathered, the content processing controller 41 determines whether the requested one or more contents are transmitted based on the gathered information. That is, it is checked whether the content handlers normally transmit the requested content. Here, it has to be considered whether the two transmission sessions requested by the request client RC1 are satisfied.

When the transmission of the content is determined, the content processing controller 41 controls the content handlers so as to construct a content transformation chain by determining the content handlers which can effectively perform the transformation of the requested content. In Example 3-2, since the transmission session for transmitting the requested content to the first destination device DV2-1 is distinguished from the transmission session for transmitting the requested content to the second destination device DV2-2, two content transformation chains for performing each transmission session are needed.

FIG. 25 illustrates a primary content transformation chain for transmitting one or more contents to a first destination device DV2-1.

As shown in FIG. 25, the primary content transformation chain includes the content exporter 52, the content transformer 51, and the first content importer 53a.

Figure 26:
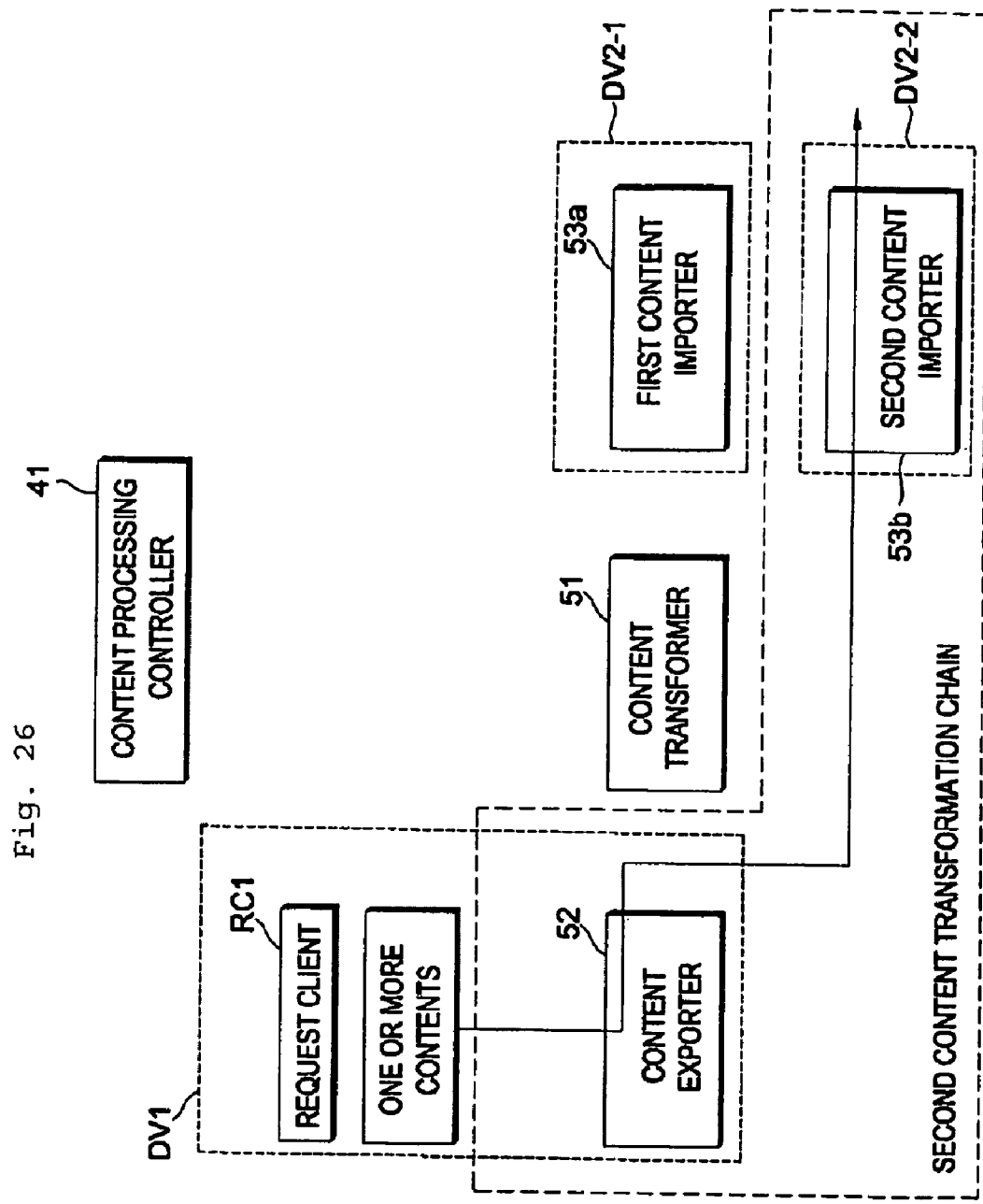
FIG. 26 illustrates a secondary content transformation chain for transmitting one or more contents to a second destination device.

FIG. 26 illustrates a secondary content transformation chain for transmitting one or more contents to a second destination device DV2-2.

As shown in FIG. 26, the secondary content transformation chain includes the content exporter 52 and the second content importer 53b.

At this time, the primary content transformation chain includes the content transformer 51, but the secondary content transformation chain does not include the content transformer 51. Since the format of the requested one or more contents is different from the format of the content required by the first destination device DV2-1, the format transformation of the content is needed. On the other hand, the format of the requested one or more contents is the same as the format of the content required by the second destination device DV2-2.

The content processing controller 41 controls the content handlers so as to construct the primary content transformation chain. The first transmission session is performed. Then, the content processing controller 41 controls the content handlers so as to construct the secondary content transformation chain. The second transmission session is performed. In another example of constructing the content transformation chain, a single session may be repeatedly generated.

First, the content processing controller 41 respectively transmits a content export request, a content transformation request, and a content import request to the content exporter 42, the content transformer 51, and the content importer 53 (operations S84). The aforementioned requests are performed by transmitting a control message to the content handlers.

When the content is requested to be exported, the content processing controller 41 can provide the first transmission session identifier, the content identifiers of the requested one or more contents, and the information on the content transformer 51 which is the receiver information to the content exporter 52.

In addition, when the content is requested to be transformed, the content processing controller 41 can provide the first transmission session identifier, the content identifier of the requested one or more contents, the information on the content exporter 52 which is the transmitter information, the information on the content importer 53 which is the receiver information, a format of the transmitted one or more contents, information on a transformed format, and the like.

When the content is requested to be imported, the content processing controller 41 can provide the first transmission session identifier, the content identifiers of the requested one or more contents, and the information on the content transformer 51, which is the transmitter, to the content exporter 52. In addition, the content processing controller 41 can also provide information on a receiver which finally receives the content and the DRM information of the destination DRM system. Here, the information on the receiver may indicate information on a predetermined storage entity or module included in an end-point of transmission of the content, for example, the first destination device DV2-1.

As described above, when the content exporter 52, the content transformer 51, and the content importer 53 from the content processing controller 41 respectively receive the content export request, the content transformation request, and the content import request, the content is transmitted, and the event is received through the primary content transformation chain (operation S85).

First, SACs are established between the content exporter 52 and the content transformer 51 and between the content transformer 51 and the first content importer 53a. In addition, a SAC may be also established between the first content importer 53a and the first destination device DV2-1. When the SACs are established, the content exporter 52 starts to transmit the content. At this time, pairs of the content handlers (that is, the content exporter 52-the content transformer 51 and the content transformer 51-the content importer 53) support the aforementioned multi-transmission protocol. Accordingly, a plurality of contents can be transmitted through a single session.

A plurality of contents can be transmitted in a session corresponding to the first transmission session identifier provided by the request client RC1 (or generated by the content processing controller 41), according to the support of the multi-transmission protocol. The aforementioned transmission is sequentially performed from the content exporter 52. The contents which are transmitted from the content exporter 52 to the content importer 53 via the content transformer 51 may have types of neutral contents. As described above, a neutral content may indicate a clean content which is not encrypted by using a predetermined DRM.

On the other hand, the content exporter 52, the content transformer 51, and the first content importer 53a can report the transmission status of the contents to the content processing controller 41. For this, the content processing controller 41 requests the content exporter 52, the content transformer 51, and the first content importer 53a to subscribe to the content-transmission-status event and receives an event message. Since the event is described in Example 3-1, the detailed description on the event will be omitted.

When the content is transmitted to the first destination device DV2-1 (operation S86), the content processing controller 41 transmits a content export request and a content import request respectively to the content exporter 52 and the second content importer 53b included in the secondary content transformation chain (operation S87). That is, two content transformation chains sequentially perform transmission under a control of the content processing controller 41. Surely, the two content transformation chains are concurrently generated, and the transmission is performed by the two content transformation chains under a control of the content processing controller.

When the content is requested to be exported, the content processing controller 41 can provide the second transmission session identifier, the content identifiers of the requested one or more contents, and the information on the content importer 53, which is the receiver information, to the content exporter 52. In addition, when the content is requested to be imported, the content controller 41 can provide the second transmission session identifier, the content identifiers of the requested one or more contents, the information on the content exporter 52, which is the transmitter, to the second content importer 53b.

As described above, when the content exporter 52 and the second content importer 53b respectively receives the content export request and the content import request from the content processing controller 41, the content is transmitted, and the event is received through the secondary content transformation chain (operation S88).

First, a SAC is established between the content exporter 52 and the second content importer 53b. When the SAC is established, the content exporter 52 starts to transmit the content. At this time, a pair of the content handlers (that is, the content exporter 52-the second content importer 53b) supports the aforementioned multi-transmission protocol. Accordingly, a plurality of contents can be transmitted through a single session.

A plurality of contents can be transmitted through a single session corresponding to the second transmission session identifier provided by the request client RC1 (or generated by the content processing controller 41), according to the support of the multi-transmission protocol. The aforementioned transmission is sequentially performed from the content exporter 52. The contents which are transmitted from the content exporter 52 to the second content importer 53b may have types of neutral contents. As described above, a neutral content may indicate a clean content which is not encrypted by using a predetermined DRM. When the neutral content is transmitted to the second content importer 53b included in the second destination device DV2-2, the transmission is completed (operation S89).

On the other hand, the content exporter 52 and the second content importer 53b can report the transmission status of the content to the content processing controller 41. For this, the content processing controller 41 requests the content exporter 52 and the second content importer 53b to subscribe to the content-transmission-status event and receives an event message. The content processing controller 41 can recognize the transmission status of each content and also provide the transmission status information to the request client RC1.

In Example 3-2, the procedures of constructing the plurality of content transformation chains in response to the request of the request client RC1 and transmitting a single content or multi contents through multi sessions are described.

In the following Example 3-3, a case where the content requested by the request client RC1 is transmitted to a single destination by constructing a plurality of content transformation chains will be described. In Example 3-3, an example in which two content transformation chains are constructed will be described.

EXAMPLE 3-3

Figure 27:
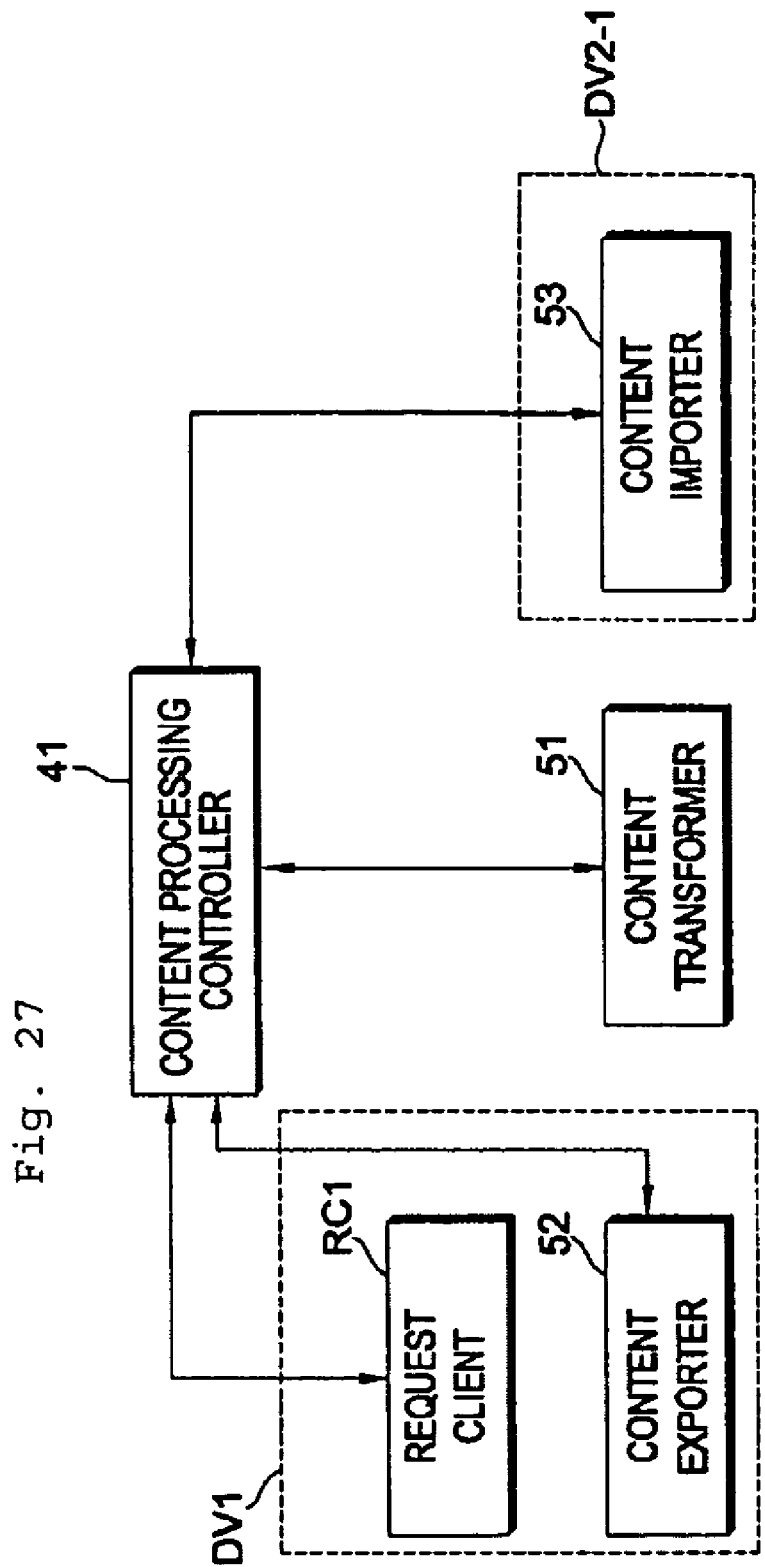
FIG. 27 is a block diagram illustrating a structure of a system for a content transmission procedure according to Example 3-3.

FIG. 27 is a block diagram illustrating a structure of a system for a content transmission procedure according to Example 3-3.

Referring to FIG. 27, the request device DV1 may include the request client RC1 and the content exporter 52. In addition, the destination device DV2 includes the content importer 53. The content transmission controller and the content transformer 51 may be included in a device separated from the request device DV1 or the destination device DV2.

Figure 28:
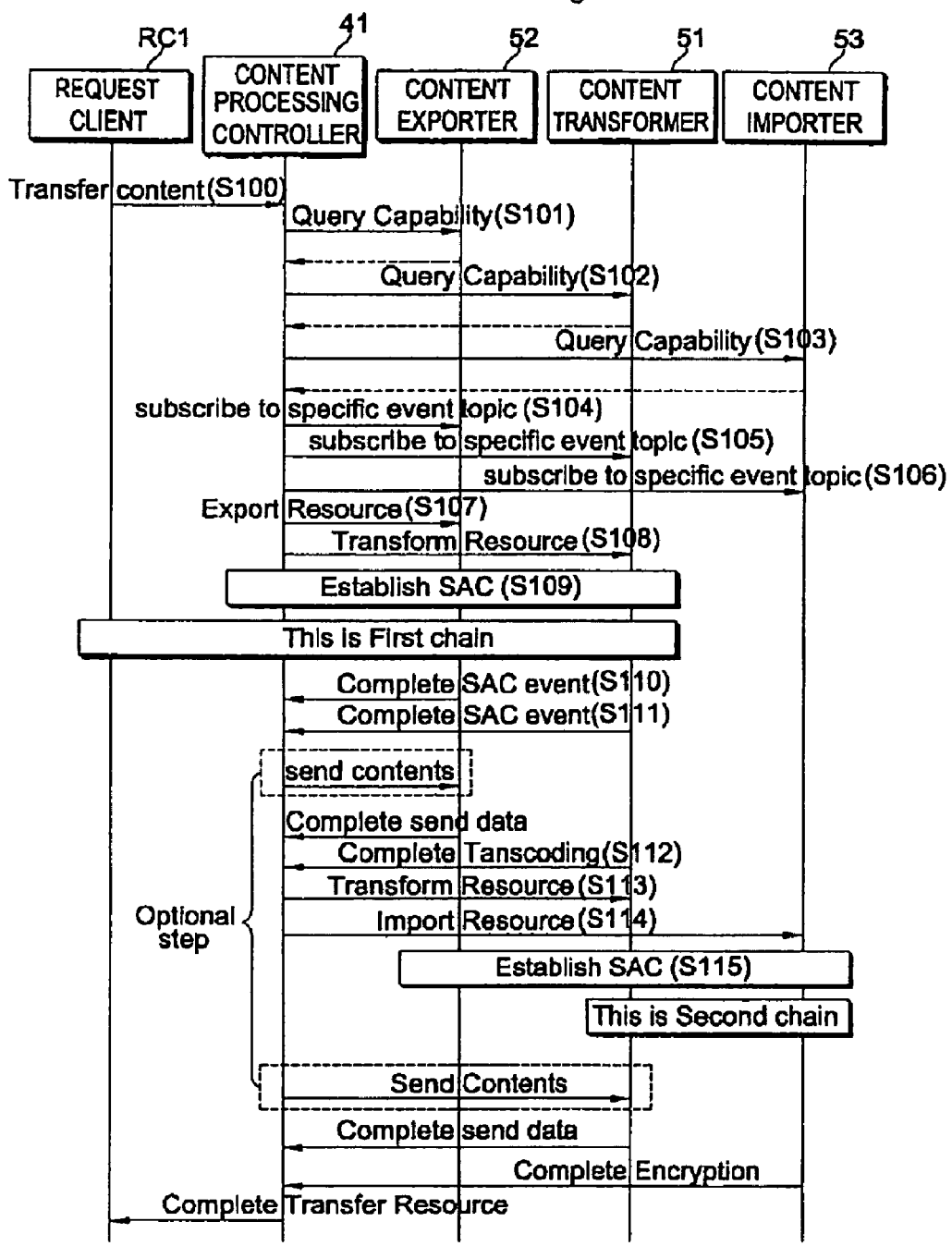
FIG. 28 is a flowchart illustrating the content transmission procedure according to Example 3-3.

FIG. 28 is a flowchart illustrating the content transmission procedure according to Example 3-3. FIG. 28 illustrates an example of a procedure of transmitting one or more contents included in the request device DV1 to the destination device DV2, which is the destination, in response to the request of the request client RC1.

Referring to FIG. 28, first, the request client RC1 transmits the content transmission request message for requesting the content to be transmitted to the content processing controller 41 (operation S100). At this time, the content transmission request message includes the transmission session identifier, the content identifier, the source information, the destination information, and the like. In addition, the content transmission request message may include the DRM system information of the destination which receives the content as an option.

The content identifier may indicate information for identifying the content requested to be transmitted. When there are a plurality of contents requested to be transmitted, a plurality of content identifiers for identifying the contents may exist.

The transmission session identifier indicates an identifier for uniquely identifying a transmission session. The source information indicates information for determining from where the requested content is transmitted. In Example 3-3, the source information may include the information on the request device DV1 and the format information.

The destination information includes information for identifying the destination device DV2 that is the destination to which the requested content is transmitted. The destination information may include a destination identifier for identifying the destination, information on a file format required by the destination, and the like.

When receiving the content transmission request message, the content processing controller 41 gathers information on the content handlers and determines whether the content is to be transmitted, based on the gathered information. When it is determined that the content is transmitted, the content processing controller 41 determines the content handlers which participate in the transmission (operations S101 to S103).

First, the content processing controller 41 query one or more content exporters 52, content importers, and content transformers 51 about the capabilities and obtain responses from the corresponding entities. Accordingly, the capabilities of the sources, midway and destination devices, systems, and DRMs can be recognized.

When information is gathered, the content processing controller 41 determines whether the requested content is to be transmitted based on the gathered information. That is, it is checked whether the content handlers normally transmit the requested content. Here, the format of the required content, the policy of the system, information on a secure authenticated channel algorithm which can be executed among entities, and the like may be considered.

When the transmission of the content is determined, the content processing controller 41 determines the content exporter 52 and the content transformer 51 and controls the content exporter 52 and the content transformer 51 to construct the primary content transformation chain with the content exporter 52 and the content transformer 51. In Example 3-3, an example of a case where the format of the content requested to be transmitted is different from the format of the content required by the destination device DV2 is described. Accordingly, the content transformer 51 has to be included in the content transformation chain.

Figure 29:
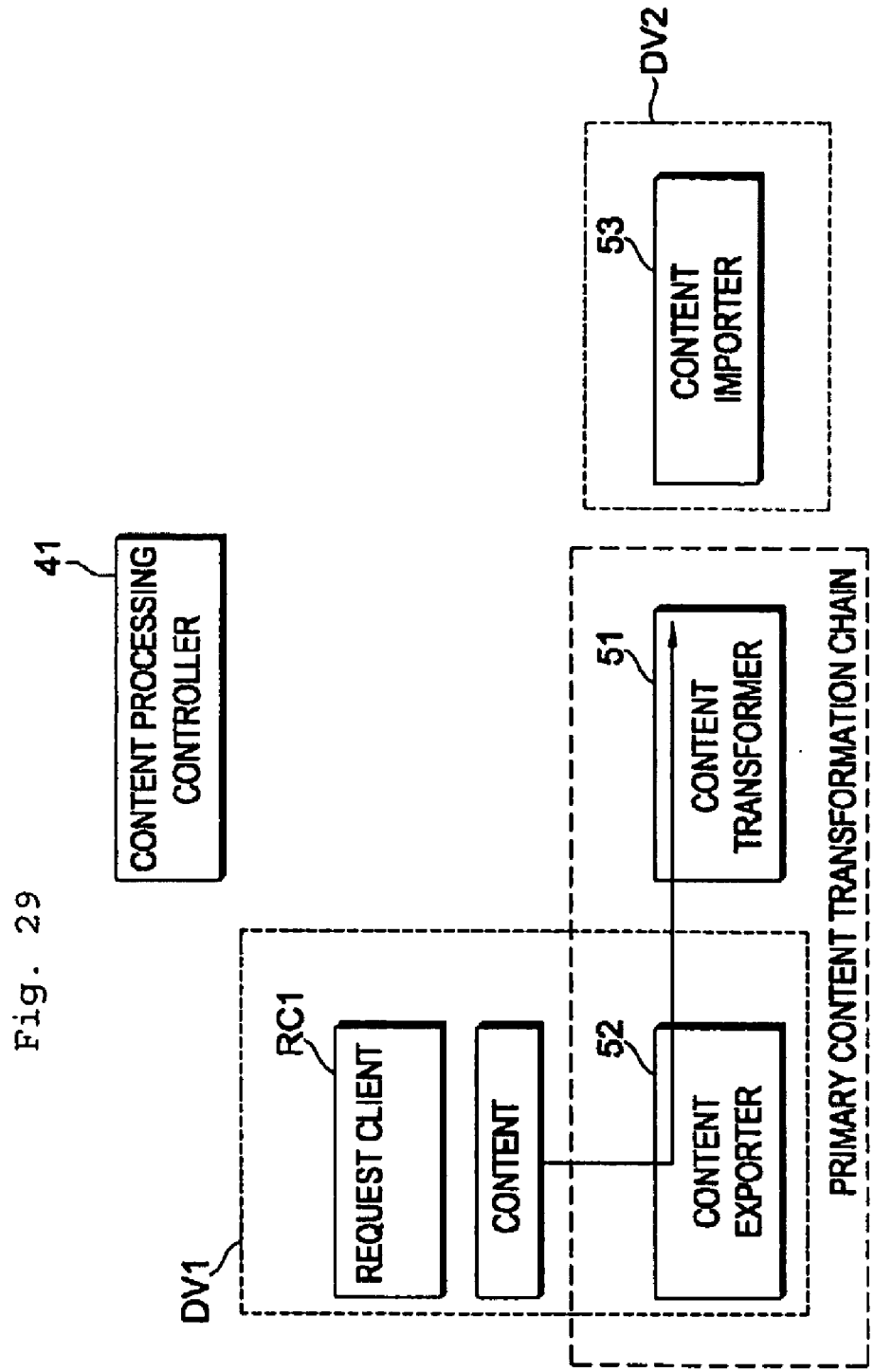
FIG. 29 shows an example of a primary content transformation chain constructed with a content processing controller.

FIG. 29 shows an example of a primary content transformation chain constructed with a content processing controller 41. Referring to FIG. 29, the primary content transformation chain includes the content exporter 52 and the content transformer 51.

Subsequently, the content processing controller 41 sends a content export request and a content transformation request respectively to the content exporter 52 and the content transformer 51 included in the primary content transformation chain (operations S107 and S108). The aforementioned requests are performed by transmitting a control message to the content handlers.

When the content is requested to be exported, the content processing controller 41 can provide the transmission session identifier, the content identifier, and the information on the content transformer 51, which is the receiver, to the content exporter 52. In addition, when the content is requested to be transformed, the content processing controller 41 can provide the transmission session identifier, the content identifier, the information on the content exporter 52 which is the transmitter, the information on the content importer 53 which is the receiver, a format of the required content, information on a transformed format, and the like.

As described above, when the content exporter 52 and the content transformer 51 respectively receive the content export request and the content transformation request from the content processing controller 41, a SAC is established between the content exporter 52 and the content transformer 51 (operation S109). The content exporter 52 and the content transformer 51 can report to the content processing controller that the SAC is established (operations S110 and S111).

When the SAC is established, the content exporter 52 starts to transmit the content. At this time, each pair of the content handlers (that is, the content exporter 52-the content transformer 51) can support the multi-transmission protocol. As described above, the multi-transmission protocol serves to enable multi-contents to be transmitted through a single session. When a plurality of contents are requested to be transmitted, the plurality of contents may be transmitted through a single session, according to the support of the multi-transmission protocol.

The aforementioned transmission is sequentially performed from the content exporter 52. The content exporter 52 transmits the requested content to the content transformer through the SAC. Then, the content transformer 51 transforms the format of the content into the required format.

The content exporter 52 and the content transformer 51 can report the transmission status or transformation status of the content to the content processing controller 41. For this, the content processing controller 41 has to subscribe to a predetermined event by requesting content handlers to provide the predetermined event before requesting the content to be exported (operations S104 to S106).

The predetermined event may include the content transmission status providing event and a content transformation status providing event. As described above, the content handlers, which participate in the transmission, can report situations such as the start of the content transmission, the transmission of the content, the completion of the content transmission, the error of the content transmission, and the like as the event message by using the content transmission status providing event.

The content transformation status providing event can be performed by the content transformer 51. The content processing controller 41 can subscribe to the content transformation status providing event by requesting the content transformer 51 to provide the content transformation status providing event. Then, the content processing controller 41 can be provided with the situations such as the start of the content transformation, the transformation of the content, the completion of the content transformation, the error of the content transformation, and the like.

When the content transmitted from the content exporter 52 is transmitted to the content transformer 51, and when the format transformation of the content is completed (operation S112), the content processing controller 41 has to construct the secondary content transformation chain including the content transformer 51 and the content importer 53. The first and secondary content transformation chains sequentially operate under the control of the content processing controller 41.

Figure 30:
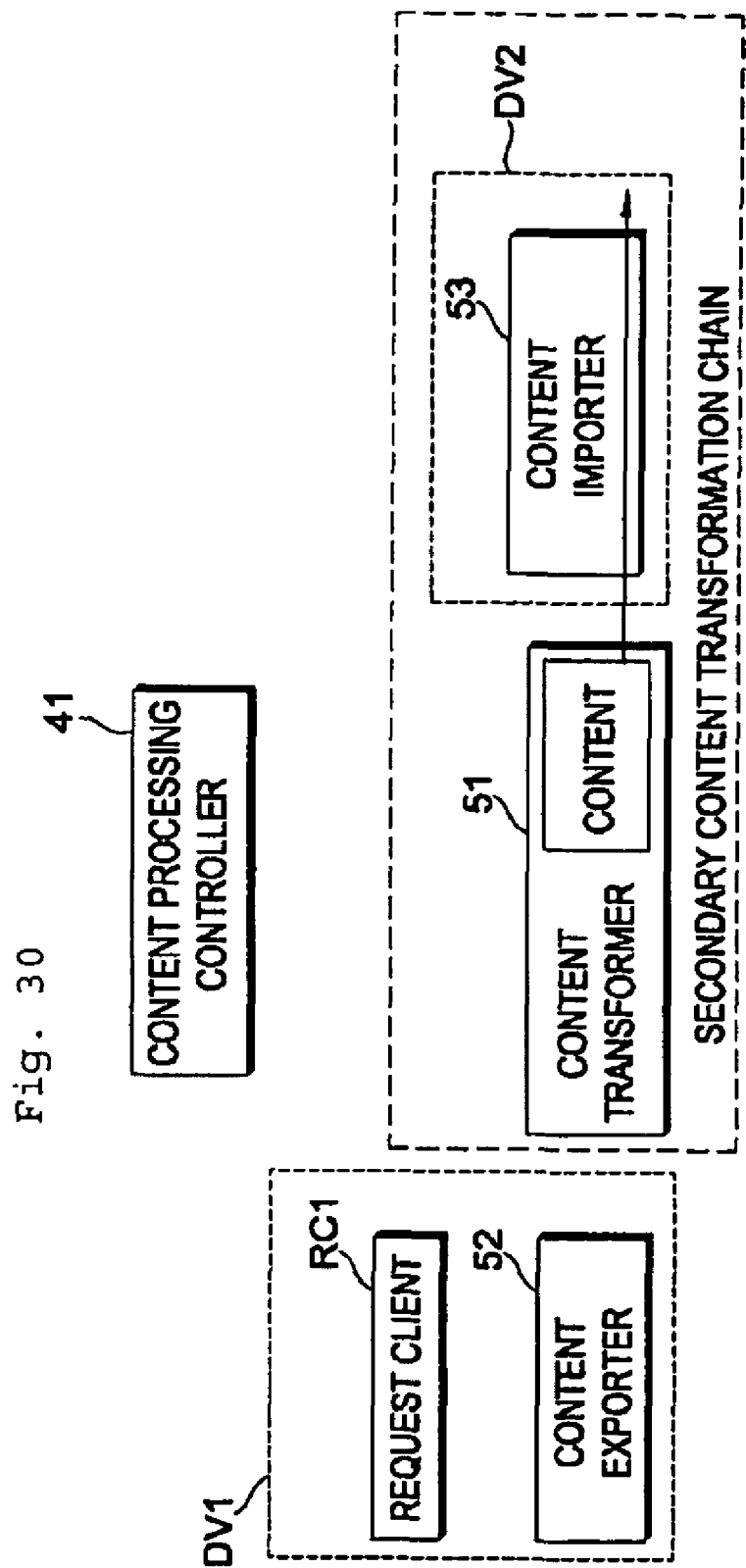
FIG. 30 shows an example of a secondary content transformation chain constructed with a content processing controller.

FIG. 30 shows an example of a secondary content transformation chain constructed with a content processing controller 41.

As shown in FIG. 30, the secondary content transformation chain includes the content transformer 51 and the content importer 53. The content processing controller 41 sends the content transformation request and the content import request respectively to the content transformer 51 and the content importer 53 included in the secondary content transformation chain (operations S113 and S114). A SAC is established between the content transformer 51 and the content importer 53 (operation S115). At this time, a SAC may be also established between the content importer 53 and the destination device DV2.

The content transformer 51 transmits the content of which the format is transformed to the content importer 53 through the SAC. Then, the content importer 53 receives the transmitted content. The content transformer 51 and the content importer 53 can report the transmission status of the content to the content processing controller 41. The content transmitted from the content transformer 51 to the content importer 53 is a neutral content. As described above, the neutral content may indicate a clean content which is not encrypted by using a predetermined DRM.

In Example 3-3, the procedure of transmitting the content requested by the request client RC1 to a single destination by constructing two content transformation chains is described.

In the following Example 3-4, a case where the content requested by the request client RC1 is transmitted to a plurality of destinations by constructing a plurality of content transformation chains will be described.

Figure 31:
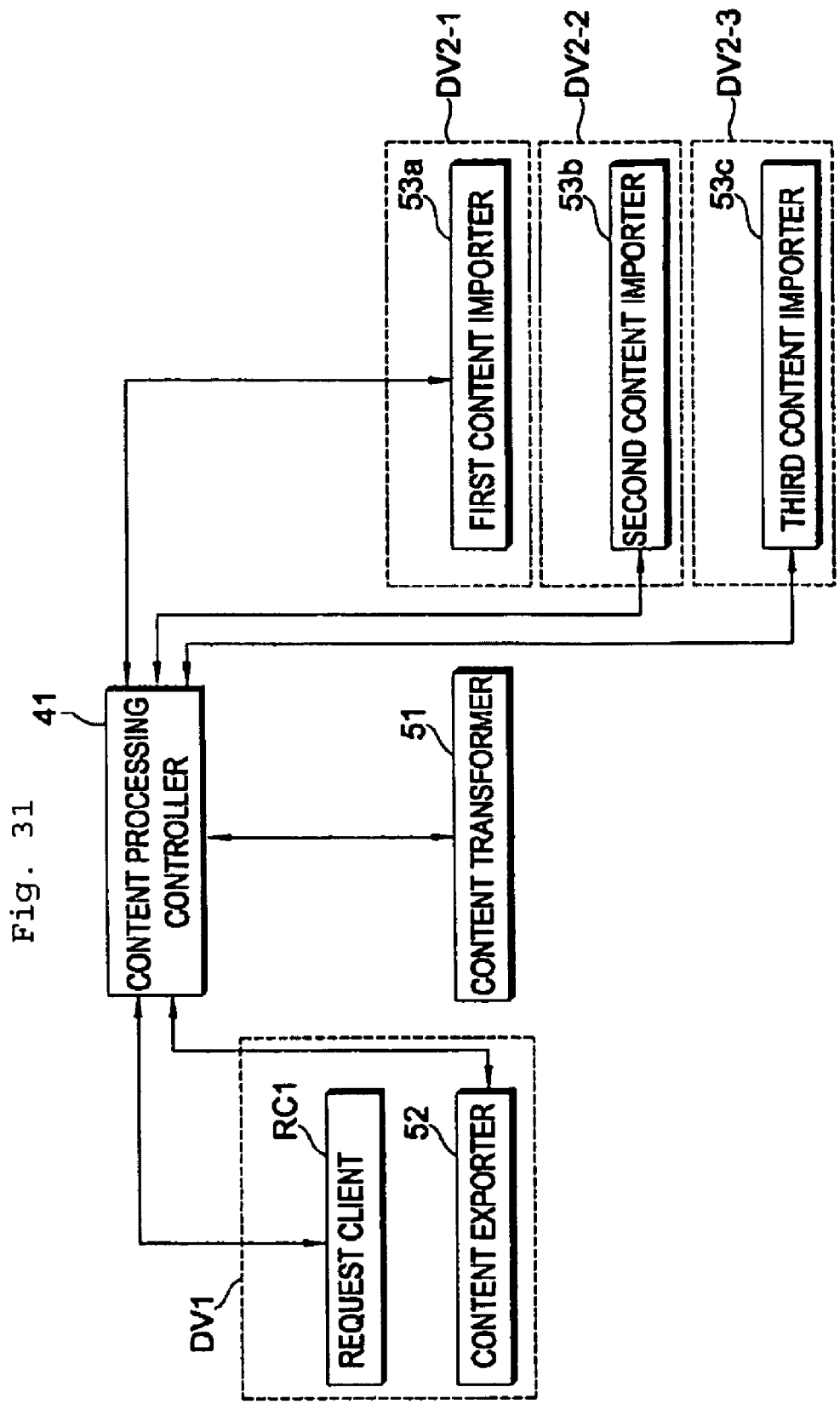
FIG. 31 is a block diagram illustrating a system for transmitting a content according to Example 3-4.

FIG. 31 is a block diagram illustrating a system for transmitting a content according to Example 3-4.

Referring to FIG. 31, the request device DV1 may include the request client RC1 and the content exporter 52. In addition, the first destination device DV2-1 includes the first content importer 53a. The second destination device DV2-2 includes the second content importer 53b. A third destination device DV2-3 includes a third content importer 53c. The content transmission controller and the content transformer 51 may be included in a device separated from the request device DV1 or the destination device DV2.

Figure 32:
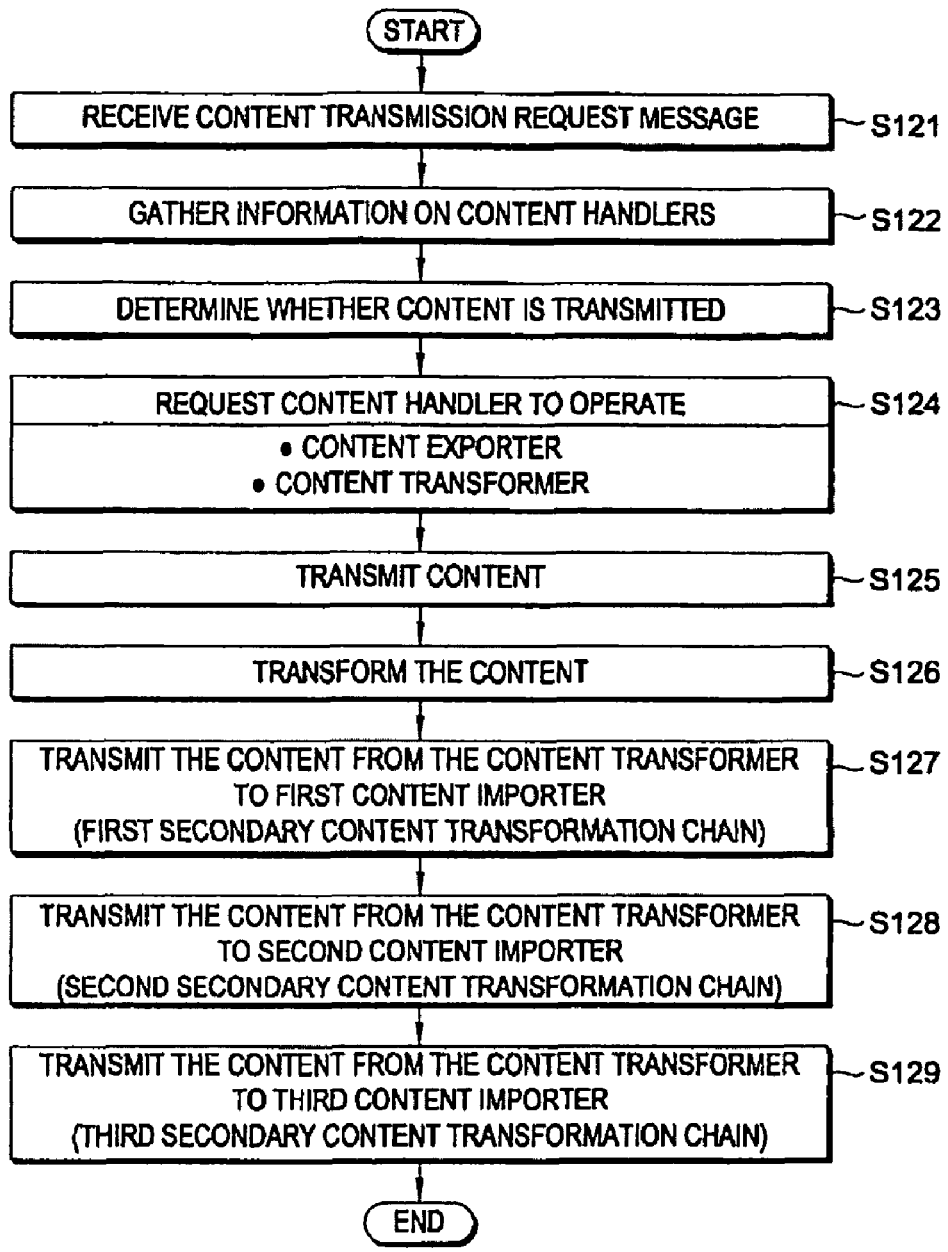
FIG. 32 is a flowchart illustrating a content transmission procedure according to Example 3-4.

FIG. 32 is a flowchart illustrating a content transmission procedure according to Example 3-4. FIG. 32 illustrates an example of a procedure of transmitting a content included in the request device DV1 to the first to third destination devices DV2-1 to DV2-3, which are three destinations, in response to the request of the request client RC1.

Referring to FIG. 32, the request client RC1 transmits the content transmission request message for requesting the content to be transmitted to the content processing controller 41 (operation S121). At this time, the content transmission request message includes the transmission session identifier, the content identifier, the source information, the destination information, and the like. In addition, the content transmission request message may include the DRM system information of the destination which receives the content, as an option.

The content identifier may indicate information for identifying the content requested to be transmitted. When there is a plurality of contents requested to be transmitted, a plurality of content identifiers for identifying the contents may exist.

The transmission session identifier indicates an identifier for uniquely identifying a transmission session. The source information indicates information for determining from where the requested content is transmitted. In Example 3-4, the source information may include information on the request device DV1 and format information.

The destination information includes information for identifying the destination device DV2 that is the destination to which the requested content is transmitted. In Example 3-4, the destination information may include information on the first to third destination devices DV2-1 to DV2-3, format information required by the destination devices DV2, and the like. In Example 3-4, the file formats required by the first to third destination devices DV2-1 to DV2-3 are assumed to be the same. However, the present invention is not limited thereto.

When receiving the content transmission request message, the content processing controller 41 gathers information on the content handlers (operation S122). For example, the content processing controller 41 queries one or more content exporters 52, content importers 53, and content transformers 51 about the capabilities and obtains responses from the corresponding entities. Accordingly, the capabilities of the sources, midway and destination devices, systems, and DRMs can be recognized.

When information is gathered, the content processing controller 41 determines whether the requested one or more contents are transmitted, based on the gathered information. That is, it is checked whether the content handlers normally transmit the requested content. Here, the format of the required content, the policy of the system, information on a secure authenticated channel algorithm which can be executed among entities, and the like may be considered.

When the transmission of the content is determined, the content processing controller 41 controls the content exporter 52 and the content transformer 51 so as to construct the primary content transformation chain including the content exporter 52 and the content transformer 51. In Example 3-4, an example of a case where the format of the content requested to be transmitted is different from the format of the content required by the destination device DV2 is described. Accordingly, the content transformer 51 has to be included in the content transformation chain. In the present description, a chain is constructed by receiving a control command for constructing the content transformation chain from the client. However, the present invention is not limited thereto. There are various embodiments such as an example in which the content processing controller may generate a control command for constructing a chain and construct the chain.

Figure 33:
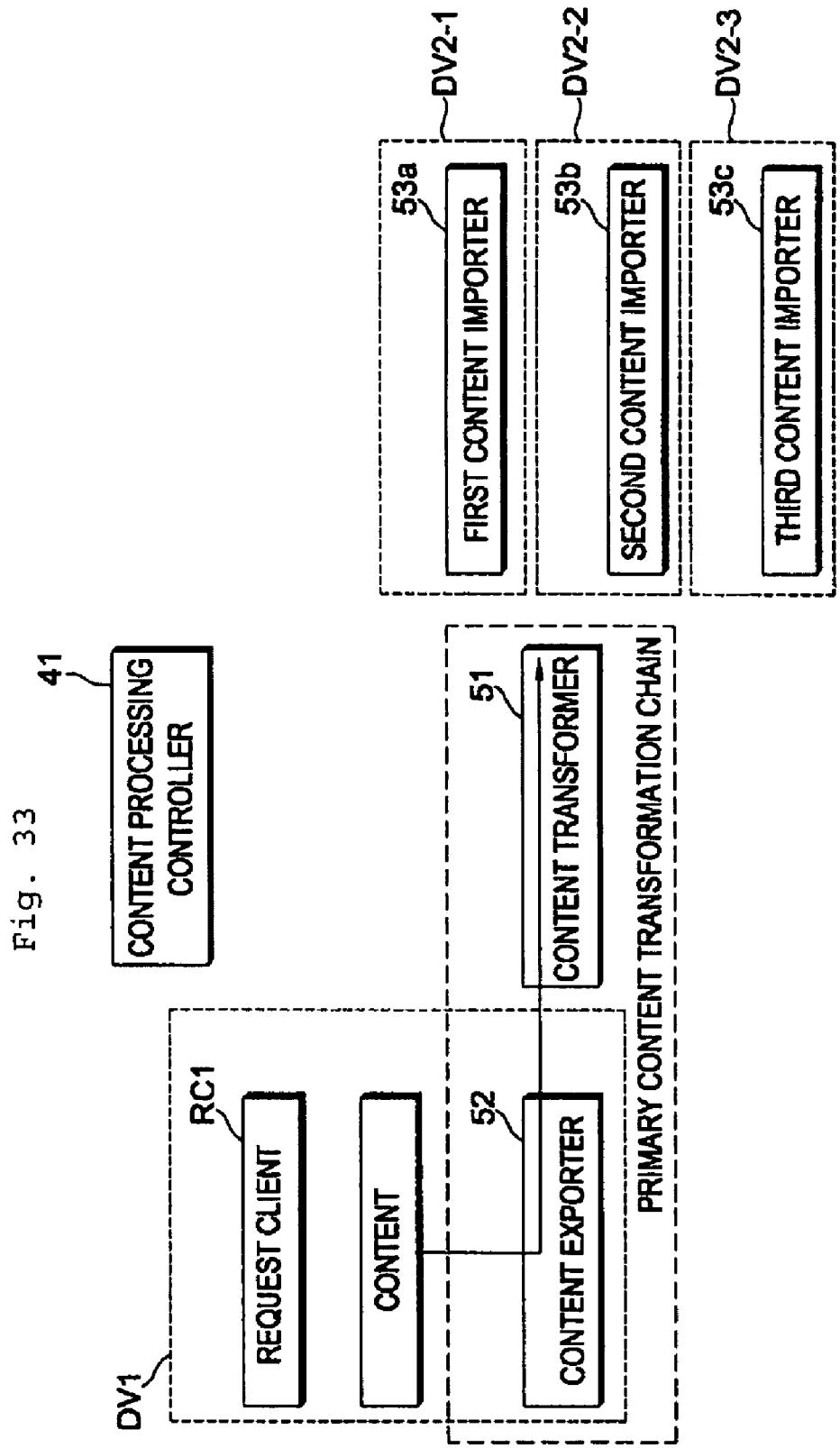
FIG. 33 illustrates an example of a primary content transformation chain constructed with a content processing controller.

FIG. 33 illustrates an example of a primary content transformation chain constructed with a content processing controller 41. Referring to FIG. 33, the primary content transformation chain includes the content exporter 52 and the content transformer 51.

Subsequently, the content processing controller 41 sends a content export request and a content transformation request respectively to the content exporter 52 and the content transformer 51 included in the primary content transformation chain (operation S124). The aforementioned requests are performed by transmitting a control message to the content handlers.

When the content is requested to be exported, the content processing controller 41 can provide the transmission session identifier, the content identifier, and the information on the content transformer 51, which is the receiver, to the content exporter 52. In addition, when the content is requested to be transformed, the content processing controller 41 can provide the transmission session identifier, the content identifier, the information on the content exporter 52 which is the transmitter, the information on the content importer 53 which is the receiver, a format of the required content, information on a transformed format, and the like.

As described above, when the content exporter 52 and the content transformer 51 respectively receive the content export request and the content transformation request from the content processing controller 41, a SAC is established between the content exporter 52 and the content transformer 51.

When the SAC is established, the content exporter 52 starts to transmit the content (operation S125). At this time, each pair of the content handlers (that is, the content exporter 52-the content transformer 51) can support the multi-transmission protocol. Since the multi-transmission protocol is supported, when a plurality of contents are requested to be transmitted, the plurality of contents may be transmitted through a single session.

The aforementioned transmission is sequentially performed from the content exporter 52. The content exporter 52 transmits the requested content to the content transformer through the SAC. Then, the content transformer 51 transforms the format of the content into the format required by the destination device DV2 (operation S126).

The content exporter 52 and the content transformer 51 can report the transmission status or transformation status of the content to the content processing controller 41. For this, the content processing controller 41 has to subscribe to a predetermined event by requesting content handlers to provide the predetermined event before requesting the content to be exported. At this time, the predetermined event may include the content transmission status providing event and a content transformation status providing event. Since this is described in Example 3-3, the detailed description will be omitted.

When the content transmitted from the content exporter 52 is transmitted to the content transformer 51, and when the format transformation of the content is completed, the content processing controller 41 sequentially constructs a plurality of secondary content transformation chains corresponding to the plurality of destinations. The plurality of secondary content transformation chains may include first to third secondary content transformation chains. Here, the first to third secondary content transformation chains may be sequentially or concurrently formed. In addition, the method of constructing content transformation chains may include a method of forming a chain from a starting point to a destination and repeatedly forming the chain (a plurality of single chains are constructed as described in Example 3-2) or a method of separately forming chains by distinguishing the chains based on transformation times (described in Examples 3-3 and 3-4). Also, a plurality of transmission session identifiers are required for transmitting data through a plurality of secondary chains. These transmission session identifiers may be generated in the client or content processing controller 41, or the content transformer 51.

Figure 34:
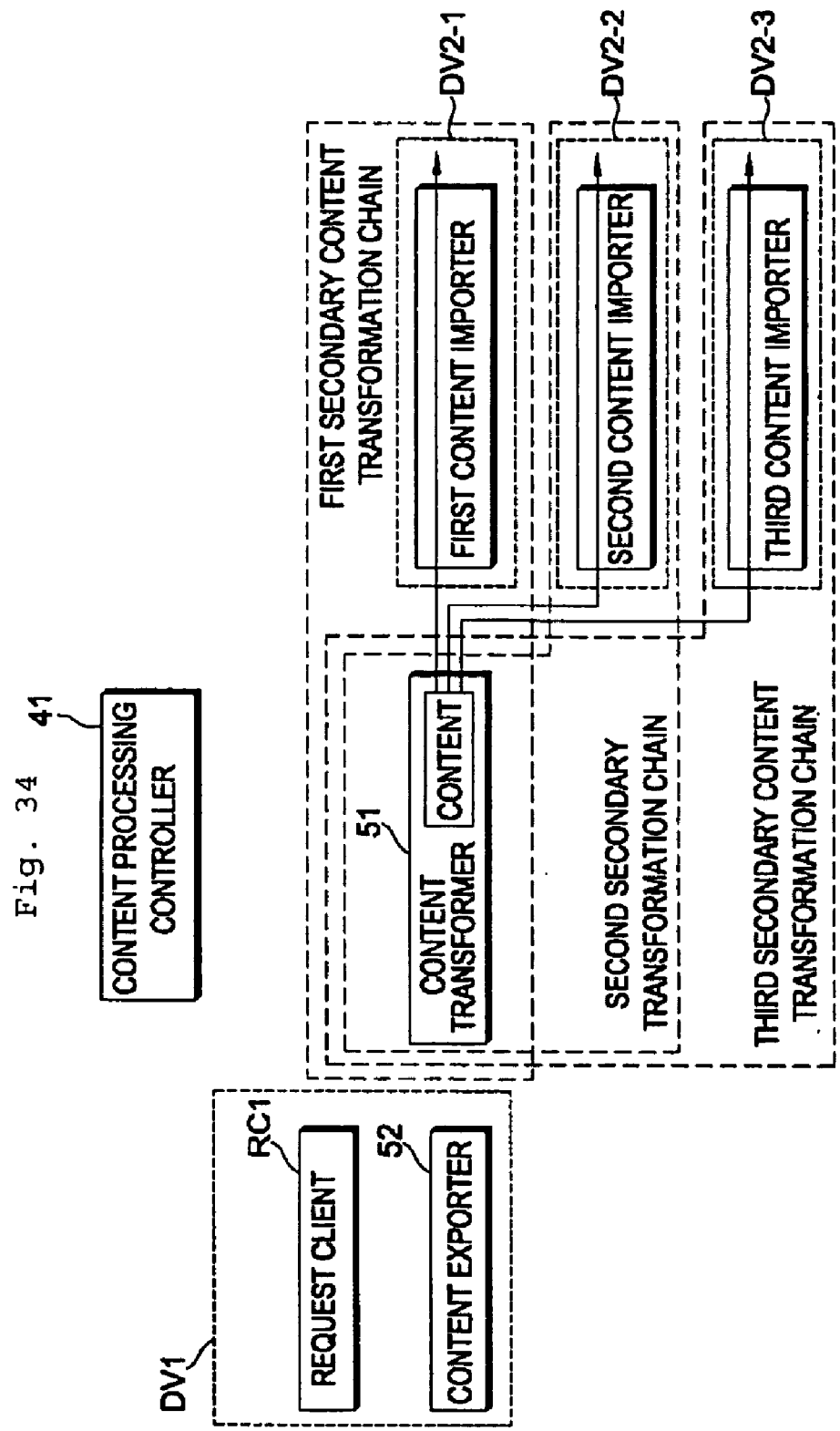
FIG. 34 illustrates an example of structures of a first secondary content trans-formation chain, a second secondary content transformation chain, and a third secondary content transformation chain induced by a content processing controller.

FIG. 34 illustrates an example of structures of a first secondary content transformation chain, a second secondary content transformation chain, and a third secondary content transformation chain induced by a content processing controller 41.

As shown in FIG. 34, the first secondary content transformation chain may include the content transformer 51 and the first content importer 53a. The content transformation controller transmits the content transformation request and the content import request respectively to the content transformer 51 and the first content importer 53a. An SAC is established between the content transformer 51 and the first content importer 53a. When the SAC is established, the content is transmitted from the content transformer 51 to the first content importer 53a (operation S127).

When the content is transmitted to the first content importer 53a, the content processing controller 41 constructs the second secondary content transformation chain. At this time, the second secondary content transformation chain may include the content transformer 51 and the second content importer 53b. The content transformation controller transmits the content transformation request and the content import request respectively to the content transformer 51 and the second content importer 53b. Then, a SAC is established between the content transformer 51 and the second content importer 53b. When the SAC is established, the content is transmitted from the content transformer 51 to the second content importer 53b (operation S128).

When the content is transmitted to the second content importer 53b, the content processing controller 41 constructs the third secondary content transformation chain. At this time, the third secondary content transformation chain may include the content transformer 51 and the third content importer 53c. The content transformation controller transmits the content transformation request and the content import request respectively to the content transformer 51 and the third content importer 53c. Then, when the SAC is established, the content is transmitted from the content transformer 51 to the third content importer 53c (operation S129).

On the other hand, the content handlers included in the secondary content transformation chain can transmit the event message for representing the transmission status of the content and the like to the content processing controller 41 according to the progress of the transmission process. The aforementioned event has been described in Examples 3-1 to 3-3.

In Example 3-4, the procedure of transmitting the content requested by the request client RC1 to the plurality of destination devices DV2 by constructing the plurality of content transformation chains is described. In the method of transmitting the content according to Example 3-4, it is possible to broadcast a content to a plurality of destinations and reduce waste of transmission resources. It is possible to reduce the number of format transformation operations of the content performed so as to transmit the content to the plurality of destinations. Even though an error occurs in the secondary content transformation chain, the operation of the primary content transformation chain is already performed, and therefore, only the secondary content transformation chain has to be recovered.

4. Functions and Operations of the Processing Control Part and the License Processing Part On the other hand, the authenticated client of the client part can request the processing control part to transmit a license. For example, it is assumed that there are a first client device in which a first DRM is installed and a second client device in which a second DRM is installed. When a user intends to transmit a first DRM content stored in the first client device to the second client device, the first client can transmission the content to the second client device which is the destination, by using the aforementioned procedures of transmitting the content. In this case, when the second client device intends to use the transmitted content, a license suitable for the second DRM is required. Accordingly, the first client requests the license to be transmitted.

Figure 35:
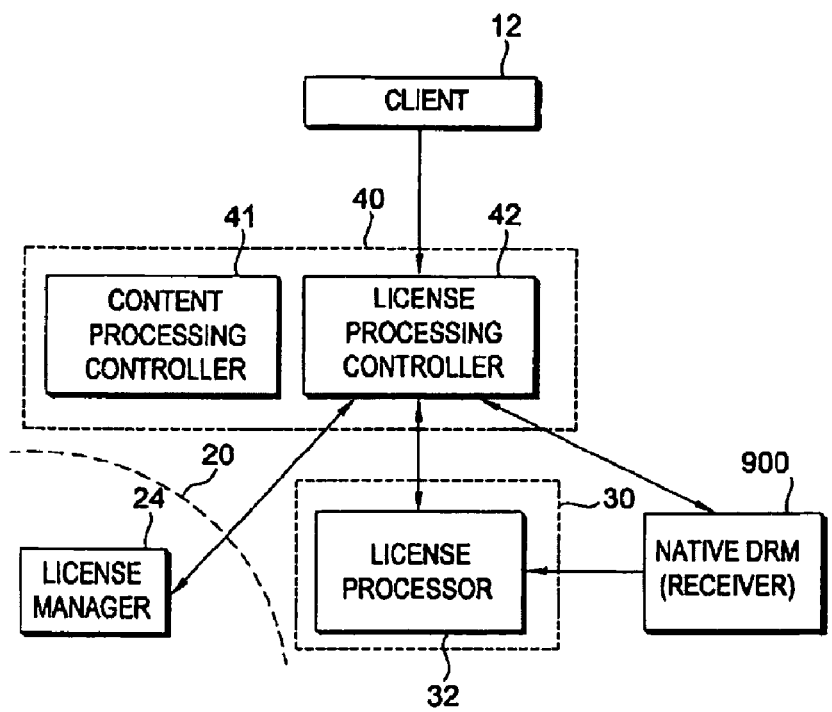
FIG. 35 is a block diagram illustrating a structure of a system related to a transmission of a license.

FIG. 35 is a block diagram illustrating a structure of a system related to a transmission of a license.

As shown in FIG. 35, the processing control part 40 includes the content processing controller 41 and the license processing controller 42. Here, the content processing controller 41 has been described before. The content processing controller 41 and the license processing controller 42 may be included in any place in the network area or local area. The content processing controller 41 and the license processing controller 42 may be located in different areas. For example, the content processing controller 41 may be included in a predetermined device in the local area. The license processing controller 42 may be included in a service provider in the network area. The locations of the content processing controller 41 and the license processing controller 42 are not limited.

The license processing controller 42 receives a license transmission request from a client. When receiving the license transmission request, the license processing controller 42 determines the entities which participate in the transmission and determines whether the license can be transmitted, by gathering information on entities included in the system. Accordingly, a chain through which the license is transmitted may be constructed.

The license manager 24 of the authentication and management part 20 and a license processor 32 of the license processing part 30 in addition to the license processing controller 42 can participate in the transmission of the license. The entities which participate in the transmission of the license may be included in any place in the network area or local area. SACs for security of the transmitted license information may be established among predetermined entities, at need.

The license processing controller 42 requests a predetermined entity, for example, the license manager 24 to provide one or more neutral licenses and receives the one or more neutral licenses. The neutral license may indicate compatible neutral license information from which license information of many types of DRMs can be extracted. When a user purchases a predetermined DRM content, the neutral license may be generated and stored in the license manager by using the license of the DRM. The neutral license 24 may be stored in the domain manager or reference point controller in addition to the license manager 24. In the procedure of transmitting a license, the entity which provides the neutral license may perform the function of the exporter.

The neutral license may include one or more related content identifiers, manager information, information on a subject which can use the license, usage models in which limitations of authority are described, and the like.

The license processing controller 42 generates a new neutral license to be practically transmitted by using the provided neutral license. At this time, various types of information such as the relation between the content and the subject, the destination, a mapping relation of the subject, a resource mapping relation, and the like can be considered.

The neutral license generated by the license processing controller 42 is transmitted to the license processor 32 of the license processing part 30. The license processor 32 is an entity which transmits the neutral license received form the license processing controller 42 to a native DRM receiver 900 of the destination. At this time, the license processor 32 may transform the received neutral license into the license suitable for the DRM of the destination and provide the transformed license to the native DRM receiver 900 by obeying the method defined in the DRM of the destination. Alternatively, the neutral license may be provided to the native DRM receiver 900 of the destination as it is. In this case, the license transformation is performed in the DRM system of the destination. The license processor and the native DRM receiver may respectively perform the functions of the transformer and the receiver.

The entities which participate in the transmission of the license can transmit an event message for representing the procedures of transmitting and processing the license to the license processing controller 42. For this, the license processing controller 42 has to subscribe to the license transmission status event by requesting the corresponding entity to provide the license transmission status event. The license processing controller 42 may provide information corresponding to the received event message to the client 3. In addition, the license processing controller 42 may provide an event message for representing a progress status such as the procedure of generating the neutral license and the procedure of providing the neutral license from the license manager 24 to the client.

Up to now, main functions of the DRM interoperable system including the client part 10, the authentication and management part 20, the processing control part 40, the content processing part 50, and the license processing part 30 are described. In the aforementioned description, the DRM interoperable system according to an exemplary embodiment of the present invention allows the neutral data (neutral format content or neutral license) to be compatible with the format required by the destination and transmits the neutral data to the destination, in response to the data (content or license) transmission request from the client.

5. Functions of Unit Entities and Procedures of Processing Events

Each part of the DRM interoperable system such as the client part 10, the authentication and management part 20, the processing control part 40, the content processing part 50, the license processing part 30, and the like is constructed with one or more entities. At this time, the entities may indicate modules or devices constructed as software or hardware which perform predetermined unique functions. Each entity may be constructed with one or more unit function modules which perform predetermined unit functions. The entity is installed in a predetermined device to communicate data with other entity through a predetermined interface. In addition, even though the entities belong to the same part, the entity may be installed in different devices. The devices may be different according to execution environments.

When the domain is initially constructed, the entity can report the existence of the entity to another entity in a particular environment in which the entity is included. For this, the entity may include a construction information provider which is a unit function module.

Figure 36:
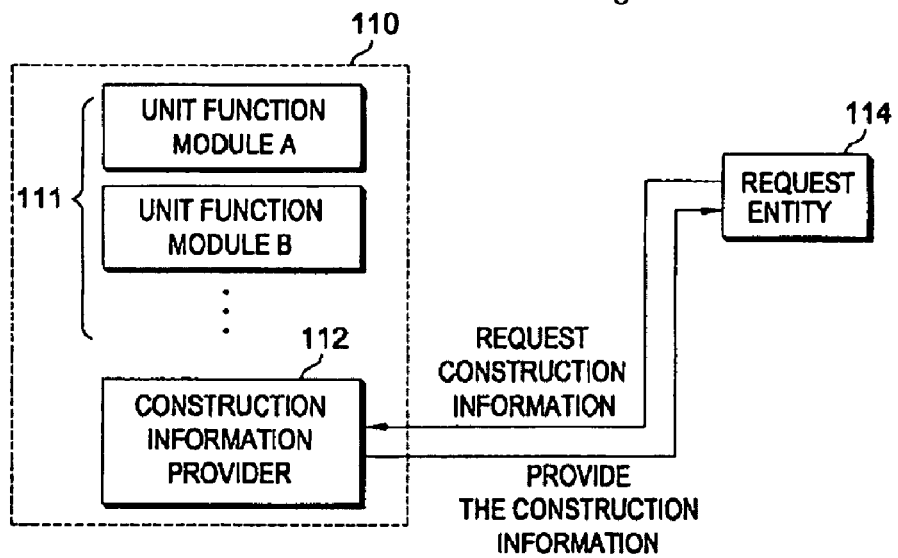
FIG. 36 shows an example for illustrating unit function modules included in an entity and functions of the unit function modules.

FIG. 36 shows an example for illustrating unit function modules included in an entity and functions of the unit function modules.

As shown in FIG. 36, a predetermined entity 110 includes a plurality of unit function modules 111 which perform unique unit functions and a construction information provider 112. The construction information provider 112 has to provide construction information of the predetermined entity 110 in response to the request for providing the construction information from the request entity which is another entity. At this time, the construction information may include information on the unit function module 111 included in the predetermined entity 110.

In addition, the construction information provider 112 can be requested by another entity to subscribe to a construction information change event. Then, the construction information provider 112 permits or does not permit the subscription by determining whether the subscription request is legal. At this time, the construction information change event may represent the event message including the change of the construction information of the predetermined entity 110, when the construction information of the predetermined entity 110 changes.

The construction information change event may be provided in a push or pull manner. In the push manner, the construction information provider 112 pushes the event message including the changed construction information to the request entity 114 which subscribes to the event, whenever the construction information of the predetermined entity 110 changes. In the pull manner, the request entity 114, which subscribes to the event, obtains the changed construction information of the predetermined entity 110 at need. When the request entity 114 requests the event to be subscribed to, it is reported to the construction information provider 112 whether the event message is transmitted in the push or pull manner. Accordingly, it is set whether the event message is transmitted in push or pull manner.

There are various types of events such as the aforementioned content transformation status event, the construction information transformation event, and the like, in addition to the construction information change event. Hereinafter, a procedure of performing an event among the entities will be described.

Figure 37:
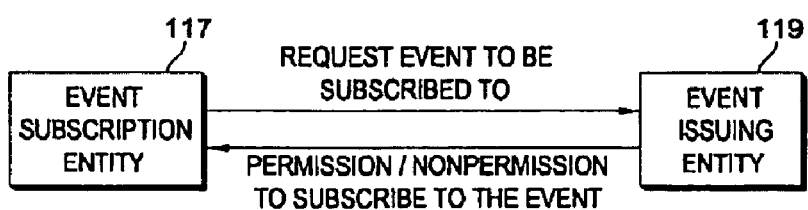
FIG. 37 shows an example for illustrating a procedure of transmitting an event between two authenticated entities.

FIG. 37 shows an example for illustrating a procedure of transmitting an event between two authenticated entities.

As shown in FIG. 37, an entity having a function of an event subscriber and an entity having an event issuing function have to exist so as to perform a predetermined event. Hereinafter, the entity having the function of the event subscriber is referred to as an event subscription entity 117. The entity having the event issuing function is referred to as an event issuing entity 119. In addition, the events may have event titles. An event title is information for representing which event among the content transmission status event, the construction information transformation event, and the like is the event.

The event issuing entity 119 has to have a unique identifier of its own. This is because the event issuing entity 119 can be distinguished from another event which performs an event having the same event title as the event performed by the event issuing entity 119. The unique identifier of the event issuing entity 119 may include a factor for representing sources of the event messages issued by the event issuing entity 119.

In order to subscribe to a predetermined event, the event subscription entity 117 has to request the event issuing entity 119 which issues the predetermined event to subscribe to the event.

When the event is requested to be subscribed to, the event subscription entity 117 provides the unique identifier for allowing the event issuing entity 119 to identify the event subscription entity 117. In addition, the event subscription entity 117 has to report to the event issuing entity 119 whether the event provided by the event issuing entity 119 is provided in the push or pull manner. Accordingly, it is set whether the event is provided in push or pull manner. At this time, in the push manner, the event issuing entity 119 automatically pushes the event message including the corresponding information into the event subscription entity 117, whenever the event condition occurs. On the other hand, in the pull manner, the event subscription entity 117 queries the event issuing entity 119 and obtains the event message, at need.

In addition, the event subscription entity 117 may provide an event subscription ID, expiration information, a structure of the event information desired to be provided, and the like to the event issuing entity 119. The expiration information may indicate a subscription expiration value of the event. For example, the expiration information may include an expiration data, subscription period of the event, and the like. When the expiration information is not provided, the subscription period is not limited.

The event issuing entity 119 permits or does not permit the subscription by determining whether the event subscription request is valid, in response to the event subscription request. At this time, response message including information for indicating permission on subscription and information for representing nonpermission on subscription is transmitted to the event subscription entity 117 in correspondence with the determination result.

In the determination, the event subscription ID, the expiration information, and the like may be considered. For example, in a case where the event subscription ID is provided by the event subscription entity 117 when the event is requested to be subscribed to, the event issuing entity 119 can consider whether the event subscription ID is valid and whether the event subscription ID is expired. At this time, when the event subscription ID provided by the event subscription entity 117 is not valid or expired, the event issuing entity 119 can transmit the message for indicating non-permission on the subscription to the event subscription entity 117. Alternatively, when the event subscription ID provided by the event subscription entity 117 is valid and not expired, the subscription ID and the information on the subscription ID can be used. On the other hand, in a case where the event subscription ID is not provided by the event subscription entity 117 when the event is requested to be subscripted to, the event issuing entity 119 can provide a new event subscription ID.

On the other hand, the event subscription entity 117 can cancel the current subscription of the event. For this, the event subscription entity 117 can send the message for indicating the cancellation of the event to the event issuing entity 119. In addition, the event subscription entity 117 may stop the subscription of the event by canceling the set method of providing the event. For example, in the method of providing the event currently selected as the push or pull manner so as to subscribe to the event, selection of the push and pull manners is cancelled.

Up to now, the construction information among entities and the method of processing the event have been described. Through the aforementioned method, it is possible for entities to interact with one another according to specific situations.

6. Method and Infra-System for Managing a Domain

Hereinafter, a method and an infra-system for managing a domain capable of managing movement of a domain location will be described. For this, current and previous locations of the domain can be stored and managed by using the domain manager which manages the domain. In addition, the movement of the domain location may be limited according to predetermined limitations.

The DRM interoperable system manages information on the movement of the domain location. Specifically, the DRM interoperable system limits the moved location of the domain or the number of movements. When it is found that the domain is formed out of the limited range by checking the location change of the domain, the DRM interoperable system destroys the domain or performs an additional action.

Hereinafter, a method of managing the domain capable of managing the location movement information of the domain will be described. An embodiment of the method of managing the domain to be described may include a method of limiting the number of movements of the domain, a method of limiting a formation location of the domain, and the like. For convenience of understanding, the former is referred to as Example 4-1, and the latter is referred to as Example 4-2. In addition, the basis of the systems of Examples 4-1 and 4-2 is illustrated in FIG. 2.

EXAMPLE 4-1

Figure 38:
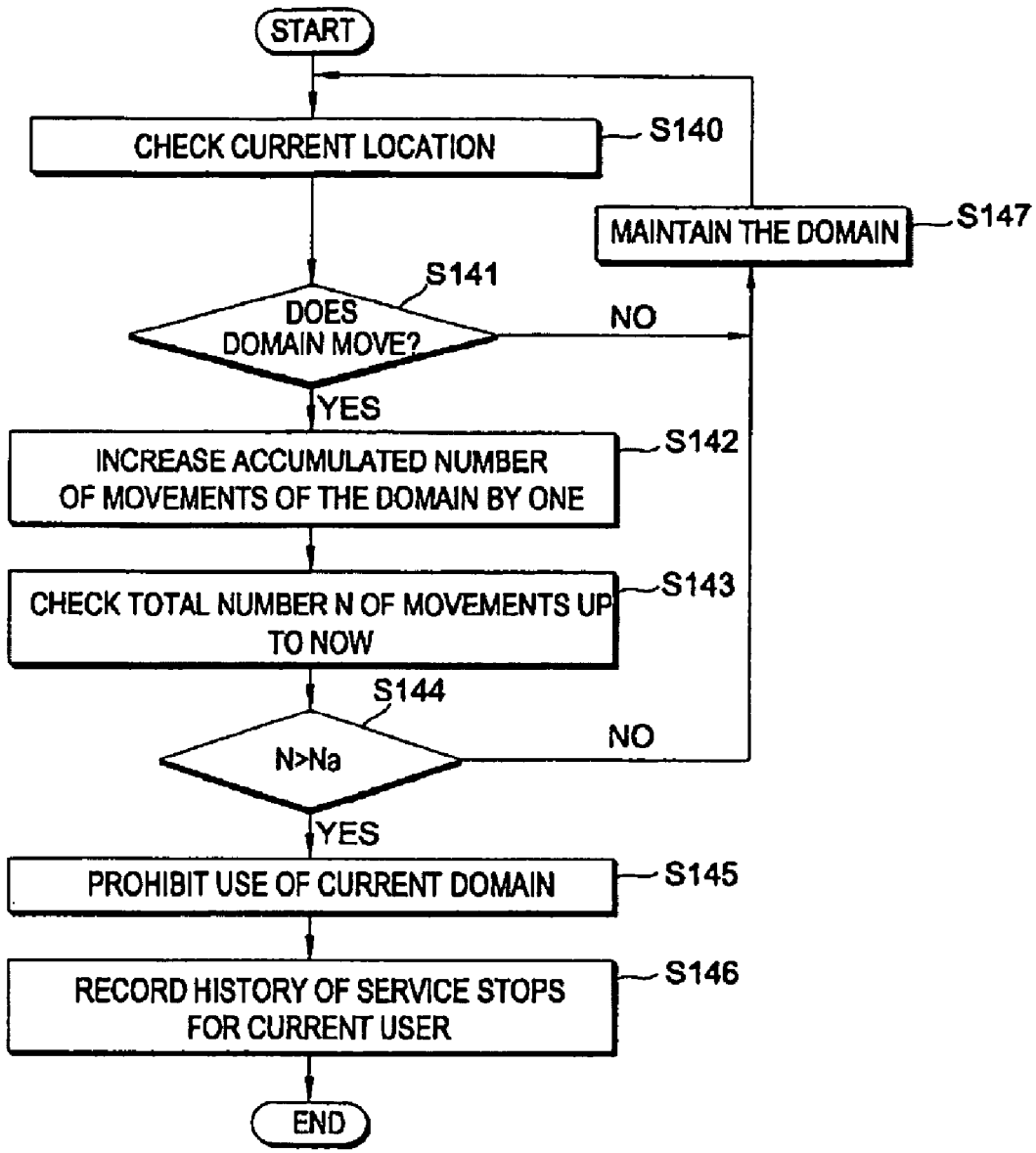
FIG. 38 is a flowchart illustrating a method of managing a domain according to Example 4-1.

FIG. 38 is a flowchart illustrating a method of managing a domain according to Example 4-1. FIG. 38 illustrates procedures of setting the permitted number Na of movements of the domain corresponding to login information, checking the number of the movements of the domain, and limiting the formation of the domain.

The domain manager 22 stores the permitted number Na of movements of the domain corresponding to the login information. The login information may be received from the license manager 24. Alternatively, the domain manager 22 may provide a login function. The permitted number Na of movements of the domain may depend on costs paid by a user. The upper limit of the number may be politically set by a service provider. The permitted number Na of the movements of the domain may be set as five, ten, and the like. In addition, the domain manager 22 stores and manages the current and previous locations of the domain. When the domain moves, the domain manager 22 stores and manages the number of movements.

Referring to FIG. 38, the domain manager 22 examines the current location of the domain 5 (operation S140) and determines whether the domain moves (operation S141). Specifically, it is determined whether the domain moves by comparing the current location of the domain with the location of the domain obtained from the previous examination. The determination may be performed every predetermined period. Selectively, the determination may be performed whenever a new domain is formed. Selectively, the determination may be arbitrarily performed depending on monitoring of the service provider.

The reference point controller 26 in the domain 5 can participate in the determination of the location of the domain 5. At this time, the reference point controller 26 may be a reference point with respect to the formation location of the local domain. The reference point controller 26 may be included in a predetermined device that subscribes to the domain 5 in the local area. The reference point controller 26 reports the information on the inside of the domain 5, for example, the information on the location of the domain 5 to the domain manager 22 as a representative of other client devices in the domain.

Alternatively, the reference point controller 26 may not participate in the determination of the location of the domain 5. Each device may provide the information on the location in the domain by accessing the domain manager 22. That is, the reference point controller 26 may participate or not participate in the determination of the location of the domain. This is a selective factor according to execution environments.

Accordingly, the location of the domain 5 may indicate the location of the reference point controller 26 in the domain or the location of each device. On the other hand, it is possible to improve security by limiting the number of selections of the reference point controller including the reference point controller 26 to the predetermined number. In addition, the user may login through the reference point controller 26.

Methods of determining the location of the domain will be described in the following.

In a first method, the location of the domain can be determined by using an IP address of the reference point controller 26. In this case, the first method can be performed in a model to which a high-speed internet provider allocates a fixed IP.

In a second method, the location of the domain can be determined by using an IP subnet address of the reference point controller 26. For example, when the subnet address is the same as the previously detected subnet address, it is considered that the domain does not move. When the subnet address is changed and when TTL is not within three hops, it is considered that the domain moves.

In a third method, when the domain enters a neighboring area of the reference point controller 26, the location of the domain is recognized by using a media access control (MAC) address of the reference point controller 26. For example, when a set-top box, which is considered as a separate reference point controller by a high-speed internet provider, is installed in a house, the periphery of the set-top box is set as the domain. A device connected to the set-top box in a wired or wireless manner is recognized that the device enters in a predetermined domain. Accordingly, the location of the device can be designated.

In a fourth method, the location of the domain can be determined by using a global positioning system (GPS).

In a fifth method, in case of a mobile terminal such as a mobile phone, the location of the device in the domain can be determined by a base station.

On the other hand, when it is determined that the domain moves, the domain manager 22 increase the previous number of movements of the domain by 1 (operation S142) and identifies the total number N of movements of the domain, which has been increased up to now (operation S143). Alternatively, when the domain does not move, the currently formed domain 5 is maintained (operation S147).

Subsequently, the domain manager 22 compares the current total number N of movements of the domain with the stored permitted number Na of movements of the domain (operation S144). When as a result of comparison, it is determined that the total number N of movements of the domain is equal to or less than the permitted number Na of movements of the domain, the domain manager 22 maintains the current domain 5 (operation S147). Alternatively, when the total number N of movements of the domain is greater than the permitted number Na of movements of the domain, the domain manager 22 prohibits the use of the current domain (operation S145).

Next, the domain manager 22 records a history of service stops with respect to the current user (operation S146). Additionally, the domain manager reports information on the domain destruction to the service provider. The service provider or domain manager 22 may transmit a warning message to the user. In addition, the service provider or domain manager 22 induces the user to purchase new domain login information through a consumer payment system.

On the other hand, the accumulated number of movements of the domain may be reset every period according to a policy of the service provider. For example, the number of movements of the domain may be annually reset.

EXAMPLE 4-2

Figure 39:
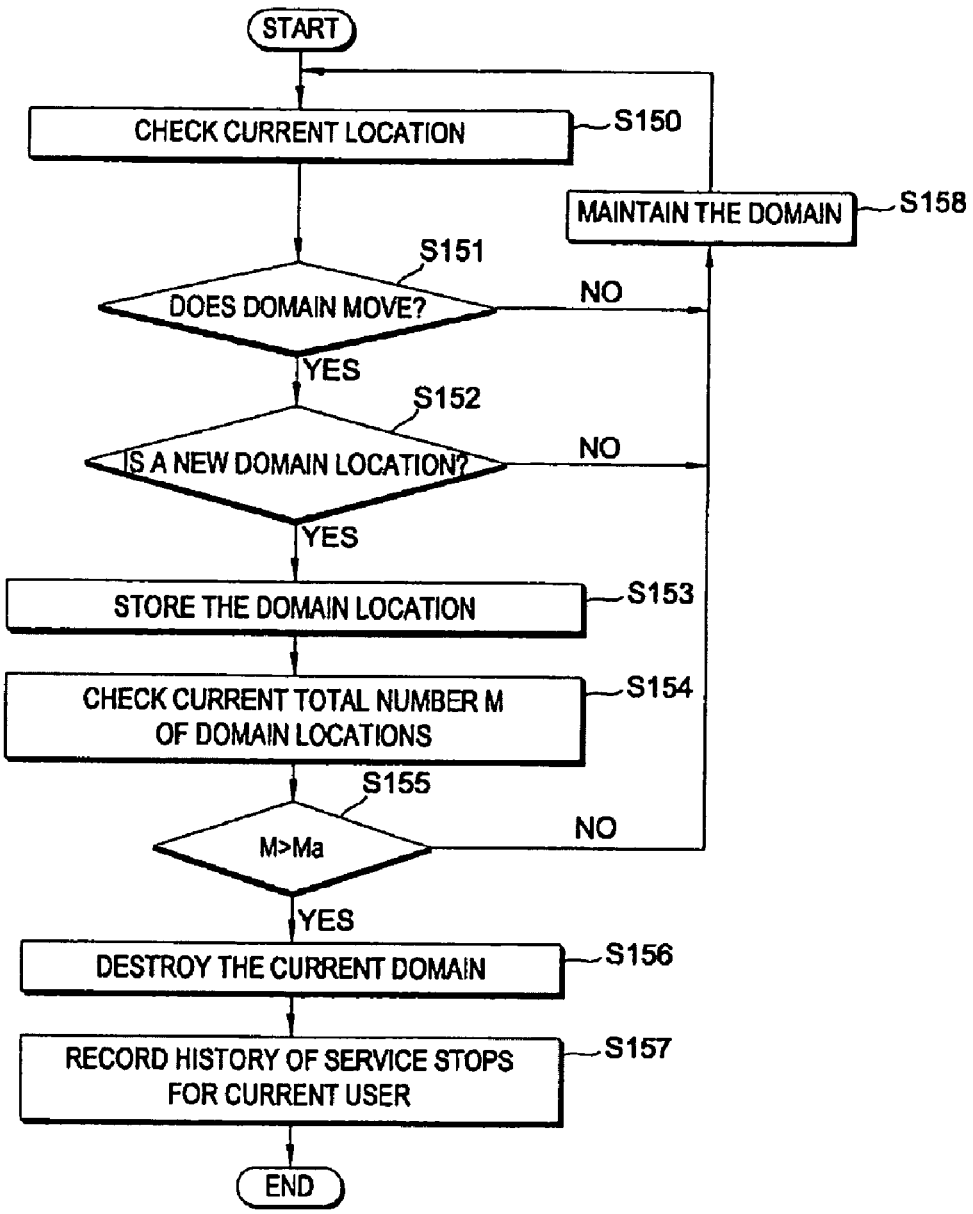
FIG. 39 is a flowchart illustrating a method of managing a domain according to Example 4-2.

FIG. 39 is a flowchart illustrating a method of managing a domain according to Example 4-2. FIG. 39 illustrates a procedure of limiting generation of a domain by checking a formation location of the domain.

For this, the domain manager 22 stores the permitted number Ma of domain locations corresponding to login information. The permitted number Ma of the domain locations may depend on costs paid by a user. The upper limit of the number may be politically set by a service provider. The permitted number Ma of the domain locations may be set as five, eight, and the like. In addition, the domain manager 22 stores and manages the current and previous locations of the domain.

Referring to FIG. 39, the domain manager 22 examines the current location of the domain 5 (operation S150) and determines whether the domain moves (operation S151). Specifically, it is determined whether the domain moves by comparing the current location of the domain with the location of the domain obtained from the previous examination. The determination may be performed every predetermined period. Selectively, the determination may be performed whenever a new domain is formed. Selectively, the determination may be arbitrarily performed depending on monitoring of the service provider.

As described above, the reference point controller 26 may participate or may not participate in the determination of the location of the domain 5. The location of the domain 5 can be determined by using the IP address, the IP subnet address, the MAC information of the reference point controller 26, the GPS, mobile communication information, and the like.

When it is determined that the domain does not move, the domain manager 22 maintains the current domain 5 (operation S158). On the other hand, when it is determined that the domain moves, the domain manager 22 determines whether the current location of the domain is a new location by comparing the current location of the domain 5 with the stored previous locations of the domain (operation S152).

When it is determined that the current location of the domain is not a new location, the domain manager 22 maintains the current domain 5 (operation S158). On the other hand, when the current location of the domain is a new location, the domain manager 22 stores the current location of the domain (operation S153).

Subsequently, the domain manager 22 obtains the total number M of domain formation locations including the current location of the domain 5 (operation S154) and compares the obtained number M with the predetermined permitted number Ma of domain locations (operation S155). As a result of comparison, when it is determined that the total number M of the domain formation locations is equal to or less than the permitted number Ma of domain locations, the domain manager 22 maintains the current domain 5 (operation S156). Alternatively, when the total number M of the domain formation locations is greater than the permitted number Ma of domain locations, the domain manager 22 destroys the current domain 5 (operation S157).

Next, the domain manager 22 records a history of service stops with respect to the current user. Additionally, the domain manager reports information on the domain destruction to the service provider. The service provider or domain manager 22 may transmit a warning message to the user.

As described above, in Example 4-2, the domain manager 22 limits formation of the domain according to formation locations of the domain. For example, when the service provider permits four domain formation locations, the domain manager 22 automatically memorizes the four locations of the domain from the first location of the domain and determines whether the subsequent formation location of the domain deviates from the permitted four locations. When the domain is formed only at the memorized locations, although the domain frequently moves, the movement of the domain is not limited. Alternatively, when the domain moves to another place except the four memorized locations, the domain manager 22 limits the formation of the domain.

On the other hand, in a case where an action range of the user is completely changed, for example, the user moves into a new house, when the location of the domain is mismatched with the previous location of the domain, the domain formation location needs to be newly stored based on the moved location except the domain formation location firstly memorized by the domain manager 22. In this case, the information on the domain formation location may be newly reset in response to the specific request of the user.

In addition, the information on the domain formation location may be reset by a policy of the service provider. In this case, the number of the resets may be limited. For example, the number of the resets of the information on the domain formation location may be limited to one or two per year. On the other hand, the change of the information on the domain formation location can be defined by using a service subscription contents and service login information in addition to a change of an IP address.

Up to now, the method of managing a domain capable of storing and managing current and previous locations of the domain and limiting the number of movements of the domain based on predetermined limitations is described.

7. Structure, Operation, and Scenario for Preventing Misuse and Contamination of a Content When non-reliable contents, for example, improper contents or contaminated contents, and the like are introduced into environments of sharing contents among different types of DRMs through the DRM interoperable system, a user or system may be exposed to the harm. A system and a scenario capable of coping with the harm are required.

Hereinafter, a method of processing a content by using a DRM interoperable system, in which suitable actions can be prepared by checking whether the externally introduced content is misused, contaminated, and applied with a security function, will be described.

Figure 40:
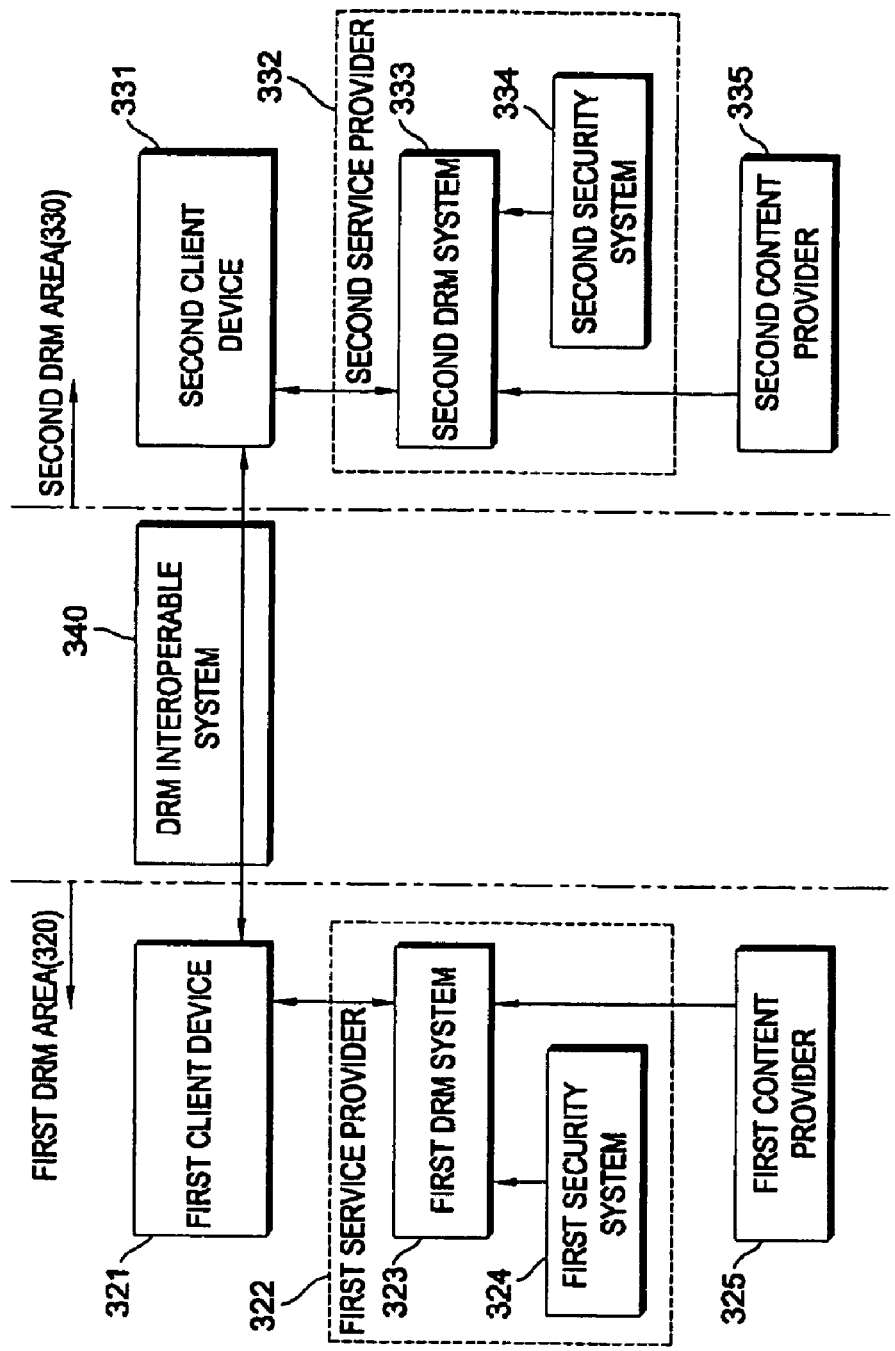
FIG. 40 is a block diagram illustrating a structure of a system of an environment in which different types of DRMs are compatible with each other.

FIG. 40 is a block diagram illustrating a structure of a system of an environment in which different types of DRMs are compatible with each other.

As shown in FIG. 40, a DRM interoperable system 340 provides a DRM interoperable function so that predetermined DRM areas, for example, first and second DRM areas 320 and 330 are compatible with each other. In FIG. 34, a case where two DRM areas are compatible with each other by using the DRM interoperable system is described. The present invention is not limited thereto. Three or more DRM regions may be compatible with one another by using the DRM interoperable system.

The first DRM region 320 may indicate a DRM protection area including a system or device which uses a first DRM employed by a first service provider 322.

The first DRM area 320 may include a first DRM system 323. The first DRM system 323 serves to generate a first DRM content and a first license, which is authority information for using the first DRM content by applying the first DRM to a source content provided by the first content provider 322 and provide the generated first DRM content and the first license to the first client device 210. At this time, the first client device 210 may indicate a device in which the first DRM is installed. Accordingly, the first client device 210 can use the first DRM content in the authority range allowed by the first license. In FIG. 40, the first content provider 325 is separated from the first service provider 322. However, the present invention is not limited thereto. The first content provider 325 may be the same as the first service provider 322. Alternatively, the first content provider 325 may be included in the first service provider 322.

The first DRM system 323 may interact with a first security system 325. The first security system 324 is used to apply a security function to the first DRM content. For example, the system may be a fingerprinting system which provides a tracking function for tracking a user who uses a content, a watermarking system for protecting copyright of an author, an anti-virus system for checking and curing virus contamination of the content, a misuse prevention system for preventing possibility of the misuse of the content, or an intrusion detection system (IDS).

The second DRM area 330 uses a DRM that is different from that of the aforementioned first DRM area 320. That is, the second DRM area 330 may indicate a DRM protection area including a system or device using the second DRM employed by the second service provider 332.

The second DRM area 330 may include a second DRM system 333. The second DRM system 333 serves to generate a second DRM content and a second license, which is authority information for using the second DRM content by applying the second DRM to a source content provided by the second content provider 335 and provide the generated second DRM content and the second license to the second client device 331. At this time, the second client device 331 may indicate a device in which the second DRM is installed. Accordingly, the second client device 331 can use the second DRM content in the authority range allowed by the second license. In FIG. 40, the second content provider 335 is separated from the second service provider 332. However, the present invention is not limited thereto. The second content provider 335 may be the same as the second service provider 332. Alternatively, the second content provider 335 may be included in the second service provider 332.

The second DRM system 333 may interact with a second security system 334. The second security system 333 is a system for applying a security function to the second DRM content. For example, the system may be a watermarking system, a fingerprinting system, an anti-virus system, a misuse prevention system, or an IDS.

Figure 41:
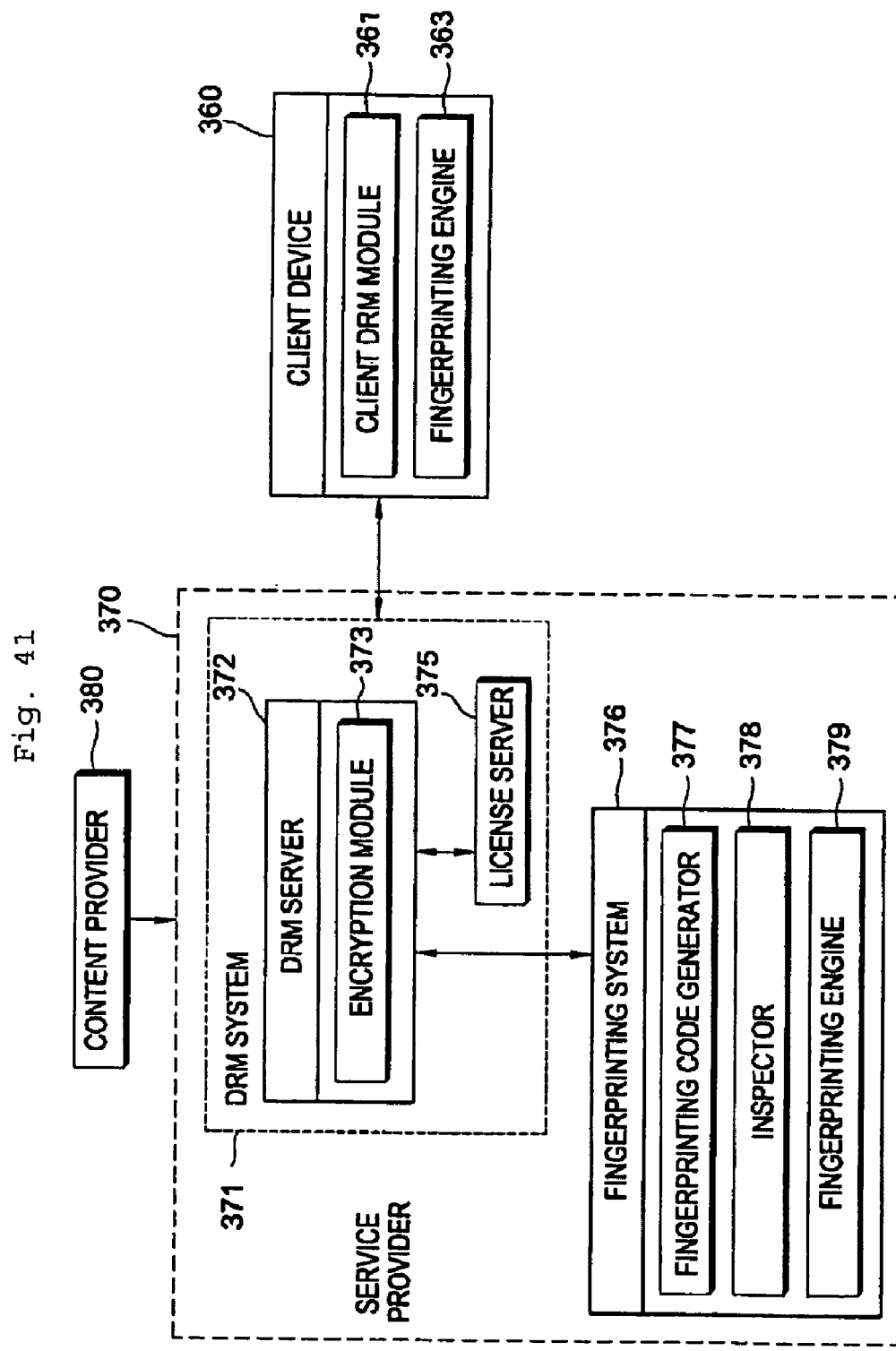
FIG. 41 is a block diagram illustrating a detailed structure of a DRM area.

FIG. 41 is a block diagram illustrating a detailed structure of a DRM area. The structure of the DRM area shown in FIG. 41 can be commonly applied to the structure of the first or second DRM area 320 or 330 shown in FIG. 40.

Referring to FIG. 41, a content provider 380 provides a content having a raw data type or a content to which a predetermined security function such as a watermark is applied to a DRM system 371.

A DRM server 372 of the DRM system 371 encrypts the provided content by using an encryption module and transmits a secret key value used to encrypt the content and the license information together with the encrypted content to a client device 360. The license information may be provided by a license server 375. A client DRM module 361 of the client device 360, which receives the encrypted content, recovers the content by decrypting the encrypted content.

In addition, fingerprinting information may be inserted into the content to be transmitted to the client device 360. The insertion of the fingerprint information is performed by a fingerprinting system 376 included in the service provider 370. The fingerprinting system 376 may include a fingerprinting code generator 377, an inspector 378, a fingerprinting engine 379, and the like. The fingerprinting information for identifying a user of the client device 360 may be inserted into the content transmitted to the client device 360. The insertion of the fingerprinting information may be performed by the fingerprinting engine included in the client device 360.

In FIG. 41, an example in which a fingerprinting function is applied to a content is illustrated. However, the security function which can be applied to the content may be the aforementioned watermarking function, misuse prevention function, or IDS function.

As shown in FIGS. 40 and 41, a security system for applying the security functions to the content such as a fingerprinting system, a watermarking system, an anti-virus system, a misuse prevention system, an IDS, and the like may be installed in the service provider of the DRM area. Alternatively, the security system may be included in the DRM interoperable system.

Figure 42:
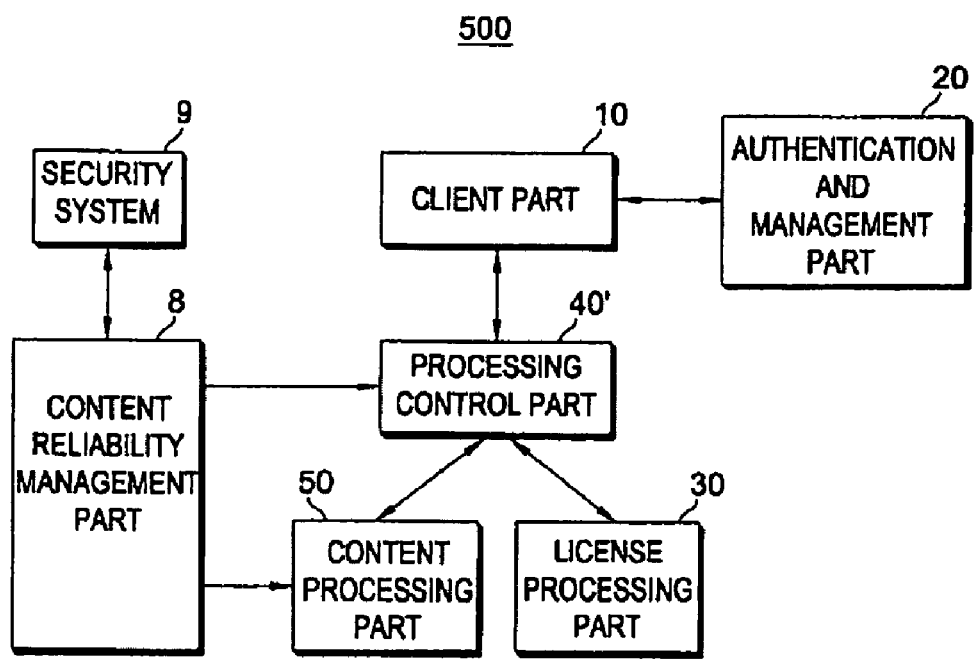
FIG. 42 is a block diagram illustrating a structure of a DRM interoperable system.

FIG. 42 is a block diagram illustrating a structure of a DRM interoperable system. FIG. 42 illustrates a case where the DRM interoperable system includes a function of securing reliability of an externally introduced content.

As shown in FIG. 42, the DRM interoperable system may further include a security system 9 and a content reliability management part 8. As described above, the security system 9 may indicate a fingerprinting system, a watermarking system, an anti-virus system, a misuse prevention system, or an IDS. The security system 9 may be included in a DRM interoperable system 500. Alternatively, the DRM interoperable system 500 may interact with another security system.

The content reliability management part 8 can interact with an external native DRM area and includes various processes for securing reliability of the content. When a content is externally requested to be introduced, the process of the content reliability management part 8 may be automatically performed. Alternatively, the process may be performed in response to a request of the processing control part. The process of the content reliability management part 8 will be described according to the following scenario.

Hereinafter, when a content is transmitted in the DRM interoperable environment, scenarios in which the reliability of the content can be secured will be described. At this time, in the DRM interoperable environment, a content can be transmitted from a predetermined DRM area to a target DRM area via the DRM interoperable system.

First, in the following description, there are sequentially described a scenario to which a misuse prevention policy can be applied when a DRM content is transmitted, a scenario which can prevent the content contaminated by viruses from spreading when the DRM is allowed to be compatible with another DRM, a scenario to which a watermarking function can be applied when the DRM is allowed to be compatible with another DRM, another scenario to which a watermarking function can be applied when the DRM is allowed to be compatible with another DRM, a scenario to which a fingerprinting function can be applied when the DRM is allowed to be compatible with another DRM, another scenario to which a fingerprinting function can be applied when the DRM is allowed to be compatible with another DRM, and a processing scenario used when a user of which fingerprint information is not matched with stored information requests a content to be transmitted. For convenience of understanding, the first scenario is referred to as Example 5-1. The second scenario is referred to as Example 5-2. The third scenario is referred to as Example 5-3. The fourth scenario is referred to as Example 5-4. The fifth scenario is referred to as Example 5-5. The sixth scenario is referred to as Example 5-6. The seventh scenario is referred to as Example 5-7.

EXAMPLE 5-1

Figure 43:
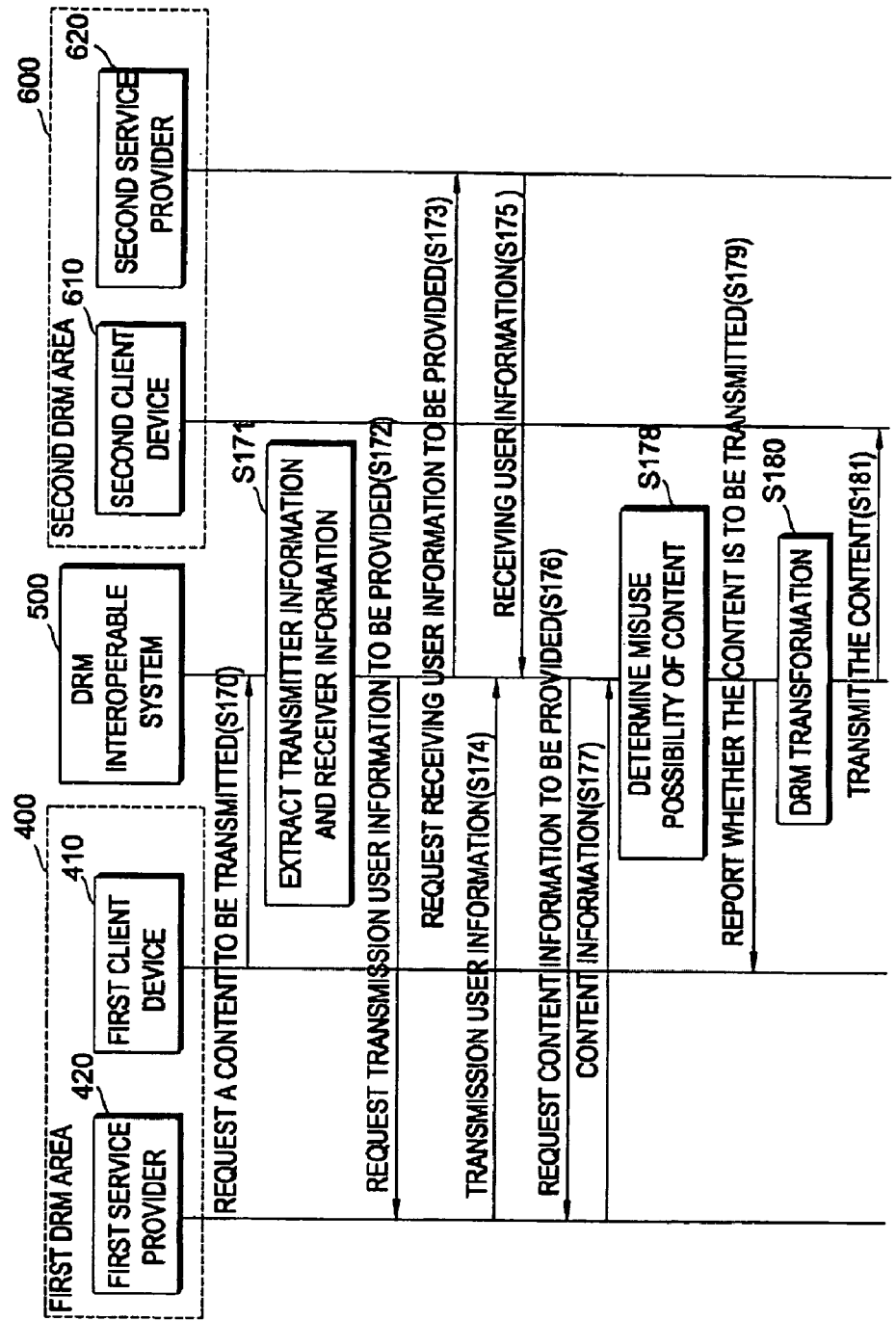
FIG. 43 is a functional block diagram illustrating a method of processing a content by using a DRM interoperable system according to Example 5-1.

FIG. 43 is a functional block diagram illustrating a method of processing a content by using a DRM interoperable system according to Example 5-1.

FIG. 43 illustrates a procedure to which a content misuse prevention policy can be applied when a DRM content is transmitted in a DRM interoperable environment.

The misuse prevention policy is designed to prevent a case where a DRM content is improperly used. For example, the misuse prevention policy may include a policy which previously prevents an infant from watching an adult content that cannot be used by a user under the age of 19.

As shown in FIG. 43, the DRM interoperable system 500 receives a content request message for requesting a predetermined content to be transmitted from a first client device 410 included in a first DRM area to a second client device 610 included in a second DRM area 600 (operation S170). The content transmission request message may include the content requested to be transmitted, information on a transmitter which transmits the content, information on a receiver which receives the content, and the like. At this time, since the requested content is transmitted from the first client device 410 included in the first DRM area 400, the requested content may indicate a content to which the first DRM is applied.

When receiving the request for transmitting the content, the DRM interoperable system 500 extracts transmitter information and receiver information from the received content transmission request message (operation S171). Subsequently, the DRM interoperable system 500 requests a predetermined entity of the first DRM area 406 to provide transmission user information corresponding to the extracted transmitter information (operation S172) and requests a predetermined entity of the second DRM area 600 to provide receiving user information corresponding to receiver information (operation S173).

At this time, the predetermined entity of the first DRM area 400 may be a first service provider 420. The predetermined entity of the second DRM area 600 may be a second service provider 620. Then, the first and second service providers 420 and 620 provide the transmission user information and the receiving user information to the DRM interoperable system 500 in response to the request (operations S174 and S175). The transmission user information and the receiving user information may be transmitted by communicating requests and responses between the DRM interoperable system 500 and the service providers 420 and 620.

The transmission user information may indicate information on the user of the first client device 410 which transmits the content. In addition, the receiving user information may indicate information on the user of the second client device 610 which receives the content. The transmission user information and the receiving user information includes predetermined information on the user, which is a determination standard for applying the content misuse prevention policy, for example, information on an age of the user.

Subsequently, the DRM interoperable system 500 may request a predetermined entity of the first DRM area 400, for example, the first service provider 420 to provide content information (operation S176). The first service provider 420 provides the content information in response to the request (operation S177). At this time, the content information may include limit information for preventing content misuse. For example, the content information may include information on an age limit of a user who can use the content.

Next, the DRM interoperable system 500 determines the possibility of the content misuse by comparing and analyzing the content information and transmission and receiving user information (operation S178) and reports to the first client device 410 whether the content is transmitted to the second client device 610 depending on the determination result (operation S179). In addition, the DRM interoperable system 500 may report to the second client device 610 whether the content is transmitted. The possibility of content misuse is determined by the DRM interoperable system 500 or external misuse prevention system.

For example, when the age limit information included in the content information represents that users under the age of 19 are not admitted and when the age of the transmission user is 15, the DRM interoperable system 500 determines that it is possible to misuse the requested content, reports a message for representing that the content cannot be transmitted to the first client device 410, and stops the procedure.

On the other hand, when the age of the receiving and transmission user is 24, the DRM interoperable system 500 determines that it is not possible to misuse the requested content and reports a message for representing that the content is normally to be transmitted to the first client device 410. After reporting the normal transmission, the DRM interoperable system 500 transforms the license information and a data protection technique applied to the requested content from the first DRM to the second DRM (operation S180) and transmits the transformation result to the second client device 610 (operation S181).

The content misuse prevention policy may be determined and accepted by conference or approval of DRM providers (not shown) related to the DRM interoperable system 500 and the service providers 420 and 620. In addition, communication messages among the first DRM area 400, the DRM interoperable system 500, and the second DRM area 600 may be communicated in a format of an extensible markup language (XML), hypertext markup language (HTML), or general data. When the communication is performed, a security channel with advanced encryption standard (AES) 128 bits or more may be provided.

EXAMPLE 5-2

Figure 44:
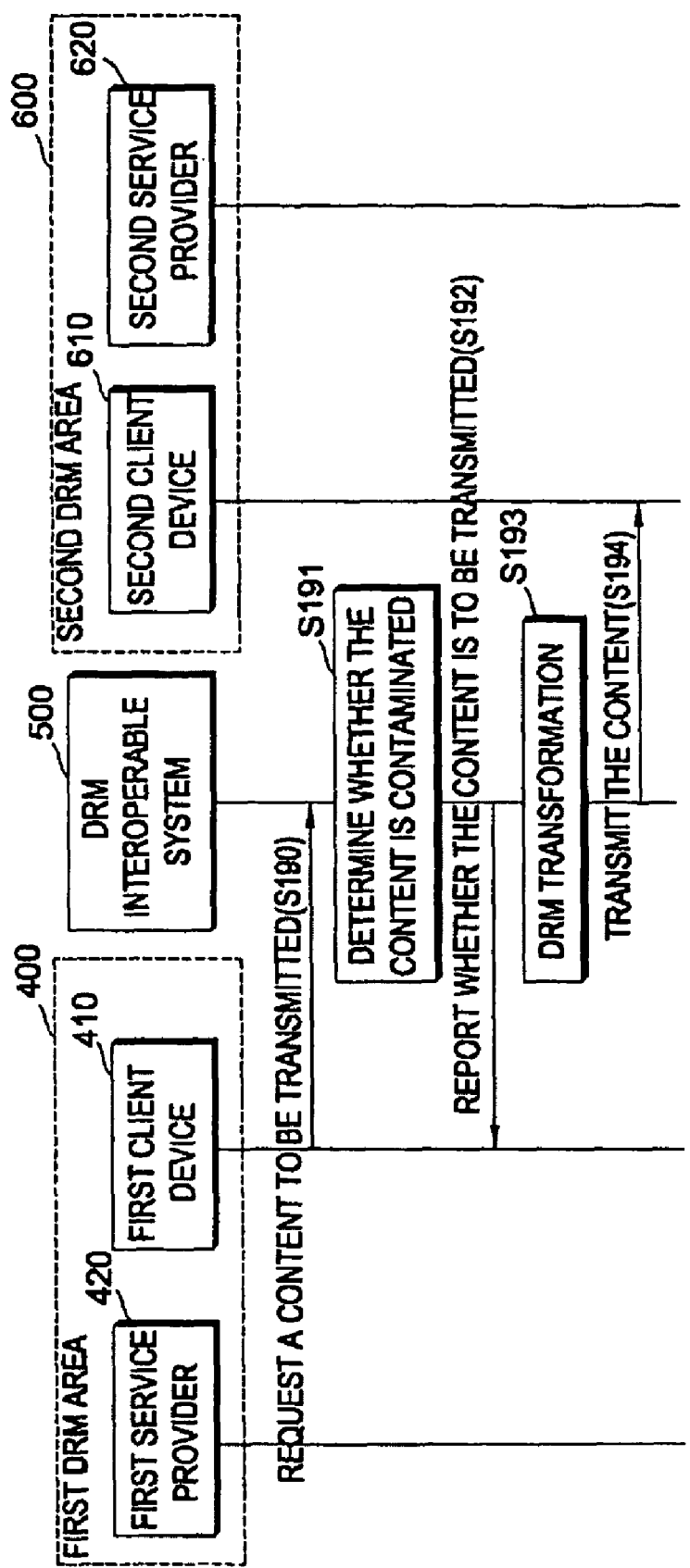
FIG. 44 is a functional block diagram illustrating a method of processing a content by using a DRM interoperable system according to Example 5-2.

FIG. 44 is a functional block diagram illustrating a method of processing a content by using a DRM interoperable system according to Example 5-2. FIG. 44 illustrates a procedure of preventing a content contaminated by viruses from spreading when a DRM is allowed to be compatible with another DRM.

As shown in FIG. 44, the DRM interoperable system 500 receives a content transmission request message for requesting a predetermined content to be transmitted from the first client device 410 to the second client device 610 (operation S190). The content transmission request message includes the content requested to be transmitted. Since the requested content is transmitted from the first client device 410 included in the first DRM area 400, the content indicates a content applied with the first DRM.

When receiving the content transmission request message, the DRM interoperable system 500 determines whether the content is contaminated by analyzing the requested content (operation S192). According to the determination result, the DRM interoperable system 500 determines whether the content is transmitted to the second client device 610 and reports the determination result to the first client device 410 (operation S193). At this time, the DRM interoperable system 500 may also report the determination result to the second client device 610.

For example, the DRM interoperable system 500 performs a virus check on the requested content. When the content is contaminated by viruses, the DRM interoperable system 500 determines that the content cannot be transmitted, reports a message for representing determination result to the first client device 410, and stops the procedure. In this case, the first client device 410 or the first service provider 420 can clean viruses from the content. Subsequently, the first client device 410 requests the DRM interoperable system 500 to retransmit the content.

Alternatively, when the requested content is not contaminated by the viruses, the DRM interoperable system 500 determines that the content is to be normally transmitted and reports a message for representing the determination result to the first client device 410.

Subsequently, the DRM interoperable system 500 performs DRM transformation in which license information and a data protection technique applied to the requested content are transformed from the first DRM to the second DRM (operation S193) and transmits the transformation result to the second client device 610 (operation S194).

On the other hand, the DRM interoperable system 500 determines the possibility of the content contamination. When the content is contaminated, the DRM interoperable system may clean the viruses from the content and normally transmit the content. In this case, the DRM interoperable system 500 may include a tool or system capable of cleaning the viruses from the content or request a separate anti-virus system connected through a network to clean the viruses from the content. In addition, specifications on the viruses, which contaminate the content, and the cleaning result may be reported to the first client device 410.

EXAMPLE 5-3

Figure 45:
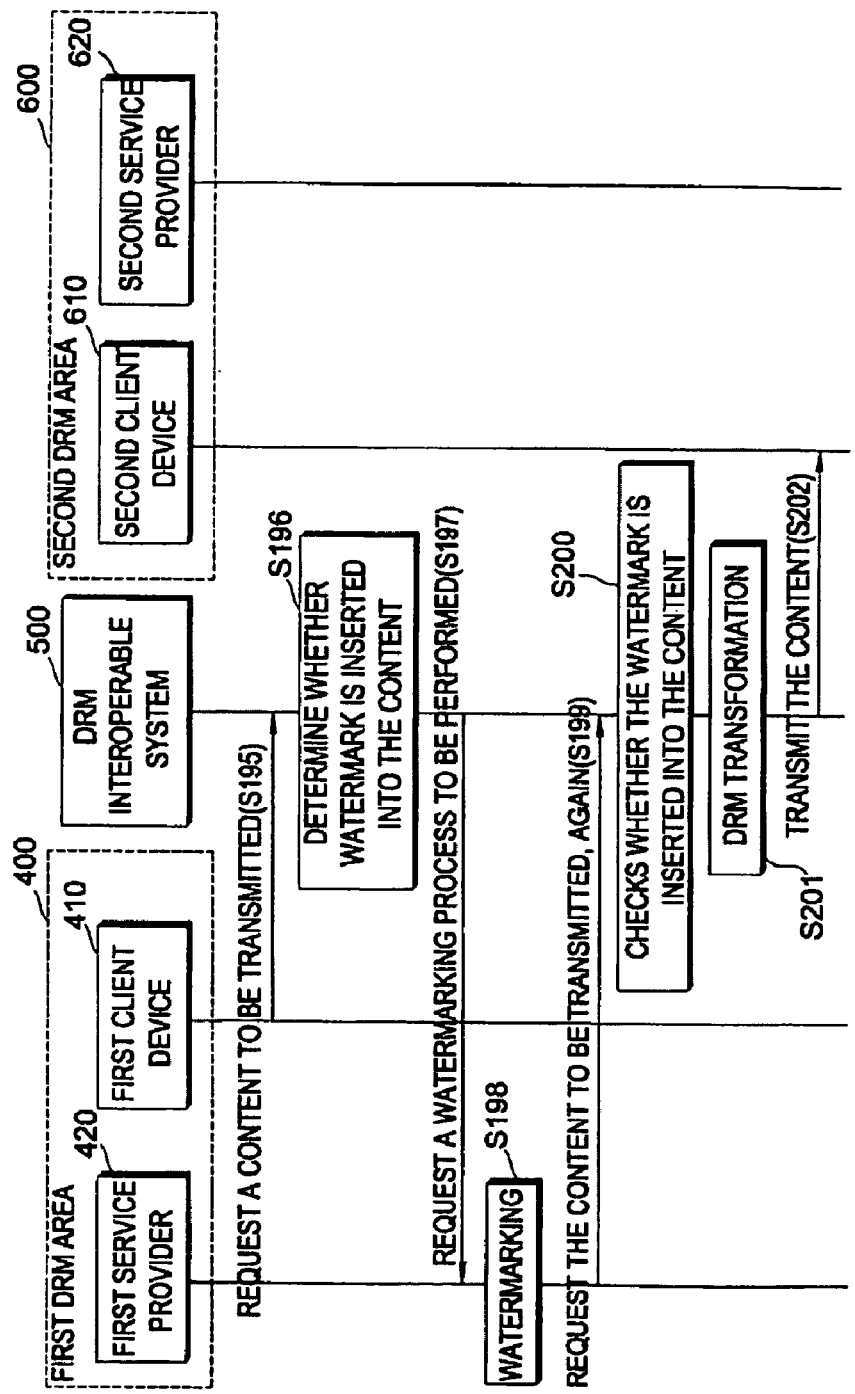
FIG. 45 is a functional block diagram illustrating a method of processing a content by using a DRM interoperable system according to Example 5-3.

FIG. 45 is a functional block diagram illustrating a method of processing a content by using a DRM interoperable system according to Example 5-3. FIG. 45 illustrates an example to which a watermarking function can be applied when a DRM is allowed to be compatible with another DRM.

As shown in FIG. 45, the DRM interoperable system 500 receives a content transmission request message for requesting a predetermined content to be transmitted from the first client device 410 to the second client device 610 (operation S190). The content transmission request message includes the content requested to be transmitted. Since the requested content is transmitted from the first client device 410 included in the first DRM area 400, the content indicates a content applied with the first DRM.

When receiving the content transmission request message, the DRM interoperable system 500 determines whether a watermark is inserted into the content by analyzing the content requested to be transmitted (operation S196). When the watermark is inserted into the content, the DRM interoperable system 500 performs a DRM transformation process in which license information and a data protection technique applied to the requested content are transformed from the first DRM to the second DRM (operation S201) and transmits the transformation result to the second client device 610 (operation S202).

Alternatively, when the watermark is not inserted into the requested content, the DRM interoperable system 500 requests a predetermined entity of the first DRM area 400, for example, the first service provider 420 to perform a watermarking process (operation S197). Specifically, the watermark is requested to be inserted into the content requested to be transmitted. Then, the first service provider 420, which is requested to perform the watermarking process, inserts the watermark into the content requested to be transmitted (operation S198) and requests the DRM interoperable system 500 to transmit the content again (operation S199).

The DRM interoperable system 500 checks whether the watermark is inserted into the requested content (operation S200), performs the DRM transformation process in which license information and a data protection technique applied to the requested content are transformed from the first DRM to the second DRM (operation S201), and transmits the transformation result to the second client device 610 (operation S202).

On the other hand, when an engine for providing a watermarking function is installed in the first client device 410, the DRM interoperable system 500 may request the first client device 410 to perform the watermarking process. At this time, the first client device 410 can request the first service provider 420 or content provider to provide copyright information for generating the watermark and can obtain the copyright information.

Up to now, a procedure of inserting the watermark when the DRM is allowed to be compatible with another DRM is described with reference to FIG. 45. In order to embody the procedure illustrated in FIG. 45, a watermarking system for providing the watermarking function has to be included in a predetermined entity of the first DRM area 400. Alternatively, when the watermarking system is not included in a predetermined entity of the first DRM area 400, the DRM interoperable system 500 may perform the watermarking process or request a separate watermarking system to perform the watermarking process. These cases will be described in the following with reference to FIG. 46.

EXAMPLE 5-4

Figure 46:
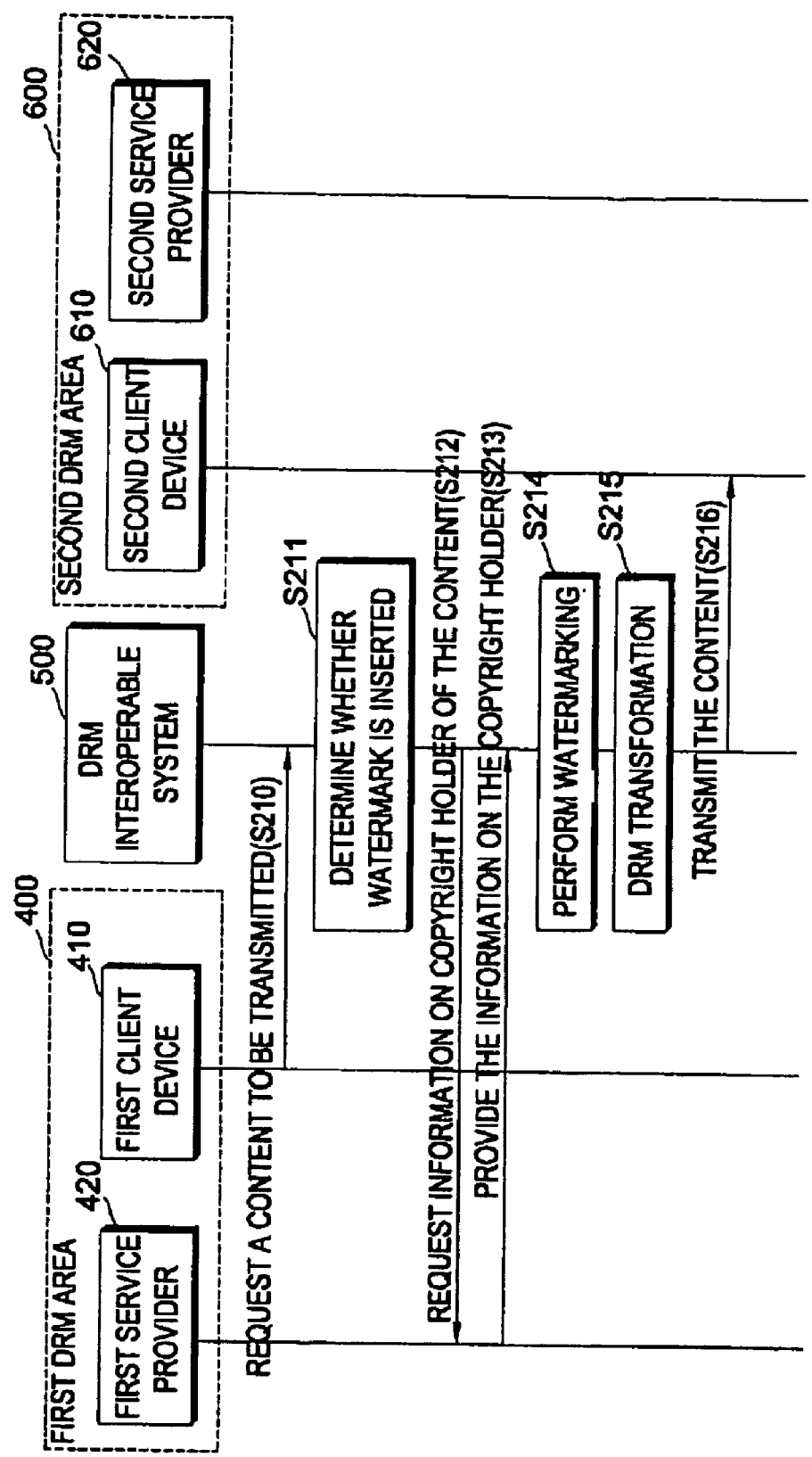
FIG. 46 is a functional block diagram illustrating a method of processing a content by using a DRM interoperable system according to Example 5-4.

FIG. 46 is a functional block diagram illustrating a method of processing a content by using a DRM interoperable system according to Example 5-4. FIG. 46 illustrates another example to which a watermarking function can be applied when a DRM is allowed to be compatible with another DRM.

As shown in FIG. 46, the DRM interoperable system 500 receives a content transmission request message for requesting a predetermined content to be transmitted from the first client device 410 to the second client device 610 (operation S210). The content transmission request message includes the content requested to be transmitted. Since the requested content is transmitted from the first client device 410 included in the first DRM area 400, the content indicates a content applied with the first DRM.

When receiving the content transmission request message, the DRM interoperable system 500 determines whether a watermark is inserted into the requested content (operation S211). When the watermark is inserted into the content, the DRM interoperable system 500 performs a DRM transformation process in which license information and a data protection technique applied to the requested content are transformed from the first DRM to the second DRM (operation S215) and transmits the transformation result to the second client device 610 (operation S216).

Alternatively, when the watermark is not inserted into the requested content, the DRM interoperable system 500 requests a predetermined entity of the first DRM area 400, for example, the first service provider 420 to provide information on a copyright holder of the requested content (operation S212). Specifically, the information on the copyright holder may be information on a content provider. In this case, the DRM interoperable system 500 may request the first service provider 420 to provide the information on the copyright holder. Alternatively, the DRM interoperable system 500 may directly request the content provider to provide the information on the copyright holder. In Example 5-4, it is assumed that the information on the copyright holder is provided by the first service provider 420. However, the present invention is not limited thereto.

The first service provider 420 provides the information on the copyright holder to the DRM interoperable system 500 in response to the request for the information on the copyright holder transmitted from the DRM interoperable system 500 (operation S213). Then, the DRM interoperable system 500 generates a watermark by using the information on the copyright holder provided by the DRM interoperable system 500, decrypts the content requested to be transmitted, and performs the watermarking process in which the generated watermark is inserted into the content (operation S214). At this time, the DRM interoperable system 500 may include the watermarking system and use the watermarking system. Alternatively, the DRM interoperable system 500 may directly request a separate watermarking system connected through a network to perform the watermarking process.

When the watermarking process is completed, the DRM interoperable system 500 performs the DRM transformation process (operation S215). Specifically, the license information and the data protection technique applied to the content into which the watermark is inserted are transformed to the second DRM that is a target DRM. Subsequently, the DRM interoperable system 500 transmits the transformed content to the second client device 610 (operation S216).

On the other hand, the DRM interoperable system 500 may enable the watermarking process to be performed by providing information on the address of the separate watermarking system, for example, a URL address to the first client device 410. In this case, the first client device 410 may directly request the first service provider 420 or content provider to provide the information on the copyright needed for the watermarking process. Alternatively, the DRM interoperable system 500 may provide the information on the copyright provided by the first service provider 420 together with the URL address to the first client device 410. In addition, the DRM interoperable system 500 may enable the watermarking process to be performed by providing the URL address of the separate watermarking system to the first service provider 420 of the first DRM area 400 or content provider.

EXAMPLE 5-5

Figure 47:
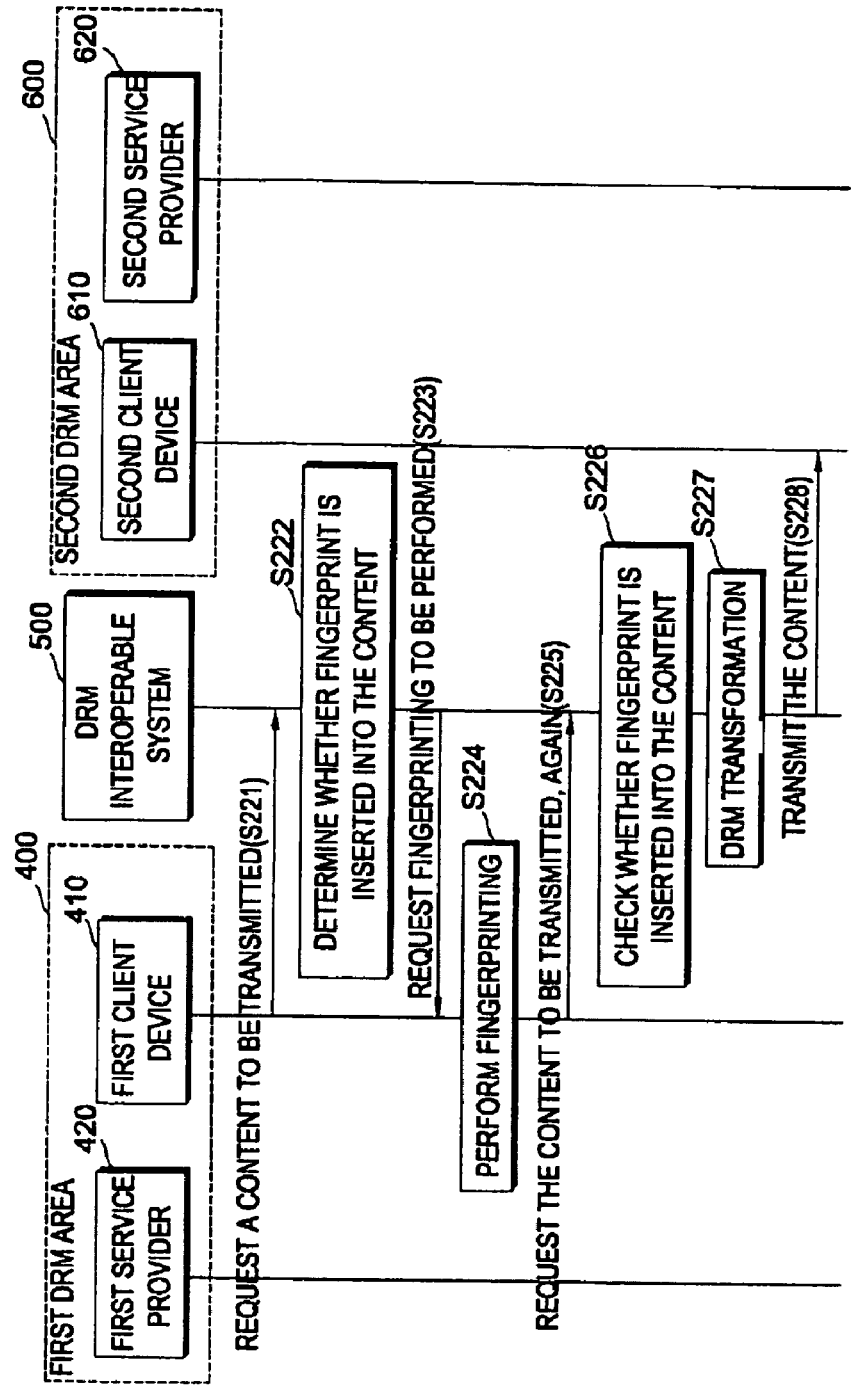
FIG. 47 is a functional block diagram illustrating a method of processing a content by using a DRM interoperable system according to Example 5-5.

FIG. 47 is a functional block diagram illustrating a method of processing a content by using a DRM interoperable system according to Example 5-5. FIG. 47 illustrates an example to which a fingerprinting function can be applied when a DRM is allowed to be compatible with another DRM.

As shown in FIG. 47, the DRM interoperable system 500 receives a content transmission request message for requesting a predetermined content to be transmitted from the first client device 410 to the second client device 610 (operation S221). The content transmission request message includes the content requested to be transmitted. Since the requested content is transmitted from the first client device 410 included in the first DRM area 400, the content indicates a content applied with the first DRM.

When receiving the content transmission request message, the DRM interoperable system 500 determines whether a fingerprint including the user information of the first client device 410 is inserted into the content by analyzing the content requested to be transmitted (operation S222). The determination process may be performed immediately after the content transmission request is received or before the DRM transformation is performed.

When it is determined that the fingerprint is normally inserted into the content, the DRM interoperable system 500 performs the DRM transformation process in which license information and a data protection technique applied to the requested content are transformed from the first DRM to the second DRM (operation S227), and transmits the transformation result to the second client device 610 (operation S228).

Alternatively, when it is determined that the fingerprint is not inserted into the content requested to be transmitted, the DRM interoperable system 500 requests the first client device 410 to perform a fingerprinting process (operation S223). Specifically, the fingerprint including the user information of the first client device 410 is requested to be inserted into the content requested to be transmitted.

At this time, the DRM interoperable system can provide address information needed for providing a fingerprinting engine for performing the fingerprinting process, for example, a URL to the first client device 410 through a URL trigger or back channel. Since fingerprinting algorithms are remarkably various, the DRM interoperable system 500 may not store and manage all the fingerprinting algorithms. Accordingly, the DRM interoperable system 500 has to provide the address of the fingerprinting system which can download the fingerprinting engine having an algorithm used in the first DRM area 400 to the first client device 410. The address of the fingerprinting system can be obtained by communicating requests and responses between the DRM interoperable system 500 and the first service provider 420.

The fingerprinting system may be included in the first service provider 420. Alternatively, the fingerprinting system may be a predetermined server interacting with the service provider 420. However, when the fingerprinting function is not included in the first DRM area 400, the first service provider 420 cannot provide the fingerprinting function. In this case, the DRM interoperable system 500 may provide address information of a separate fingerprinting system capable of providing a fingerprinting engine to the first client device. In addition, when a predetermined fingerprinting engine is installed in the first client device 410, the DRM interoperable system 500 may not transmit additional address information and request the first client device 410 to perform the fingerprinting process through the installed fingerprinting engine.

The first client device 410 requested to perform the fingerprinting process may perform the fingerprinting process by downloading the fingerprinting engine by using the address information received from the DRM interoperable system 500 or perform the fingerprinting process by using the installed fingerprinting engine (operation S224). Specifically, the fingerprint including the user information is inserted into the requested content.

Subsequently, the first client device 410 requests the DRM interoperable system 500 to transmit the content into which the fingerprint is inserted to the second client device 610 again (operation S225). Then, the DRM interoperable system 500 checks whether the fingerprint is inserted into the requested content (operation S226), performs the DRM transformation process in which license information and a data protection technique applied to the requested content are transformed from the first DRM to the second DRM (operation 227), and transmits the transformation result to the second client device 610 (operation S228).

On the other hand, although it is not shown, the DRM interoperable system 500 may request the second client device 610 that receives the content to perform the fingerprinting process. In this case, the DRM interoperable system 500 may provide the address information of the fingerprinting system capable of performing the fingerprinting process to the second client device 610. At this time, the address information of the fingerprinting system can be obtained by communicating requests and responses between the DRM interoperable system 500 and the second service provider 610. In addition, when the second service provider 610 does not include the fingerprinting function, the DRM interoperable system 500 may provide an address of a separate fingerprinting system.

EXAMPLE 5-6

FIG. 48 is a functional block diagram illustrating a method of processing a content by using a DRM interoperable system according to Example 5-6. FIG. 48 illustrates another example to which a fingerprinting function can be applied when a DRM is allowed to be compatible with another DRM. In Example 5-6, the DRM interoperable system includes a fingerprinting engine.

As shown in FIG. 48, the DRM interoperable system 500 receives a content transmission request message for requesting a predetermined content to be transmitted from the first client device 410 to the second client device 610 (operation S230). The content transmission request message includes the content requested to be transmitted. Since the requested content is transmitted from the first client device 410 included in the first DRM area 400, the content indicates a content applied with the first DRM. The received content transmission request message includes the transmission and receiving user information, that is, user information of the first and second client devices 410 and 610.

Subsequently, the DRM interoperable system 500 determines whether a fingerprint including the user information of the first client device 410 is inserted into the content by analyzing the content requested to be transmitted (operation S231). When the fingerprint is inserted into the content requested to be transmitted, the DRM interoperable system 500 performs the DRM transformation process in which license information and a data protection technique applied to the requested content are transformed from the first DRM to the second DRM (operation S233), and transmits the transformation result to the second client device 610 (operation S234).

Alternatively, when the fingerprint is not inserted into the content requested to be transmitted, the DRM interoperable system 500 generates a fingerprint including the received user information of the first client device 410 by using the fingerprint engine included in the DRM interoperable system 500, encrypts the content requested to be transmitted, and performs the fingerprinting process in which the generated fingerprint is inserted into the content (operation S232). The fingerprinting engine is stored in a predetermined device in the DRM interoperable system 500 in a cache form. The fingerprinting engine can operate, when the fingerprinting process is performed.

When the fingerprinting process (operation S232) is completed, the DRM interoperable system 500 performs the DRM transformation process (operation S233).

Specifically, the license information and the data protection technique applied to the content into which the fingerprint is inserted are transformed to the second DRM that is a target DRM. Subsequently, the DRM interoperable system 500 transmits the transformed content to the second client device 610 (operation S234).

On the other hand, the DRM interoperable system 500 may insert the fingerprint including information on the second client device 610 which receives the content into the content. In this case, the DRM interoperable system 500 has to store the corresponding fingerprinting engine in a cache form.

EXAMPLE 5-7

FIG. 49 is a functional block diagram illustrating a method of processing a content by using a DRM interoperable system according to Example 5-7. FIG. 49 illustrates a procedure of reporting to a system, which includes or distributes the content, that fingerprint information of the content is not matched with the user information, when a user of which finger print information is not matched with the user information requests the content to be transmitted.

As shown in FIG. 49, the DRM interoperable system 500 receives a content transmission request message for requesting a predetermined content to be transmitted from the first client device 410 to the second client device 610 (operation S250). The content transmission request message includes transmission and receiving user information, that is, user information of the first and second client device 410 and 610. In addition, a fingerprint is inserted into the content requested to be transmitted.

The DRM interoperable system 500 compares and analyzes the user information included in the fingerprint information inserted into the content requested to be transmitted and the user information of the first client device 410 (operation S251). When finding an error in which the user information included in the fingerprint is not matched with the user information of the first client device 410 (operation S252), the DRM interoperable system 500 reports to the first client device that the error occurs (operation S254). In addition, the DRM interoperable system 500 transmits disapproval for representing that the share of the content is not approved to the second client device 610 (operation S253). Accordingly, an illegal content of which fingerprint is not matched with the user information of the first client device 410 cannot be transmitted.

While the present invention has been particularly shown and described with reference to exemplary embodiments thereof, it will be understood by those skilled in the art that various changes in form and details may be made therein without departing from the spirit and scope of the present invention as defined by the appended claims.

As described above, it is possible to provide various transmission types of data in a DRM interoperable system according to an embodiment of the present invention. Specifically, since it is possible to control the DRM interoperable system so that a plurality of data is transmitted to a plurality of destinations through a single session, it is possible to improve transmission efficiency. A transmission status of the data can be reported as an event message.

What is claimed is:

1. A system comprising:
   devices associated with a domain, wherein the devices include a first device and a second device, the first device configured to transmit content or a license of the content to the second device by establishing a secure authenticated channel with the second device; and
   a controller configured to perform a function of a local master for the domain, wherein the controller has a highest capability among the devices and is elected by performing an election competition based on comparing, among the devices, the capability of each device with each other.

2. The system of claim 1, wherein:
   if the controller enters a failure state, the devices perform the election competition for electing a new controller, and
   the controller is replaced by the new controller elected by the election competition for electing the new controller.

3. The system of claim 1, wherein performing the election competition further comprises:
   transmitting, among the devices associated with the domain, data describing a capability of each device;
   comparing, among the devices, the capability of each device with each other using the transmitted data; and
   electing, as the elected controller, a device associated with the domain with a capability higher than a capability of any other device associated with the domain.

* * * * *